(12) United States Patent
Markham et al.

(10) Patent No.: US 9,351,106 B2
(45) Date of Patent: May 24, 2016

(54) SYSTEM FOR PROVIDING INFORMATION AND ASSOCIATED DEVICES

(75) Inventors: Andrew Markham, Oxfordshire (GB);
Niki Trigoni, Oxfordshire (GB);
Jean-Paul Van de Ven, Oxfordshire (GB)

(73) Assignee: Isis Innovation Limited (GB)

( * ) Notice: Subject to any disclaimer, the term of this patent is extended or adjusted under 35 U.S.C. 154(b) by 39 days.

(21) Appl. No.: 14/003,647

(22) PCT Filed: Mar. 7, 2012

(86) PCT No.: PCT/GB2012/050509
§ 371 (c)(1),
(2), (4) Date: Feb. 12, 2014

(87) PCT Pub. No.: WO2012/120302
PCT Pub. Date: Sep. 13, 2012

(65) Prior Publication Data
US 2014/0155098 A1  Jun. 5, 2014

(30) Foreign Application Priority Data
Mar. 7, 2011 (GB) .................................. 1103822.1

(51) Int. Cl.
*H04W 4/02* (2009.01)
*H04W 36/00* (2009.01)
(Continued)

(52) U.S. Cl.
CPC .............. *H04W 4/02* (2013.01); *H04B 1/0064* (2013.01); *H04B 5/0081* (2013.01); *H04B 13/02* (2013.01);
(Continued)

(58) Field of Classification Search
CPC ........ H04B 13/02; H04B 11/00; H04B 1/525;
H04B 7/15585; G01V 3/15; H04L 1/22;
H04W 24/04; H04W 36/00; H04W 36/14;
H04W 4/02; H04W 88/06; H04W 92/18
USPC ......... 455/41.2, 42, 427, 431, 456.1, 502, 72,
455/96, 98, 456.3, 343.1; 340/850, 552,
340/572.1, 572.4, 572.7
See application file for complete search history.

(56) References Cited

U.S. PATENT DOCUMENTS

| 6,549,004 B1 | 4/2003 | Prigge |
| 2004/0102219 A1 | 5/2004 | Bunton et al. |

(Continued)

FOREIGN PATENT DOCUMENTS

| EP | 2227033 | 9/2010 |
| EP | 2372956 | 10/2011 |

(Continued)

OTHER PUBLICATIONS

"International Application No. PCT/GB2012/050509, International Search Report mailed Jul. 9, 2012", (Jul. 9, 2012), 4 pgs.

(Continued)

*Primary Examiner* — Inder Mehra
(74) *Attorney, Agent, or Firm* — Schwegman, Lundberg & Woessner, P.A.

(57) ABSTRACT

A system for providing locality information to a user is disclosed. The system comprises at least one magnetic field beacon. Each beacon comprises means for generating a magnetic field encoded with information associated with the beacon. A communication device is provided that comprises means for detecting the encoded magnetic field emitted by the beacon and means for extracting the information encoded in the detected magnetic field.

39 Claims, 29 Drawing Sheets

(51) Int. Cl.
| | |
|---|---|
| H04W 24/04 | (2009.01) |
| H04W 36/14 | (2009.01) |
| H04W 88/06 | (2009.01) |
| H04W 92/18 | (2009.01) |
| H04B 13/02 | (2006.01) |
| H04N 1/27 | (2006.01) |
| H04N 1/29 | (2006.01) |
| H04L 1/22 | (2006.01) |
| H01F 38/14 | (2006.01) |
| H04B 1/00 | (2006.01) |
| H04B 5/00 | (2006.01) |
| H04B 17/27 | (2015.01) |

(52) U.S. Cl.
CPC .................. *H04L 1/22* (2013.01); *H04W 36/00* (2013.01); *H04B 5/0043* (2013.01); *H04B 17/27* (2015.01); *H04W 24/04* (2013.01); *H04W 36/14* (2013.01); *H04W 88/06* (2013.01); *H04W 92/18* (2013.01)

(56) References Cited

U.S. PATENT DOCUMENTS

| | | | |
|---|---|---|---|
| 2004/0155776 A1* | 8/2004 | Sackl | 340/552 |
| 2006/0012777 A1* | 1/2006 | Talbot et al. | 356/139.01 |
| 2008/0009242 A1 | 1/2008 | Rhodes et al. | |
| 2008/0171512 A1* | 7/2008 | Jack | H04B 5/02 455/41.1 |
| 2009/0009410 A1* | 1/2009 | Dolgin et al. | 343/703 |
| 2009/0140852 A1 | 6/2009 | Stolarczyk et al. | |
| 2009/0254276 A1 | 10/2009 | Faulkner et al. | |
| 2009/0280742 A1 | 11/2009 | Schantz et al. | |
| 2010/0135121 A1* | 6/2010 | Rhodes et al. | 367/134 |

FOREIGN PATENT DOCUMENTS

| | | | |
|---|---|---|---|
| GB | 2477034 | 7/2011 | |
| WO | WO-00/38460 A1 | 6/2000 | |
| WO | WO-2005/083649 | 9/2005 | |
| WO | WO-2006/134327 | 12/2005 | |
| WO | WO-2006/130223 | 12/2006 | |
| WO | WO-2007/075553 A2 | 7/2007 | |
| WO | WO 2007075553 * | 7/2007 | G06F 19/00 |
| WO | WO-2008/049170 | 5/2008 | |
| WO | WO-2011/071346 | 6/2011 | |
| WO | WO-2012/001062 | 1/2012 | |
| WO | WO-2012/006711 | 1/2012 | |

OTHER PUBLICATIONS

Guolin, Sun, et al., "Signal processing techniques in network-aided positioning: a survey of state-of-the-art positioning designs", IEEE Signal Processing Magazine, 22(4), (Jul. 2005), 12-23.

"Electromagnetic compatibility and Radio spectrum Matters (ERM); Avalanche Beacons; Transmitter-receiver systems; Part 1: Technical characteristics and test methods", ETSI EN 300 718-1; V1.2.1 (May 2001); Copyright European Telecommunications Standards Institute 2001, (May 2001), 34 pgs.

"Mine Emergency Communications Partnership Phase I, In-Mine Testing", (Sep. 26, 2006), 14 pgs.

"United Kingdom Application No. GB1103822.1, Search Report mailed Jul. 11, 2011", (Jul. 11, 2011), 8 pgs.

"United Kingdom Application No. GB1204048.1, Search Report mailed Jul. 9, 2012", (Jul. 9, 2012), 21 pgs.

"United Kingdom Application No. GB1204049.9, Search Report mailed Jul. 9, 2012", (Jul. 9, 2012), 8 pgs.

"United Kingdom Application No. GB1204050.7, Search Report mailed Jul. 9, 2012", (Jul. 9, 2012), 12 pgs.

Edgerly, Bruce, et al., "Digital Transceiving Systems: The Next Generation of Avalanche Beacons", Proceedings of the 1998 International Snow Science Workshop, Sunriver, Oregon, (1998), 10 pgs.

Goldsmith, Andrea J., et al., "Design Challenges for Energy-Constrained Ad Hoc Wireless Networks", IEEE Wireless Communications, Aug. 2002, 20 pgs.

Prigge, Eric A., et al., "A Positioning System With No Line-Of-Sight Restrictions for Cluttered Environments", A dissertation submitted to the Department of Aeronautics and Astronautics and the Committee on Graduate Studies of Stanford University in partial fulfillment of the requirements for the degree of Doctor of Philosopy,, (Aug. 1, 2004), 176 pgs.

Prigge, Eric, "An Indoor Absolute Positioning System with No Line of Sight Restrictions and Building-Wide Coverage", Research by Eric Prigge in the Aerospace Robotics Laboratory at Stanford University; downloaded Sep. 16, 2011, from http:acl.mit.edu/Prigge/, (Sep. 16, 2011), 5 pgs.

Schiffbauer, William H., et al., "Coal Mine Communications", Am Longwall Mag; Aug. 24-25, 2006, (Aug. 1, 2006), 24-25.

\* cited by examiner

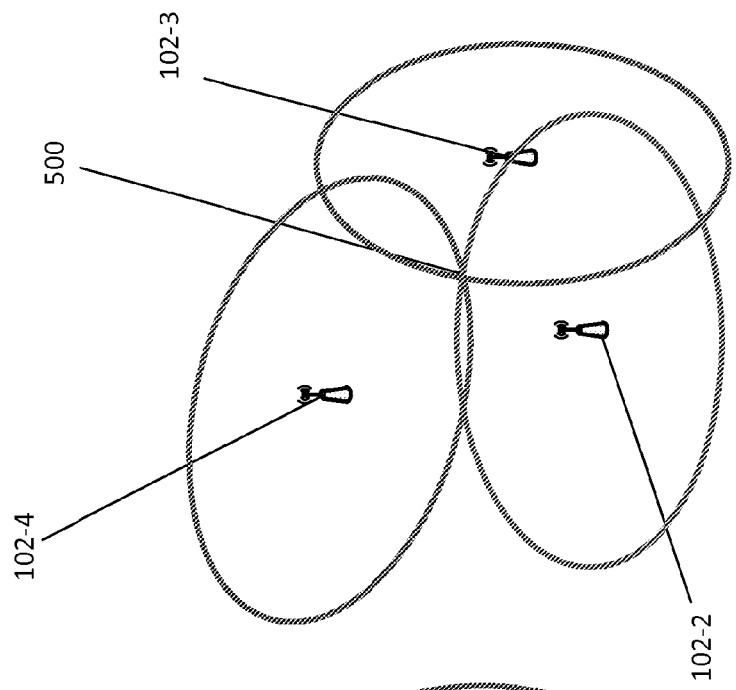
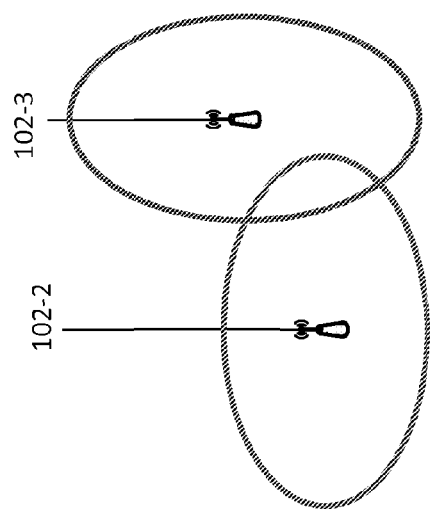
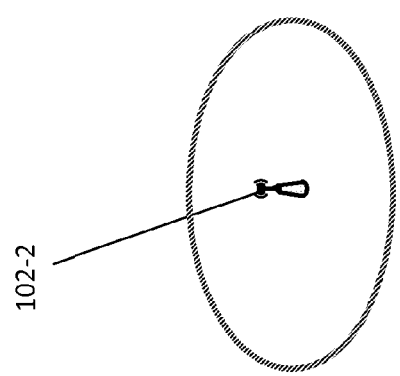
Figure 7(c)
Figure 7(b)
Figure 7(a)
Figure 7

US 9,351,106 B2

SYSTEM FOR PROVIDING INFORMATION AND ASSOCIATED DEVICES

PRIORITY CLAIM TO RELATED APPLICATIONS

This application is a national stage application under 35 U.S.C. §371 of PCT/GB2012/050509, filed Mar. 7, 2012, and published as WO 2012/120302 A1 on Sep. 13, 2012, which claims priority to United Kingdom Application No. 1103822.1, filed Mar. 7, 2011, which applications and publication are incorporated by reference as if reproduced herein and made a part hereof in their entirety, and the benefit of priority of each of which is claimed herein.

The present invention relates to a system for providing information and associated devices. This invention relates in particular to, but is not limited to, a system for enhancing localisation of a communications device in an enclosed environment such as in a building, underground, in a built up or wooded area, or the like.

With the increasing popularity of mobile computational and communication devices and in particular mobile (cellular) telephones it is now commonplace for individuals to carry their mobile devices with them most of the time. These devices are increasingly flexible in terms of their ability to communicate with one another and other devices (PCs, laptops, televisions etc.) using a variety of short and/or wide range wireless and wired technologies. The functionality of mobile (cellular) telephones has increased dramatically over recent years, due to a certain extent to advances in the field of solid state electronics. This has led to the development of mobile telephones (referred to as 'smartphones') including many enhanced features such as Global Positioning System (GPS) tracking for location finding, accelerometers for motion sensing and compasses in the form of magnetometers for direction finding.

Smartphones and other mobile consumer devices generally retrieve localisation data from GPS satellites. However, GPS positioning can be unreliable in some situations, in particular in environments such as indoors, underground or under cover of foliage where obtaining a satellite fix can be difficult or even impossible. This can lead to situations where a user has little or no location information available to them, which is particularly disadvantageous when the user is in an unfamiliar environment.

It will be understood that numerous other applications suffer from similar problems, particularly applications where conventional means of communication may not be sufficient or desirable.

Furthermore, in order to retrieve a location fix using GPS, a significant amount of energy is needed. This is a particular issue for mobile telephones, in which it is important to keep energy usage as low as possible in order to preserve battery life. Therefore, an alternative method may be advantageous, even when a good GPS signal is available, if it fulfils a similar role whilst consuming less energy and/or providing higher positioning accuracy.

According to one aspect of the present invention there is provided communication system for providing information to a user of a mobile telephone, the system comprising a beacon comprising means for generating a magnetic field having a time-varying magnetic field vector, wherein said time-varying magnetic field vector is modulated to encode information associated with said beacon; and a mobile device comprising means for detecting the magnetic field having the time-varying magnetic field vector generated by the beacon; and means for extracting said encoded information from said detected magnetic field.

According to another aspect of the present invention there is provided a mobile device for providing information to a user of the mobile device, the mobile device comprising: means for detecting a magnetic field generated by a beacon, wherein the magnetic field has a time-varying magnetic field vector, and wherein said time-varying magnetic field vector has been modulated to encode information; and means for extracting said encoded information from said magnetic field.

The mobile device may comprise locality information associated with the locality in which said beacon is located.

The means for detecting the magnetic field may comprise a magnetometer. The magnetometer may comprise a magnetometer operable as a direction finding device (e.g. a compass).

The extracting means may extract the information based on the magnitude of the magnetic field vector, the direction of the magnetic field vector and/or the polarisation of the magnetic field vector.

The detecting means may detect, and differentiate between, a plurality of distinct encoded magnetic fields. The detecting means may detect, and differentiate between, a plurality of distinct encoded magnetic fields each emitted by a different respective beacon. The detecting means may detect a phase relationship between a number of distinct magnetic fields whereby to differentiate between said distinct fields. The detecting means may use the phase relationship between the number of distinct signals to determine the mobile telephone's position relative to an origin of each said distinct signals.

The information may comprise an identifier of said beacon.

The mobile device may further comprise means for retrieving locality information associated with said identifier. The retrieving means may retrieve said locality information via a connection to a telecommunications network. The retrieving means may retrieve said locality information from a memory of the mobile telephone. The retrieving means may retrieve said locality information via an internet connection.

The mobile device of may further comprise means for storing locality information relating to each beacon of a group of beacons in association with a respective identifier for each beacon prior to said detection of said beacon, wherein the retrieving means is operable to retrieve locality information associated with a particular stored identifier from said locally stored locality information on detection of magnetic field generated by a beacon with which the particular stored identifier is associated.

The retrieving means may retrieve said locality information relating to each beacon of the group, from a remote source, for storage by said storing means.

The retrieving means may retrieve said locality information relating to each beacon of the group from said remote source in response to detection of a beacon configured to trigger said retrieval of said locality information relating to each beacon of the group.

The storing means may store said locality information relating to each beacon of the group in response to a specific request by said user.

The storing means may store said locality information relating to each beacon of the group as part of a process for configuring said device to operate within a localisation system.

The identifier of the beacon may be defined by a unique identifying code. The unique identifying code may have a portion that is common to the identifiers of a group of beacons. At least one portion of the identity code may identify a group of beacons to be within a particular building (or area). At least one portion of the identity code may identify a group of beacons to be within a particular geographical region. The unique identifying code may be unique within a particular building or area. The unique identifying code may be unique within a particular region. The unique identifying code may be globally unique.

The mobile telephone may further comprise means for obtaining the results of measurements and for using said measurements to enhance localisation of said mobile device.

The measurements may comprise at least one of: accelerometer measurements, geographical positioning measurements, and network signal measurements.

The measurement results may be used to enhance the locality information by means of a Kalman filter and/or a particle filter.

According to another aspect of the present invention there is provided a magnetic field beacon for use in a system for providing information to a user of a mobile device, the beacon comprising: means for generating a magnetic field having a time-varying magnetic field vector, wherein said time-varying magnetic field vector is modulated to encode information associated with said beacon.

The magnetic field beacon may further comprise means for detecting and decoding an encoded magnetic field generated by another of said plurality of beacons.

The means for generating a magnetic field may comprise at least one coil under the control of a controller.

The means for generating a magnetic field may comprise a plurality of coils substantially mutually orthogonally orientated with respect to one another. The means for generating a magnetic field may generate a rotating magnetic field.

The information encoded in the magnetic field may comprise a correlation code. The information encoded in the magnetic field may comprise an identifier of the beacon.

The identifier may be defined by an identifying code (which may be unique). The identifying code may have a portion that is common to the identifiers of a group of beacons.

At least one portion of the identifying code may identify a group of beacons to be within a particular building (or area).

At least one portion of the identifying code may identify a group of beacons to be within a particular geographical region.

The identifying code may be unique within a particular building or area. The identifying code may be unique within a particular region. The identifying code may be globally unique.

The beacon may further comprise means for communicating via a network.

The magnetic field may be encoded by modulating the direction of said time-varying magnetic field vector to encode said information. The direction of said magnetic field vector may correspond to a data symbol.

The magnetic field may be encoded by modulating the change of direction (e.g. phase) of said time-varying magnetic field vector to encode said information. The change of direction (e.g. phase) of said magnetic field vector may correspond to a data symbol.

The magnetic field may be encoded by modulating said time-varying magnetic field vector to produce a three dimensional time-dependent magnetic field shape (e.g. Hypercomplex coding).

The three dimensional time-dependent magnetic field shape of said magnetic field vector may correspond to an identifier of the beacon.

The magnetic field may be encoded by modulating the rate of change of direction of said time-varying magnetic field vector to encode said information. The rate of change of direction of said magnetic field vector may correspond to a data symbol.

According to another aspect of the present invention there is provided a server for use in a localisation system, the server may comprise means for storing an identifier of a beacon; means for storing locality information in association with said identifier; means for receiving a locality information request from a mobile device wherein said request comprises an identifier of a beacon detected by the mobile device; means for retrieving the requested locality information based on said identifier received in said request; and means for sending the retrieved locality information to said mobile device. The server may form part of a mobile device.

The server may be located externally to a mobile device, and within a wide area network (WAN). The server may be located externally to a mobile device, and within a local area network (LAN).

The locality information may comprise at least one of positioning information, educational information, descriptive information, and/or advertising information. The locality information may comprise media content (for example, at least one of text, audio, video, and/or the like).

According to another aspect of the present invention there is provided a method performed by a communication system of providing information to a user of a mobile telephone, the method comprising: a beacon generating a magnetic field having a time-varying magnetic field vector, wherein said time-varying magnetic field vector is modulated to encode information associated with said beacon; and a mobile device detecting the magnetic field having the time-varying magnetic field vector generated by the beacon; and extracting said encoded information from said detected magnetic field.

According to another aspect of the present invention there is provided a method performed by a mobile device, the method comprising: detecting a magnetic field generated by a beacon, wherein the magnetic field has a time-varying magnetic field vector, and wherein said time-varying magnetic field vector has been modulated to encode information; and extracting said encoded information from said magnetic field.

According to another aspect of the present invention there is provided a method performed by a magnetic field beacon, the method comprising: generating a magnetic field having a time-varying magnetic field vector, wherein said time-varying magnetic field vector is modulated to encode information associated with said beacon.

According to another aspect of the present invention there is provided a method performed by a server, the method comprising: storing an identifier of a beacon; storing locality information in association with said identifier; receiving a locality information request from a mobile telephone wherein said request comprises an identifier of a beacon detected by the mobile telephone; retrieving the requested locality information based on said identifier received in said request; and sending the retrieved locality information to said mobile telephone.

According to another aspect of the present invention there is provided a communication system for providing information to a user of a mobile device, the system comprising: a beacon comprising: means for communicating with at least one further device using a magnetic field, the at least one further device comprising a magnetic field source other than said beacon, the communicating means comprising: means for generating a magnetic field that is modulated to encode information associated with said beacon; means for detecting a magnetic field that is modulated to encode information and that is generated by said magnetic field source other than said beacon; and means for extracting information encoded in said detected magnetic field generated by said source other than said beacon; and a mobile device comprising: means for detecting said magnetic field generated by said beacon; and means for extracting information encoded in said detected magnetic field generated by said beacon.

According to another aspect of the present invention there is provided a mobile device comprising: means for detecting said magnetic field generated by said beacon; and means for extracting information encoded in said detected magnetic field generated by said beacon.

The mobile device may further comprise: means for communicating with at least one further device using a magnetic field, the at least one further device comprising a magnetic field source other than said mobile device, the communicating means comprising: means for generating a magnetic field that is modulated to encode information associated with said mobile device; means for detecting a magnetic field that is modulated to encode information and that is generated by said magnetic field source other than said mobile device; and means for extracting information encoded in said detected magnetic field generated by said source other than said mobile device.

According to another aspect of the present invention there is provided a communication system for providing information to a user of a mobile device, the system comprising: a plurality of beacons, each beacon comprising: means for communicating with each other beacon using a magnetic field, the communicating means comprising: means for generating a magnetic field that is modulated to encode information associated with said beacon; means for detecting a respective magnetic field that is modulated to encode information and that is generated by each other beacon; and means for extracting respective information encoded in said detected magnetic field generated by each other beacon.

The beacon may comprise: means for communicating with at least one further device using a magnetic field, the at least one further device comprising a magnetic field source other than said beacon, the communicating means comprising: means for generating a magnetic field that is modulated to encode information associated with said beacon; means for detecting a magnetic field that is modulated to encode information and that is generated by said magnetic field source other than said beacon; and means for extracting information encoded in said detected magnetic field generated by said source other than said beacon.

At least one further device may comprise another beacon. At least one further device comprises a mobile telephone.

According to another aspect of the present invention there is provided a method performed by a communication system of providing information to a user of a mobile device, the method comprising: a beacon communicating with at least one further device using a magnetic field, the at least one further device comprising a magnetic field source other than said beacon the beacon generating a magnetic field that is modulated to encode information associated with said beacon the beacon detecting a magnetic field that is modulated to encode information and that is generated by said magnetic field source other than said beacon; and a mobile device detecting said magnetic field generated by said beacon; and extracting information encoded in said detected magnetic field generated by said beacon.

According to another aspect of the present invention there is provided a method performed by a communication system of providing information to a user of a mobile device, the method comprising: a plurality of beacons communicating with each other beacon using a magnetic field, the communicating comprising generating a magnetic field that is modulated to encode information associated with said beacon; detecting a respective magnetic field that is modulated to encode information and that is generated by each other beacon; and extracting respective information encoded in said detected magnetic field generated by each other beacon.

According to another aspect of the present invention there is provided a communication system for providing information from a mobile device, the system comprising: a mobile device comprising: means for generating a magnetic field that is modulated to encode information associated with said mobile device; and a receiver comprising: means for detecting said magnetic field generated by said mobile device; and means for extracting information encoded in said detected magnetic field generated by said mobile device.

According to another aspect of the present invention there is provided a mobile device for providing information in a system, the mobile device comprising means for generating a magnetic field that is modulated to encode information associated with said mobile device.

According to another aspect of the present invention there is provided a receiver for providing information in a system, the receiver comprising means for detecting said magnetic field generated by said mobile device and means for extracting information encoded in said detected magnetic field generated by said mobile device.

According to another aspect of the present invention there is provided a method performed by a communication system of providing information from a mobile device, the method comprising: a mobile device generating a magnetic field that is modulated to encode information associated with said mobile device; and a receiver detecting said magnetic field generated by said mobile device; and the receiver extracting information encoded in said detected magnetic field generated by said mobile device.

According to another aspect of the present invention there is provided a communication system for locating a mobile device relative to a beacon, the system comprising: a beacon comprising means for generating a three-dimensional time-dependent magnetic field having a predefined time-dependent shape; and a communication device comprising means for detecting the three-dimensional time-dependent magnetic field, means for extracting temporal and/or spatial properties of said magnetic field, means for comparing predicted temporal and/or spatial properties with said extracted temporal and/or spatial properties; and means for determining a location of said communication device relative to said source of said magnetic field based on said comparison.

According to another aspect of the present invention there is provided a beacon for use in a system comprising means for generating a magnetic field having a predefined time-dependent shape.

The predetermined time-dependent shape may be configured to represent an identity of the beacon. The predetermined time dependent shape may correspond to a rotating magnetic dipole of variable strength at the beacon.

According to another aspect of the present invention there is provided a communication device for use in a system comprising: means for detecting a three-dimensional time-dependent magnetic field; means for extracting temporal and/or spatial properties of said magnetic field; means for comparing predicted temporal and/or spatial properties with said extracted temporal and/or spatial properties; and means for determining a location of said communication device relative to said source of said magnetic field based on said comparison.

The means for determining a location of said communication device is operable to extract the magnetic field strength and extracting a distance based on said magnetic field strength.

The means for determining a location of said communication device may extract an angular position relative to said source based on said extracted temporal and/or spatial properties.

The means for predicted temporal and/or spatial properties of said magnetic field with said extracted temporal and/or spatial properties may: perform a cross-correlation between the predicted magnetic field and the extracted magnetic field; and detect a peak in the output of said cross-correlation.

The means for predicted temporal and/or spatial properties of said magnetic field with said extracted temporal and/or spatial properties may: detect said peak in the output of the cross-correlation utilising at least one of: least mean squares, genetic algorithms or an exhaustive search.

According to another aspect of the present invention there is provided a method performed by a communication system of locating a mobile device relative to a beacon, the method comprising: a beacon generating a three-dimensional time-dependent magnetic field having a predefined time-dependent shape; and a communication device detecting the three-dimensional time-dependent magnetic field, means for extracting temporal and/or spatial properties of said magnetic field; comparing predicted temporal and/or spatial properties with said extracted temporal and/or spatial properties; and determining a location of said communication device relative to said source of said magnetic field based on said comparison.

According to another aspect of the present invention there is provided a method performed by a beacon in a system, the method comprising generating a magnetic field having a predefined time-dependent shape.

According to another aspect of the present invention there is provided a method performed by a communication device in a system comprising: detecting a three-dimensional time-dependent magnetic field; extracting temporal and/or spatial properties of said magnetic field; comparing predicted temporal and/or spatial properties with said extracted temporal and/or spatial properties; and determining a location of said communication device relative to said source of said magnetic field based on said comparison.

According to another aspect of the present invention there is provided a communication system for generating an alert signal, in the event of an emergency scenario, from a mobile device, the system comprising: a mobile device comprising: means for generating a magnetic field that is modulated to provide an alert signal; and a detection device comprising: means for detecting said alert signal provided by said mobile device; and means for notifying a user of receipt of said alert signal.

According to another aspect of the present invention there is provided a mobile device for providing an alert signal, in the event of an emergency scenario, the mobile device comprising means for generating a magnetic field that is modulated to encode an alert signal.

The means for generating a magnetic field may comprise at least one coil under the control of a controller.

The means for generating a magnetic field comprises a plurality of coils substantially mutually orthogonally orientated with respect to one another. The means for generating a magnetic field may generate a rotating magnetic field.

The means for generating a magnetic field may encode information relating to the mobile device into the magnetic field. The information encoded in the magnetic field may comprise a correlation code and/or an identifier of the mobile device.

The information encoded in the magnetic field may comprise at least one of: information for assisting localisation, locality information, a current geographic location (e.g. GPS) fix, a last geographic location (GPS) fix.

The magnetic field may be encoded by modulating the direction of said time-varying magnetic field vector. The direction of said magnetic field vector may correspond to a data symbol.

The magnetic field may be encoded by modulating the change of direction (e.g. phase) of said time-varying magnetic field vector. The change of direction (e.g. phase) of said magnetic field vector may correspond to a data symbol.

The magnetic field may be encoded by modulating said time-varying magnetic field vector to produce a three dimensional time-dependent magnetic field shape (e.g. Hypercomplex coding).

The three dimensional time-dependent magnetic field shape of said magnetic field vector may correspond to an identifier of the mobile device.

The magnetic field may be encoded by modulating the rate of change of direction of said time-varying magnetic field vector. The rate of change of direction of said magnetic field vector may correspond to a data symbol.

The mobile device may further comprise means for detecting a magnetic field generated by another device. The mobile device may further comprise means for detecting a magnetic field generated by detection device.

The mobile device may generate a magnetic field upon detection of said magnetic field generated by detection device. The mobile device may divert power to said means for generating a magnetic field on receipt of said detected magnetic field generated by detection device, whereby to provide an enhanced signal. The means for detecting a magnetic field may detect the strength of a magnetic field. The magnetic field generating means may generate a magnetic field with a form in dependence on the strength of the detected magnetic field. The means for detecting a magnetic field may further comprise means for extracting information encoded in said detected magnetic field. The information extracted in said detected magnetic field may comprise locality information.

The mobile device may further comprise at least one of the following units: accelerometer, microphone, heart rate monitor and/or means for communicating with such devices. Information from the at least one unit may be encoded into the magnetic field generated by the mobile device. The encoded information from at least one unit may represent signs of life.

The mobile device may be connectable to a mobile telephone.

The means for generating a magnetic field may be wirelessly linked to the mobile telephone.

According to another aspect of the present invention the mobile device may comprise a mobile telephone.

According to another aspect of the present invention there is provided a detection device for notifying a user of receipt of an alert signal in the case of an emergency situation, the detection device comprising means for detecting an alert signal provided in an encoded magnetic field generated by a mobile device and means notifying a user of receipt of said alert signal.

The detection device may further comprise means for extracting information relating to the mobile device from said detected magnetic field generated by a mobile device.

The information extracted from said detected magnetic field may comprise locality information and/or a sign of life indication The detection device may further comprise means for generating a magnetic field. The means for generating a magnetic field may comprise at least one coil under the control of a controller. The means for generating a magnetic field may comprise a plurality of coils substantially mutually orthogonally orientated with respect to one another. The means for generating a magnetic field may be adapted to encode information associated with said detection device in said magnetic field. The means for generating a magnetic field may generate a rotating magnetic field.

The information encoded in the magnetic field may comprise a correlation code, an identifier of the detection device.

The detection device may comprise means for communicating via a network.

The magnetic field may be encoded by modulating the direction of said time-varying magnetic field vector. The direction of said magnetic field vector may correspond to a data symbol.

The magnetic field may be encoded by modulating the change of direction (e.g. phase) of said time-varying magnetic field vector. The change of direction (e.g. phase) of said magnetic field vector may correspond to a data symbol.

The magnetic field may be encoded by modulating said time-varying magnetic field vector to produce a three dimensional time-dependent magnetic field shape (e.g. Hypercomplex coding).

The three dimensional time-dependent magnetic field shape of said magnetic field vector may correspond to an identifier of the beacon. The magnetic field may be encoded by modulating the rate of change of direction of said time-varying magnetic field vector to encode said information. The rate of change of direction of said magnetic field vector may correspond to a data symbol.

The detection device may be provided on a vehicle (e.g. a remote operated vehicle (ROV) or unmanned aerial vehicle (UAV)).

According to another aspect of the present invention there is provided a method performed by communication system for generating an alert signal from a mobile device, the method comprising: a mobile device generating a magnetic field that is modulated to provide an alert signal; a detection device detecting alert signal provided by said mobile device; and the detection device notifying a user of receipt of said alert signal.

According to another aspect of the present invention there is provided a method performed by a mobile device of providing an alert signal, the method comprising: generating a magnetic field that is modulated to encode an alert signal.

According to another aspect of the present invention there is provided a method performed by a detection device of notifying a user of receipt of an alert signal, the method comprising: detecting an alert signal provided in an encoded magnetic field generated by a mobile device; and notifying a user of receipt of said alert signal.

According to another aspect of the present invention there is provided a communication system for a subterranean environment, the system comprising: a plurality of transceiver devices, each transceiver device comprising: first means for communicating with at least one other transceiver device of said plurality of transceiver devices using a first communication medium, the first communication medium comprising a magnetic field; and second means for communicating with the at least one other transceiver device of said plurality of transceiver devices using a second communication medium other than a magnetic field; wherein each transceiver device is operable to: switch from communicating using said second communication medium to communicating using said first communication medium when communication using said second communication medium is interrupted.

According to another aspect of the present invention there is provided a transceiver device for a subterranean environment, the transceiver device comprising: first means for communicating with at least one other transceiver device of a plurality of transceiver devices using a first communication medium, the first communication medium comprising a magnetic field; and second means for communicating with the at least one other transceiver device using a second communication medium other than a magnetic field; wherein the transceiver device is operable to: switch from communicating using said second communication medium to communicating using said first communication medium when communication using said second communication medium is interrupted.

The first means for communicating may communicate using a magnetic field having a time-varying magnetic field vector wherein said time-varying magnetic field vector is modulated to encode information to be communicated.

The transceiver device may communicate information comprising locality information associated with the locality in which said transceiver device is located using said first and/or second means for communicating.

The transceiver device may further comprise means for obtaining results of measurements in an area in which the transceiver device is located, wherein said transceiver device is operable to communicate information representing results of said measurements using said first and/or second means for communicating.

The measurements may comprise measurements of environmental conditions prevailing in an area in which said transceiver device is located.

The obtaining means may comprise means for receiving results of measurements is operable to receive the results from a device comprising a sensor for carrying out said measurements.

The sensor device may be integrated with said transceiver device, or may be separate to said transceiver device and the results of the measurements are obtained wirelessly.

The transceiver device may receive information communicated by the at least one other transceiver device using said first and/or second means for communicating and for communicating (e.g. forwarding) said received information to at least one further transceiver device using said first and/or second means for communicating.

The transceiver device may detect interruption communication using said second communication medium wherein the transceiver device is operable to initiate said switch from communicating using said second communication medium to communicating using said first communication medium on detection of said interruption.

The transceiver device may initiate said switch from communicating using said second communication medium to communicating using said first communication medium on receipt of a signal communicated via said first communication medium or another communication medium when said interruption has occurred.

The transceiver device may detect, and differentiate between, a plurality of distinct encoded magnetic fields.

The transceiver device may detect, and differentiate between, a plurality of distinct magnetic fields encoded with information to be communicated, each distinct magnetic field being emitted by a different respective transceiver device; and/or detect a phase, frequency and/or time relationship between the distinct magnetic fields whereby to differentiate between said distinct magnetic fields.

The transceiver device may further comprise means for generating the magnetic field of said first communication medium, for communicating information to said at least one other transceiver device, the magnetic field generating means comprising at least one coil.

The magnetic field generating means may comprise a plurality of coils substantially mutually orthogonally orientated with respect to one another. The magnetic field generating means may generate a rotating magnetic field.

The transceiver device may encode information into said magnetic field by modulating the direction of said time-varying magnetic field vector to encode said information. The direction of said magnetic field vector may correspond to a data symbol.

The transceiver device may encode information into said magnetic field by modulating the change of direction (e.g. phase) of said time-varying magnetic field vector to encode said information. The change of direction (e.g. phase) of said magnetic field vector may correspond to a data symbol.

The transceiver device may to encode information into said magnetic field by modulating said time-varying magnetic field vector to produce a three dimensional time-dependent magnetic field shape (e.g. Hypercomplex coding). The three dimensional time-dependent magnetic field shape of said magnetic field vector may correspond to an identifier of the transceiver device.

The transceiver device may information into said magnetic field by modulating the rate of change of direction of said time-varying magnetic field vector to encode said information. The rate of change of direction of said magnetic field vector may correspond to a data symbol.

Each transceiver device may: receive respective information communicated by each of the plurality of other transceiver devices, using said magnetic field, in a common communication time slot; and communicate said received information to at least one further transceiver device in a further communication time slot.

Each transceiver device may, when communication using said second communication medium is interrupted, determine a communication configuration suitable for communicating with the at least one other transceiver device, and configure the first communicating means based on said communication configuration, whereby said switch from communicating using said second communication medium to communicating using said first communication medium comprises a switch to communicating in accordance with said communication configuration. The communication configuration may comprise a communication configuration optimised to prevailing environmental conditions.

Each transceiver device may determine said communication configuration suitable for communicating with the at least one other transceiver device based on information communicated from the at least one other transceiver device using said first communication medium.

The communication configuration may comprise an identification at least one source of information to be communicated to said transceiver device. The communication configuration may comprise an identification at least one destination for information to be communicated by said transceiver device. The communication configuration may comprise an identification at least one power level to be used for communication of information by said transceiver device.

The transceiver device may receive information from a mobile communication device using said first communication medium (or another wireless communication medium) and to forward said information to said at least one other transceiver device.

The information received from said mobile communication device may comprise information relating to the locality in which the mobile device is located and/or information relating to environmental/communication conditions in the locality in which the mobile device is located.

The transceiver may obtain information identifying a position of said mobile communication device and forward said information identifying a position of said mobile communication device with information identifying the mobile device to said at least one other transceiver device.

The transceiver may: receive information communicated by the at least one other transceiver device of the plurality of other transceiver devices using said magnetic field, or information communicated by another source, the communicated information having an end destination other than the transceiver device receiving the communicated information; and communicate said received information to at least one further transceiver device wherein said further transceiver device comprises either an intermediate destination between the transceiver device receiving the communicated information and the end destination, or said end destination.

According to another aspect of the present invention there is provided a method performed by a communication system for a subterranean environment, the method comprising: a plurality of transceiver devices, each transceiver: communicating with at least one other transceiver device of said plurality of transceiver devices using a first communication medium, the first communication medium comprising a magnetic field; and communicating with the at least one other transceiver device of said plurality of transceiver devices using a second communication medium other than a magnetic field; wherein each transceiver device: switching from communicating using said second communication medium to communicating using said first communication medium when communication using said second communication medium is interrupted.

According to another aspect of the present invention there is provided a method performed by a transceiver device for a subterranean environment, comprising the transceiver device: communicating with at least one other transceiver device of a plurality of transceiver devices using a first communication medium, the first communication medium comprising a magnetic field; and communicating with the at least one other transceiver device using a second communication medium other than a magnetic field; wherein the transceiver device: switches from communicating using said second communication medium to communicating using said first communication medium when communication using said second communication medium is interrupted.

According to another aspect of the present invention there is provided a communication system comprising: a plurality of transceiver devices, each transceiver device comprising: means for communicating with each of a plurality of other transceiver devices using a respective magnetic field; wherein each transceiver device may: receive information communicated by each of the plurality of other transceiver devices, using said magnetic field, in a common communication time slot; and communicate said received information to at least one further transceiver device in a further communication time slot.

According to another aspect of the present invention there is provided a transceiver device comprising: means for communicating with each of a plurality of other transceiver devices using a respective magnetic field; wherein each transceiver device may: receive information communicated by each of the plurality of other transceiver to receive information communicated by each of the plurality of other transceiver devices, using said magnetic field, in a common communication time slot; and communicate said received information to at least one further transceiver device in a further communication time slot. The transceiver device may comprise the additional features recited above.

According to another aspect of the present invention there is provided a method performed by a communication system, the method comprising: a plurality of transceiver devices, each transceiver device: communicating with each of a plurality of other transceiver devices using a respective magnetic field; wherein each transceiver device: receives information communicated by each of the plurality of other transceiver devices, using said magnetic field, in a common communication time slot; and communicates said received information to at least one further transceiver device in a further communication time slot.

According to another aspect of the present invention there is provided a method performed by a transceiver device, the method comprising: communicating with each of a plurality of other transceiver devices using a respective magnetic field; wherein each transceiver device: receives information communicated by each of the plurality of other transceiver to receive information communicated by each of the plurality of other transceiver devices, using said magnetic field, in a common communication time slot; and communicates said received information to at least one further transceiver device in a further communication time slot.

According to another aspect of the present invention there is provided a communication system comprising: a plurality of transceiver devices, each transceiver device comprising: means for communicating with each of a plurality of other transceiver devices using a respective magnetic field; wherein each transceiver device may: receive information communicated by at least one other transceiver device of the plurality of other transceiver devices using said magnetic field, or information communicated by another source, the communicated information having an end destination other than the transceiver device receiving the communicated information; and communicate said received information to at least one further transceiver device wherein said further transceiver device comprises either an intermediate destination between the transceiver device receiving the communicated information and the end destination, or said end destination.

According to another aspect of the present invention there is provided a transceiver device comprising: means for communicating with each of a plurality of other transceiver devices using a respective magnetic field; wherein each transceiver device may: receive information communicated by at least one other transceiver device of the plurality of other transceiver devices using said magnetic field, or information communicated by another source, the communicated information having an end destination other than the transceiver device receiving the communicated information; and communicate said received information to at least one further transceiver device wherein said further transceiver device comprises either an intermediate destination between the transceiver device receiving the communicated information and the end destination, or said end destination. The transceiver device may comprise additional features recited above.

The communication system as described above wherein said communication system may be provided in a subterranean environment.

The communication system may comprise a self organising network of said transceiver devices in which each transceiver device is adapted to self configure and/or re-configure in the event of at least one of the following: a change in prevailing environmental/communication conditions (e.g. the level of local interference); the addition and/or removal of a transceiver device to the communication system; receipt of a control signal; and the movement of a transceiver device within the system.

The transceiver devices being adapted to self configure and/or re-configure in order to reduce the time taken for a message to propagate through the network of said transceiver devices by reducing the number of transceiver devices that a message is likely to be propagated via in order to reach a destination node.

The transceiver devices may be adapted to self configure and/or re-configure in order to increase the reliability with which a message propagates through the network of said transceiver devices by increasing the number of transceiver devices (e.g. to reduce the effective communication distance between the transceiver devices) that a message is likely to be propagated via in order to reach a destination node.

The transceiver devices may be adapted to self configure and/or re-configure in order to optimise requirements of: reducing the time taken for a message to propagate through the network of said transceiver devices, and increasing the reliability with which a message propagates through the network of said transceiver devices.

Each transceiver device may generate a magnetic field having a communication band that does not overlap with a communication band of a magnetic field generated by another of said plurality of transceiver devices. Each communication band may comprise a distinct frequency band.

Each transceiver device may receive information encoded in magnetic fields having a communication band within a predefined bandwidth covering the respective communication bands of each of said transceiver devices.

Each communication band may be encoded using a different orthogonal code whereby said communication band does not overlap with a communication band of a magnetic field generated by another of said plurality of transceiver devices According to another aspect of the present invention there is provided a method performed by a communication system, the method comprising: a plurality of transceiver devices, each transceiver device: communicating with each of a plurality of other transceiver devices using a respective magnetic field; wherein each transceiver device: receives information communicated by at least one other transceiver device of the plurality of other transceiver devices using said magnetic field, or information communicated by another source, the communicated information having an end destination other than the transceiver device receiving the communicated information; and communicates said received information to at least one further transceiver device wherein said further transceiver device comprises either an intermediate destination between the transceiver device receiving the communicated information and the end destination, or said end destination.

According to another aspect of the present invention there is provided a method performed by a transceiver device, the method comprising: communicating with each of a plurality of other transceiver devices using a respective magnetic field; wherein each transceiver device: receives information communicated by at least one other transceiver device of the plurality of other transceiver devices using said magnetic field, or information communicated by another source, the communicated information having an end destination other than the transceiver device receiving the communicated information; and communicates said received information to at least one further transceiver device wherein said further transceiver device comprises either an intermediate destination between the transceiver device receiving the communicated information and the end destination, or said end destination.

According to another aspect of the present invention there is provided a communication system for communicating using magnetic fields, the system comprising: a network including plurality of beacons, each beacon comprising: means for generating an encoded magnetic field for use in communication; wherein each beacon may configure or re-configure said magnetic field in response to receipt of an indication of a change in conditions in said network.

According to another aspect of the present invention there is provided a beacon for use in a communication system for communicating using magnetic fields having network including plurality of such beacons, the beacon comprising means for generating an encoded magnetic field for use in communication wherein each beacon may configure or re-configure said magnetic field in response to receipt of an indication of a change in conditions in said network.

The change in network conditions may comprise at least one of the following: a change in prevailing environmental/communication conditions (e.g. a level of local interference); the addition and/or removal of a transceiver device to the communication system; a change in, or an initial configuration of, coverage required of said generated magnetic field; and the movement of a transceiver device within the system.

The beacon may receive said indication of a change in network conditions from a sensor device operable to detect said generated magnetic field. The sensor device may form part of said beacon. The sensor device may be separate to said beacon.

The beacon may receive said indication of a change in network conditions from a network control node. And/or may receive said indication of a change in network conditions from another beacon of said network. The indication of a change in network conditions received from said another beacon of said network may be encoded in a magnetic field generated by said another beacon.

The beacon may further comprise means for detecting the magnetic field generated by another beacon of said network and for determining a change in network conditions based on said detected magnetic field, wherein said beacon is operable to provide an indication of the determined change in conditions in said network to another beacon of said network and/or to a network control node.

The indication of the determined change in conditions in said network may be encoded in a magnetic field generated by said beacon.

The beacon may configure or re-configure the coverage of said magnetic field in response to receipt of said indication of conditions in said network. The beacon may configure or re-configure the extent of coverage (e.g. the power used to generate the field) of said magnetic field in response to receipt of said indication of conditions in said network. The beacon may configure or re-configure the shape of coverage of said magnetic field in response to receipt of said indication of conditions in said network. The beacon may configure or re-configure the encoding of said magnetic field in response to receipt of said indication of conditions in said network.

According to another aspect of the present invention there is provided a communication system for communicating using magnetic fields, the system comprising: at least one beacon comprising means for generating an encoded magnetic field for communication with another device; at least one detection device comprising means for detecting said generated magnetic field and for providing information associated with said detected magnetic field for use in configuring or reconfiguring said magnetic field; wherein the beacon is operable to configure or reconfigure said generated magnetic field in dependence on said information provided by said detection device.

According to another aspect of the present invention there is provided a beacon for use in a communication system of for communicating using magnetic fields, the beacon comprising: means for generating an encoded magnetic field for communication with another device; means for receiving information associated with a detected magnetic field for use in configuring or reconfiguring said magnetic field; means for configuring or reconfiguring said encoded magnetic field in dependence on said received information.

The means for generating a magnetic field may comprise at least one coil under the control of a controller. The means for generating a magnetic field may comprise a plurality of coils substantially mutually orthogonally orientated with respect to one another. The means for generating a magnetic field may generate a rotating magnetic field.

The means for generating an encoded magnetic field may encode information relating to the magnetic field beacon. The information encoded in the magnetic field may comprise a correlation code, and/or identifier of the beacon, wherein the identifier is defined by an identifying code (which may be unique).

The identifying code may have a portion that is common to the identifiers of a group of beacons. At least one portion of the identifying code may identify a group of beacons to be within a particular building (or area).

At least one portion of the identifying code may identify a group of beacons to be within a particular geographical region. The identifying code may be unique within a particular building or area, unique within a particular region, and/or globally unique.

The beacon may comprise means for communicating via a network.

The magnetic field may be encoded by modulating the direction of said time-varying magnetic field vector to encode said information. The direction of said magnetic field vector corresponds to a data symbol.

The magnetic field may be encoded by modulating the change of direction (e.g. phase) of said time-varying magnetic field vector to encode said information. The change of direction (e.g. phase) of said magnetic field vector corresponds to a data symbol.

The magnetic field may be encoded by modulating said time-varying magnetic field vector to produce a three dimensional time-dependent magnetic field shape (e.g. Hypercomplex coding). The three dimensional time-dependent magnetic field shape of said magnetic field vector may correspond to an identifier of the beacon.

The magnetic field may be encoded by modulating the rate of change of direction of said time-varying magnetic field vector to encode said information. The rate of change of direction of said magnetic field vector may correspond to a data symbol.

The beacon may further comprise means for receiving a wireless signal. The information associated with a detected magnetic field for use in configuring or reconfiguring said magnetic field may be received using the means for receiving a wireless signal.

The beacon may further comprise means for detecting a magnetic field. The information associated with a detected magnetic field for use in configuring or reconfiguring said magnetic field may be received using the means for detecting a magnetic field.

The information associated with a detected magnetic field may comprise information relating to properties of a detected magnetic field.

The information associated with a detected magnetic field comprises at least one of: signal strength, error level in signal, noise levels, detected signal.

The information associated with a detected magnetic field comprises information relating to other magnetic field beacons removed and/or inserted into the magnetic field communication system.

According to another aspect of the present invention there is provided a detection device for use in a communication system described above, the device forming part of a magnetic field beacon as described above, the device comprising: means for detecting a magnetic field; means for providing feedback based on said detected magnetic field.

The detection device may comprise means for generating a wireless signal. The means for generating a wireless signal may comprise at least one of: WiFi module, Zigbee module, mobile communication module (e.g. GSM, GPRS, 3G), radio transmitter.

The feedback may comprise information relating to properties of a detected magnetic field. The feedback information may comprise at least one of: signal strength, error level in signal, noise levels, detected signal. The feedback may comprise information relating to magnetic field beacons which have been removed and/or inserted into the communication system.

According to another aspect of the present invention there is provided a method performed by a communication system of communicating using magnetic fields, the method comprising: a network including plurality of beacons, each beacon: generating an encoded magnetic field for use in communication; wherein each beacon configures or re-configures said magnetic field in response to receipt of an indication of a change in conditions in said network.

According to another aspect of the present invention there is provided a method performed by a beacon in a communication system of communicating using magnetic fields having network including plurality of such beacons, the method comprising: generating an encoded magnetic field for use in communication wherein each beacon configures or re-configures said magnetic field in response to receipt of an indication of a change in conditions in said network.

According to another aspect of the present invention there is provided a method performed by a communication system of communicating using magnetic fields, the method comprising: at least one beacon comprising generating an encoded magnetic field for communication with another device; at least one detection device detecting said generated magnetic field and for providing information associated with said detected magnetic field for use in configuring or reconfiguring said magnetic field; wherein the beacon configures or reconfigures said generated magnetic field in dependence on said information provided by said detection device.

According to another aspect of the present invention there is provided a method performed by a beacon in a communication system of communicating using magnetic fields, the method comprising: generating an encoded magnetic field for communication with another device; receiving information associated with a detected magnetic field for use in configuring or reconfiguring said magnetic field; configuring or reconfiguring said encoded magnetic field in dependence on said received information.

According to another aspect of the present invention there is provided a method performed by a detection device in a communication system described above, the device forming part of a magnetic field beacon described above, the method comprising: detecting a magnetic field; providing feedback based on said detected magnetic field.

According to one aspect of the present invention there is provided a system for providing locality information to a user, the system comprising at least one magnetic field beacon, each beacon having an identifier for identifying said beacon, and comprising means for generating a magnetic field encoded with the identifier of the beacon; a server for storing said identifier in association with locality information; and a communication device comprising: means for detecting the encoded magnetic field emitted by the at least one beacon; means for extracting the identifier from said detected magnetic field; means for retrieving the locality information stored in association with said extracted identifier by said server; and means for providing said retrieved locality information to said user.

According to another aspect of the present invention there is provided a communication device for providing locality information to a user, the device comprising: means for detecting a magnetic field emitted by a beacon, said magnetic field being encoded with an identifier associated with the beacon; means for extracting said identifier from said detected magnetic field; means for retrieving locality information associated with said extracted identifier; and means for providing said retrieved locality information to said user.

The communication device may comprise a mobile telephone.

The means for detecting a magnetic field may comprise a magnetometer.

The extracting means may extract the magnitude of the magnetic field and/or the polarisation of the field.

The magnetometer may comprise a magnetometer operable as a direction finding device (e.g. a compass).

The retrieving means may be operable to retrieve said locality information via an internet connection. The retrieving means may be operable to retrieve said locality information via a connection to a telecommunications network. The retrieving means may be operable to retrieve said locality information from a memory of the mobile device.

The detecting means may be operable to detect, and differentiate between, a plurality of distinct encoded magnetic fields. The detecting means may be operable to detect, and differentiate between, a plurality of distinct encoded magnetic fields each emitted by a different respective beacon. The detecting means may be operable to detect a phase relationship between a number of distinct magnetic fields whereby to differentiate between said distinct fields.

The detecting means may be operable to use the phase relationship between the number of distinct signals to determine the communication device's position relative to an origin of each said distinct signals.

The communication device may further comprise means for storing locality information relating to each beacon of a group of beacons in association with a respective identifier for each beacon prior to said detection of said beacon, wherein the retrieving means may be operable to retrieve said locality information associated with said extracted identifier from said locally stored locality information on detection of said beacon.

The retrieving means may be operable to retrieve said locality information relating to each beacon of the group, from a remote source, for storage by said storing means.

The retrieving means may be operable to retrieve said locality information relating to each beacon of the group from said remote source in response to detection of a beacon configured to trigger said retrieval of said locality information relating to each beacon of the group.

The storing means may be operable to store said locality information relating to each beacon of the group in response to a specific request by said user.

The storing means may be operable to store said locality information relating to each beacon of the group as part of a process for configuring said device to operate within a localisation system.

The identifier of the beacon may be defined by a unique identifying code. The unique identifying code may have a portion that is common to the identifiers of a group of beacons. At least one portion of the identity code may identify a group of beacons to be within a particular building (or area). At least one portion of the identity code may identify a group of beacons to be within a particular geographical region. The unique identifying code may be unique within a particular building or area, unique within a particular region and/or globally unique.

According to another aspect of the present invention there is provided a magnetic field beacon for use in a localisation system, the beacon having an identifier for identifying said beacon, and comprising means for generating a magnetic field encoded with the identifier of the beacon.

The means for generating a magnetic field may comprise at least one coil under the control of a controller. The means for generating a magnetic field may comprise a plurality of coils substantially mutually orthogonally orientated with respect to one another. The means for generating a magnetic field may be operable to generate a magnetic field with spatial and/or time dependent properties. The means for generating a magnetic field may be operable to generate a rotating magnetic field.

The identifier of the beacon may be defined by a unique identifying code. The unique identifying code may have a portion that is common to the identifiers of a group of beacons. At least one portion of the identity code may identify a group of beacons to be within a particular building (or area). At least one portion of the identity code may identify a group of beacons to be within a particular geographical region. The unique identifying code may be unique within a particular building or area. The unique identifying code may be unique within a particular region. The unique identifying code may be globally unique.

The beacon may comprise means for communicating via a network.

The beacon may comprise means for detecting a magnetic field emitted by another beacon.

According to another aspect of the present invention there is provided a server for use in a localisation system, the server comprising: means for storing an identifier of a beacon; means for storing locality information in association with said identifier; means for receiving a locality information request from a communication device wherein said request comprises an identifier of a beacon detected by the communication device; means for retrieving the requested locality information based on said identifier received in said request; and means for sending the retrieved locality information to said communication device. The server may form part of a mobile device. The server may be located externally to a mobile device, and within a wide area network (WAN). The server may be located externally to a mobile device, and within a local area network (LAN).

The locality information may comprise at least one of positioning information, educational information, descriptive information, and/or advertising information. The locality information may comprise media content (for example, at least one of text, audio, video, and/or the like).

According to another aspect of the present invention there is provided a method, performed by a system, of providing locality information to a user, the method comprising: storing, at a server, an identifier of a magnetic field beacon in association with locality information related to that beacon; and generating, using at least one magnetic field beacon, a magnetic field encoded with an identifier of the beacon; detecting, using a communication device, the encoded magnetic field generated by the at least one beacon; extracting, using the communication device, the identifier from said detected magnetic field; retrieving, using the communication device, the locality information stored in association with said extracted identifier by said server; and providing said retrieved locality information to said user.

According to another aspect of the present invention there is provided a method, performed by a communication device, of providing locality information to a user, the method comprising: detecting a magnetic field emitted by a beacon, said magnetic field being encoded with an identifier associated with a location of the further device; extracting said identifier from said detected magnetic field; retrieving locality information associated with said extracted identifier; and providing said retrieved locality information to a user.

The method may further comprise obtaining the results of measurements for use in enhancing the locality information. The measurements may comprise at least one of: accelerometer measurements, gyroscope measurements, magnetic compass measurements, geographical positioning measurements, visual measurements and network signal measurements.

The measurement results may be used to enhance the locality information by means of a Kalman filter and/or a particle filter and/or information filter.

According to another aspect of the present invention there is provided a method performed by a magnetic field beacon in a localisation system, the beacon having an identifier for identifying said beacon, the method comprising generating a magnetic field encoded with the identifier of the beacon.

The encoded magnetic field may be encoded using at least one of: Time Division Multiple Access (TDMA), Code Division Multiple Access (CDMA) or Frequency Division Multiple Access (FDMA).

The encoding of the magnetic field may be encoded using a three dimensional time-dependent magnetic field shape (e.g. Hypercomplex coding).

According to another aspect of the present invention there is provided a method performed by a server, the method comprising: storing a plurality of identifiers, each identifier being associated with a respective beacon; storing locality information relating to a location of each beacon in association with said identifier; receiving a request for locality information from a communication device, wherein said request comprises an identifier of a beacon detected by said communication device; retrieving the requested locality information based on said identifier received in said request; and sending the retrieved locality information to said communication device.

According to another aspect of the present invention there is provided a beacon comprising means for generating a magnetic field having a predefined time-dependent shape.

The predetermined time-dependent shape of the magnetic field may provide a means for determining a relative location to said beacon. The predetermined time-dependent shape may be configured to represent an identity of the beacon. The predetermined time dependent shape may correspond to a rotating magnetic dipole of variable strength at the beacon.

According to another aspect of the present invention there is provided a communication device comprising: means for detecting a three-dimensional time-dependent magnetic field; means for extracting temporal and/or spatial properties of said magnetic field; means for comparing a predicted temporal and/or spatial properties with said extracted temporal and/or spatial properties; and means for determining a location of said communication device relative to said source of said magnetic field based on said comparison.

According to another aspect of the present invention there is provided a method performed by a beacon, the method comprising: generating a magnetic field with a time-dependent shape.

According to another aspect of the present invention there is provided a method performed by a communication device, the method comprising: detecting a three-dimensional time-dependent magnetic field; extracting temporal and/or spatial properties of said magnetic field; comparing predicted temporal and/or spatial properties with said extracted temporal and/or spatial properties; and determining a location of said communication device relative to a source of said magnetic field based on said comparison.

Determining a location of said communication device may further comprise extracting the magnetic field strength and extracting a distance based on said magnetic field strength.

Determining a location of said communication device may comprise extracting an angular position relative to said source based on said extracted temporal and/or spatial properties.

Comparing predicted temporal and/or spatial properties of said magnetic field with said extracted temporal and/or spatial properties may comprise: performing a cross-correlation between the predicted magnetic field and the extracted magnetic field; and may comprise detecting a peak in the output of said cross-correlation.

Detecting a peak in the output of the cross-correlation may utilise at least one of: least mean squares, genetic algorithms or an exhaustive search.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processing unit and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

Furthermore, features implemented in hardware may generally be implemented in software, and vice versa. Any reference to software and hardware features herein should be construed accordingly.

It is envisaged that aspects of the system, devices and/or method described herein may be implemented in software running on a computer such as a personal computer or a receiver/decoder, and it is to be appreciated that inventive aspects may therefore reside in the software running on such devices.

Other aspects of this system, the device and/or method may be implemented in software running on various interconnected servers, and it is to be appreciated that inventive aspects may therefore reside in the software running on such servers.

The invention also extends to a server or a plurality of interconnected servers running software adapted to implement the system or method as herein described.

The invention extends to any novel aspects or features described and/or illustrated herein.

Embodiments of the invention are particularly advantageous because they can be implemented using the existing components of many mobile phones, allowing precise positioning information and/or other location related information to be derived, where the appropriate infrastructure is in place, and using the associated methods as described herein. Constant, or slowly varying magnetic fields are also generally more pervasive than radio frequency signals as currently used in mobile/cellular communications systems, so will be able to penetrate solid objects making 'building wide' coverage possible. For example, the existing magnetometer of a mobile phone may be adapted to detect properties of encoded magnetic fields, to distinguish between different fields, to determine a precise position and/or to obtain other location related information.

The present invention will now be described by way of example with reference to the accompanying drawings, in which:

FIG. 7 shows the mobile device detecting a field from one, two and three local units;

Figure 24:
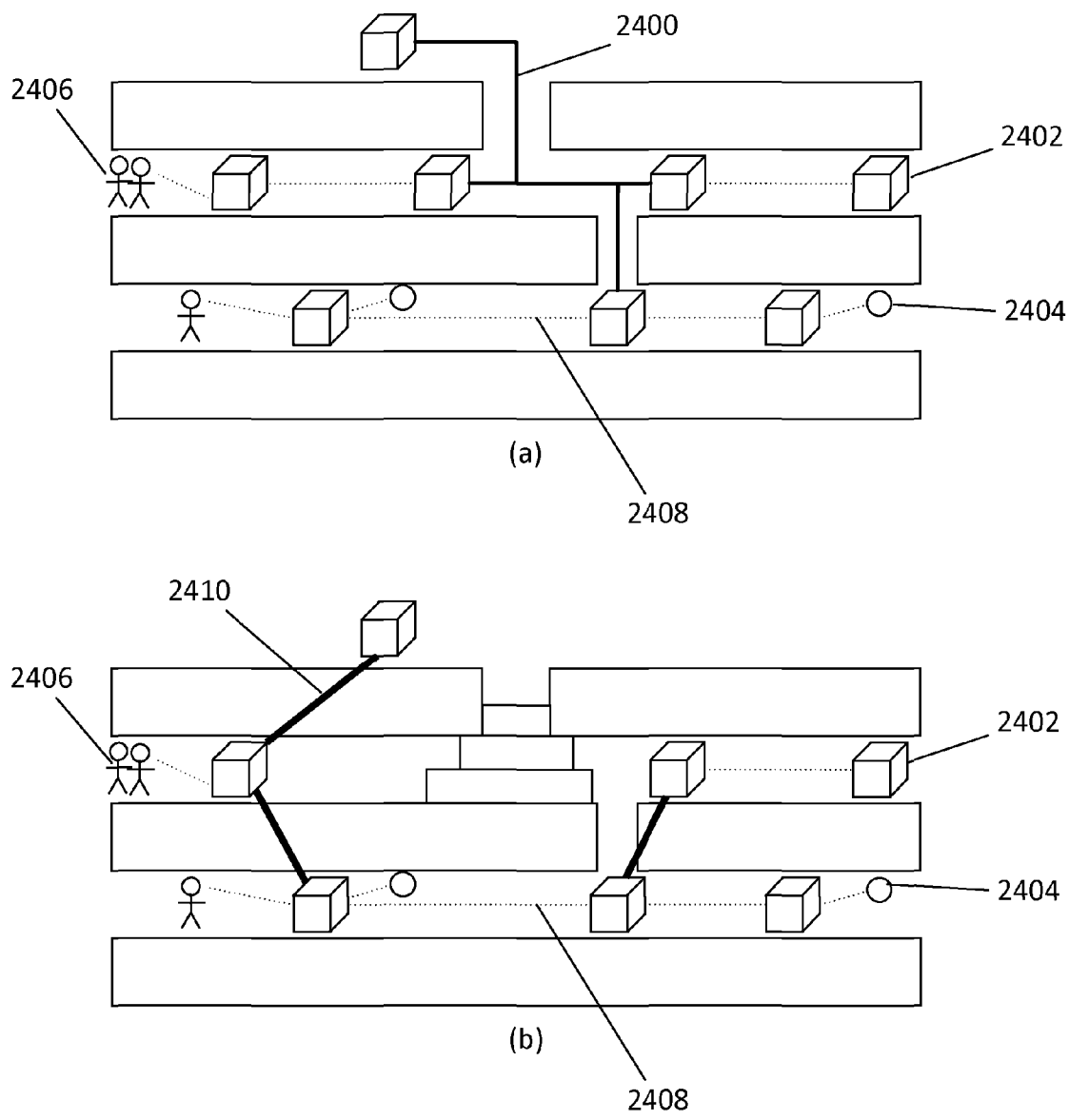
Figure 25:
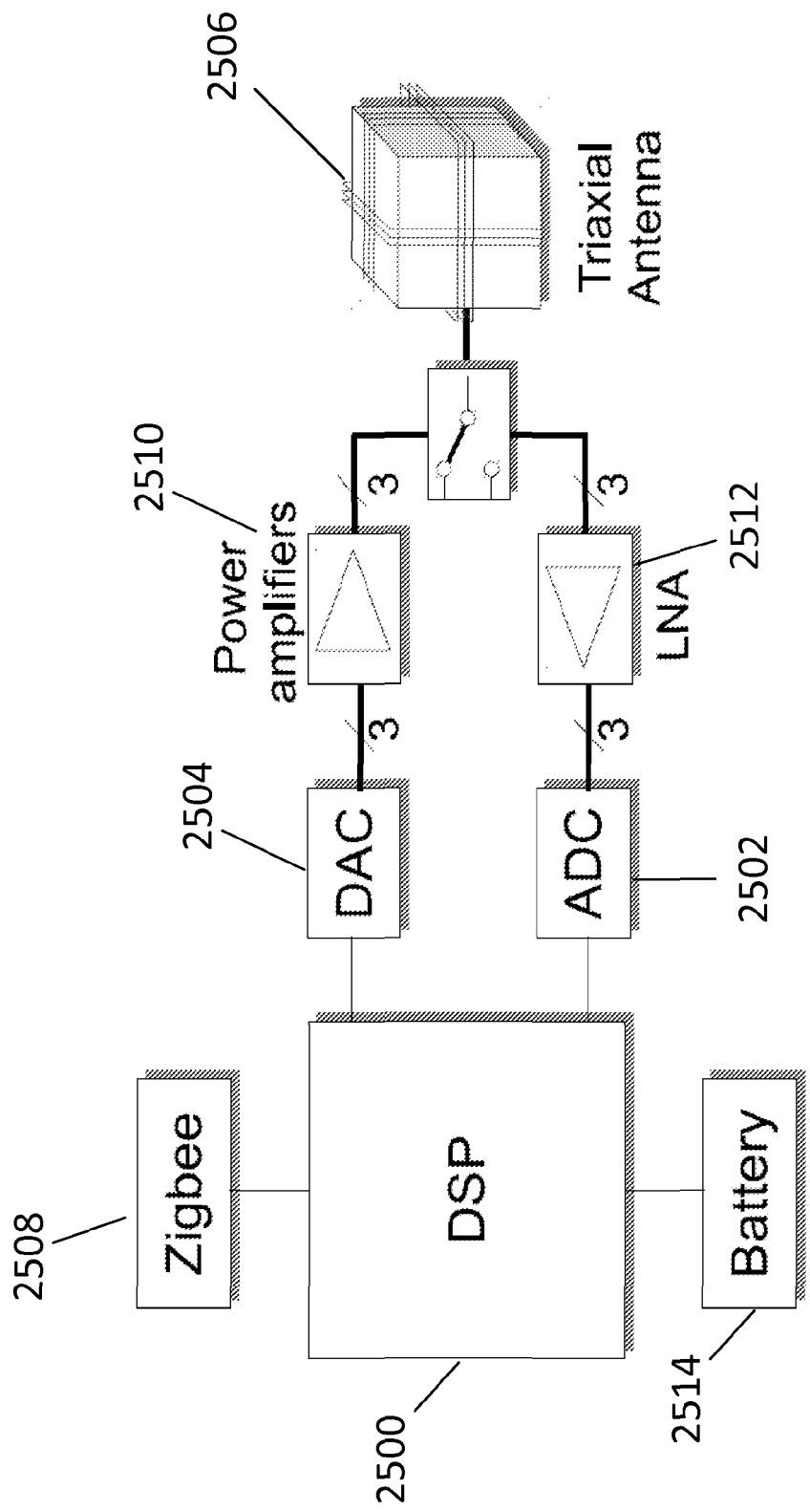
Figure 26:
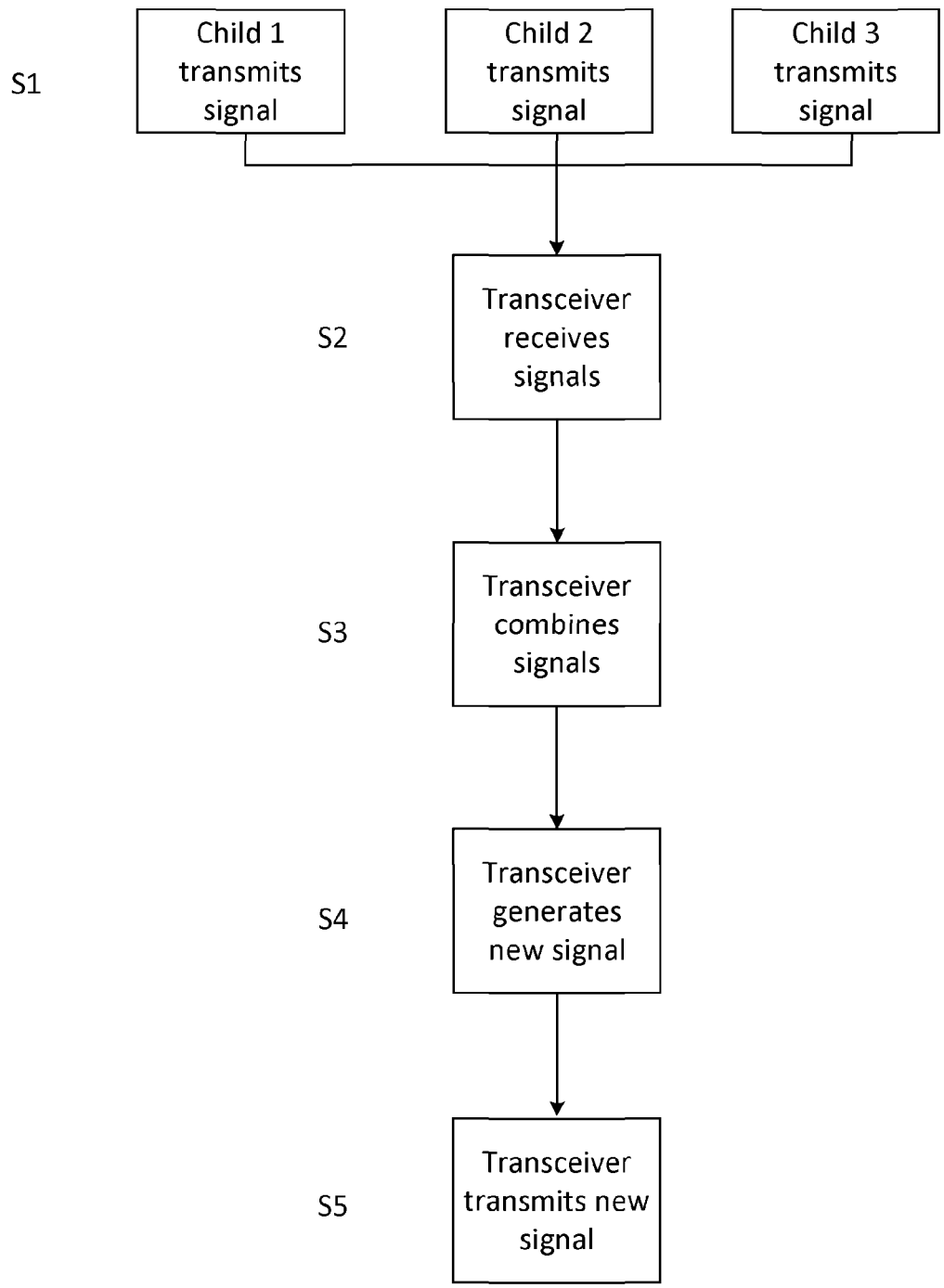
Figure 27:
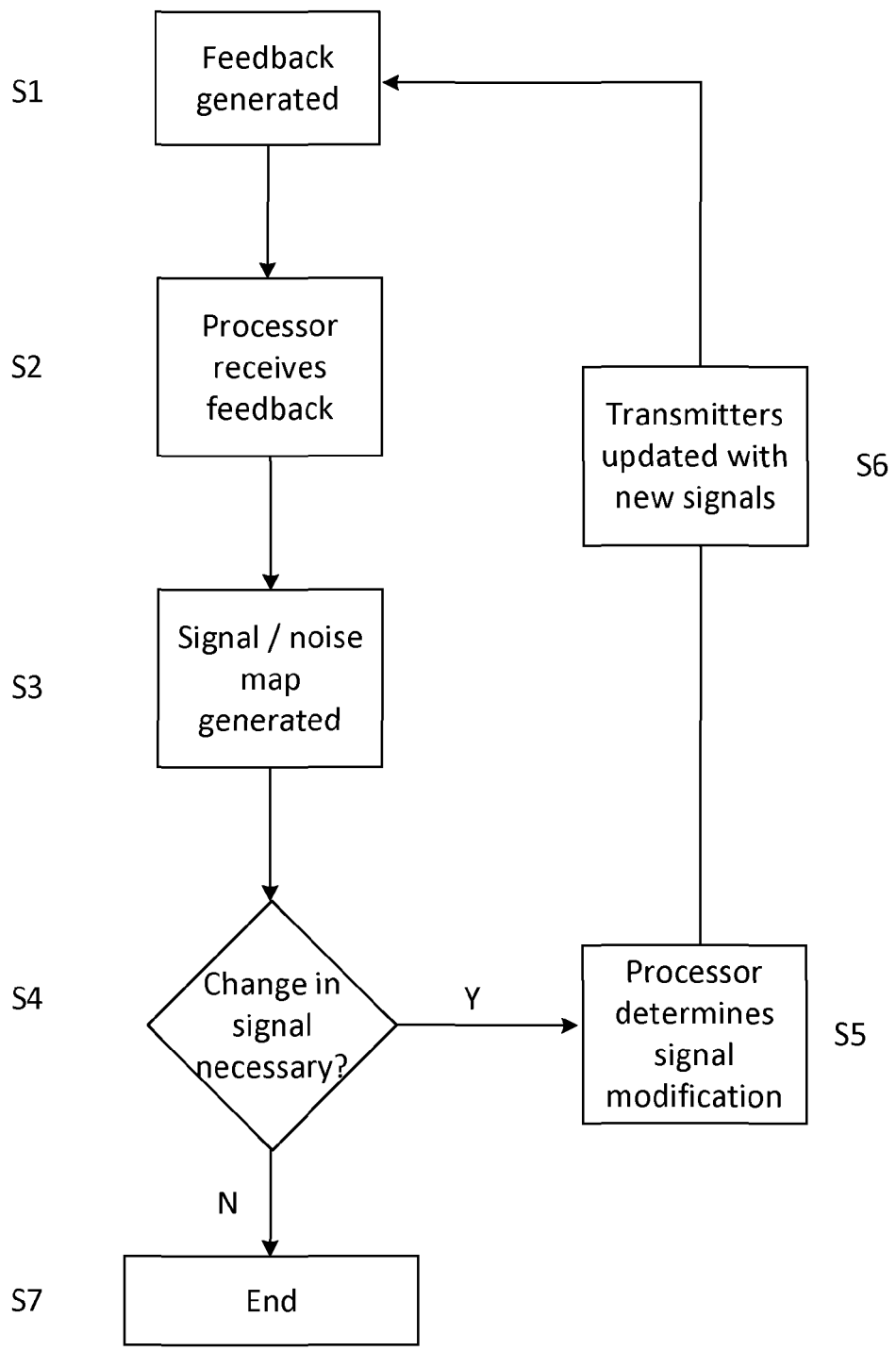
Figure 28:
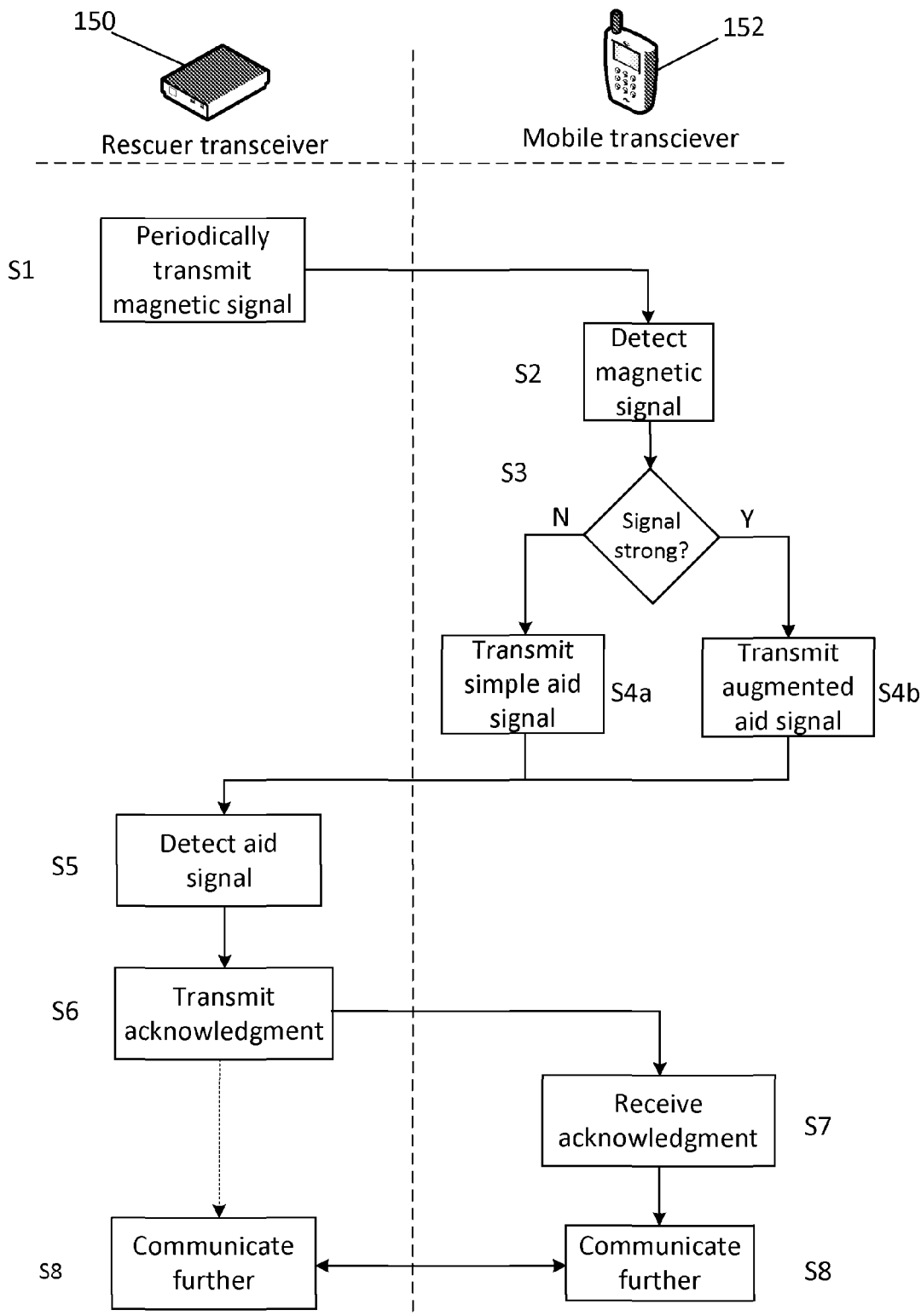

FIGS. 23(a) and 23(b) illustrate two examples of a 'multi-hop' network;

FIGS. 24(a) and 24(b) illustrate an example communication network in a mine before and after a collapse;

FIG. 25 shows an example transceiver node as utilised in the network of FIG. 24;

FIG. 26 shows a simplified flow diagram of an example multihop network;

FIG. 27 shows an example feedback loop which may be used in a number of the systems described herein; and FIG. 28 shows a simplified flow diagram of an example method used to communicate with a trapped mobile device.

OVERVIEW

Figure 1:
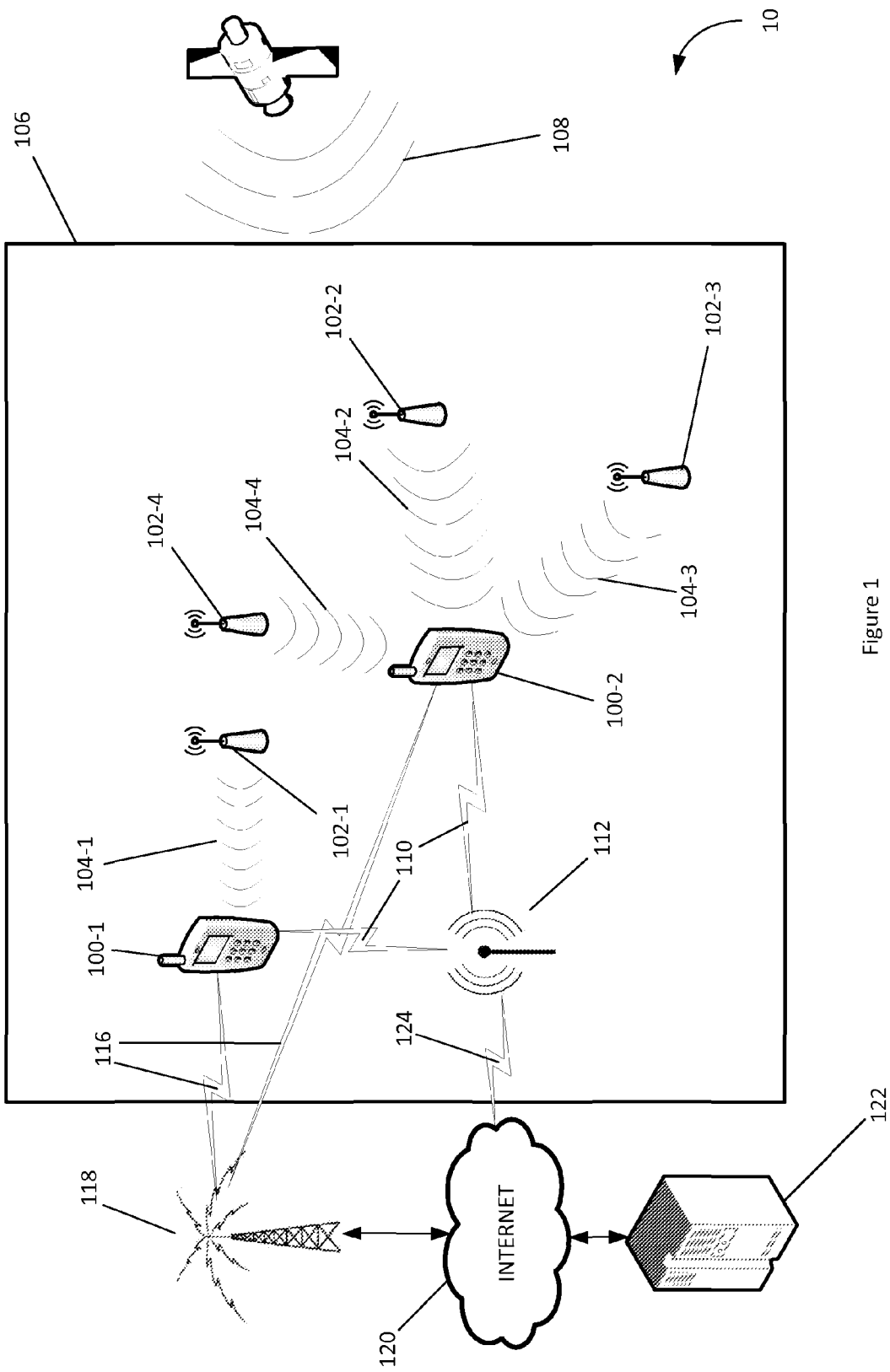
FIG. 1 shows, in simplified overview, a localisation system.

FIG. 1 shows two possible implementations of a system 10 for enhancing localisation. The system 10 is shown to be in an environment 106 in which accurate satellite positioning is difficult, or impossible, because GPS signals 108 are inhibited. The environment 106 could comprise, for example, a location: inside a building; underground; underwater or any other location in which GPS signals 108 are either non-propagating, subject to severe multipath, or are weak. Whilst the system is particularly advantageous in such environments, the system could also be used beneficially in locations where accurate GPS positioning is possible.

The system 10 comprises a plurality of mobile devices 100-1, 100-2 and a plurality of local units 102-1, 102-2, 102-3, 102-4. Local units 102 are also referred to herein as 'magnetic beacons' or simply 'beacons'.

Each local unit 102 is operable to emit a magnetic field 104-1, 104-2, 104-3, 104-4, which is encoded with locality information representing a unique identity of the local unit 102 (e.g. a completely unique identity, or an identity that is unique within a predetermined locality such as a building or other geographical area).

The encoding is facilitated by altering one or more of the following field 104 properties: power, phase, frequency, in either a spatial or temporal fashion, or both. The encoding is preferably controlled by digital means, but could be manual using DIP switches or similar. The encoding of the magnetic field and the means for generating it is described in more detail below.

Each mobile device is operable to interpret the encoded field, by extracting the code from the field 104, and to determine the unique identity of the associated local unit 102 accordingly. The mobile device 100 then uses this unique identity to retrieve further associated locality information relating to the location in which the corresponding local unit 102 is installed. The locality information may include, for example: positional information such as geographic co-ordinates (e.g. GPS, OS grid reference, longitude, latitude, altitude etc.), floor number, room number, parking bay identifier or the like; and/or educational, instructive or informative information associated with the location such as information on a museum exhibit, next exhibit in a particular tour, nearest fire exits, nearest exit from a car park to a shopping mall, etc. The information may, for example, comprise audio or text descriptions, videos, and or images.

As seen in FIG. 1, in a first of the illustrated implementations 10-1, a single local unit 102-1 emits an encoded magnetic field 104-1 which is received by a magnetometer (not shown) of a mobile device 100-1. The mobile device 100-1 then interprets the encoding of the field 104-1 and, based on this interpretation, determines an identity of the origin (the local unit 102-1) of the field 104-1. Once the originating device is identified, the mobile device is able to retrieve location-specific information associated with that device.

In this embodiment, the mobile device 100-1 retrieves the location-specific information from a server 122, via a further communications link 110, 112, 116, 118, 124, and an information network such as the internet 120. The communications link 110, 112, 116, 118, 124, may comprise any suitable communications link including, for example: a connection 110 via a Wi-Fi transmitter 112 which connects to the internet 120 via connection 124; or via a connection 116 made to a base station 118 of a conventional mobile telecommunications network, which can retrieve data from and transmit data to the internet 120. The server 122 provides location information in association with the local unit 102 identity, via the internet 124, to the mobile device 100-1 using the connections mentioned.

This first implementation may also be used for tracking applications even where the local units 102 are relatively sparsely populated. For example, if there are a number of relatively spread apart local units 102 (e.g. at a distance such that the mobile device 100-1 can only ever detect the field emitted from a single local unit), the general location of the mobile device 100-1 can still be determined each time the mobile device 100-1 detects the field emitted by one of the local units 102. This will give information on location as a function of time, which can be extrapolated and/or interpolated when the mobile device 100-1 is out of range of a magnetic field, with increasing accuracy as the number and frequency of local units 102 increases.

In a second implementation 10-2, also illustrated in FIG. 1, the system comprises a plurality of relatively closely spaced local units 102-2,3,4 which emit encoded magnetic fields 104-2,3,4 that can be detected, substantially simultaneously, by a magnetometer (not shown) of a mobile device 100-2.

The mobile device 100-2 detects the magnitudes, relative phases and/or frequencies magnetic fields 104-2, 3, 4 which can be used to determine an accurate position relative to the sources of the fields 102-2, 3, 4. This information, coupled with locality information (e.g. geographic coordinates) associated with each source, and retrieved based on the encoded identity of that source (extracted from each magnetic field as described above) can thus be used to derive a relatively accurate position for the device 100-2. If the device 100-2 picks up three or more fields 104, for example, an extremely precise location can be pinpointed (as described in more detail below).

It can be seen, therefore, that by using the magnetometer provided in the mobile devices, locality information comprising a relatively accurate position can be derived even when conventional satellite positioning is unavailable. Moreover, the system disclosed herein allows enhanced locality information to be retrieved in addition to (or as an alternative to) the position. For example, using this technique, not only can an essentially two dimensional position be derived (e.g. as defined by geographic co-ordinates) but also enhanced locality information can be retrieved such as a floor number and/or room identifier in a multi-story building. Further, in another example, the system could be used to provide greatly enhanced navigation in a below surface mass transportation network (such as the Paris metro, London underground or New York subway) allowing a user to obtain and follow complex route information encompassing the main transport routes both above and below ground.

It will be appreciated that although retrieval of information from a remote source other than the local unit (e.g. the internet) can be beneficial where very large quantities of information are involved, or to allow a user to browse for specific information in which they are interested, the encoding techniques described herein allow a significant amount of localisation information to be transmitted by the local unit itself. Hence, advantageously, in many applications the mobile device could potentially obtain a significant quantity of relevant information that is encoded in the magnetic field produced by the local unit itself, without needing to retrieve information from another source at all. This is particularly useful in situations where the mobile device has poor communications coverage, for example underground, or at a distance from the nearest base station.

Mobile Device

Figure 2:
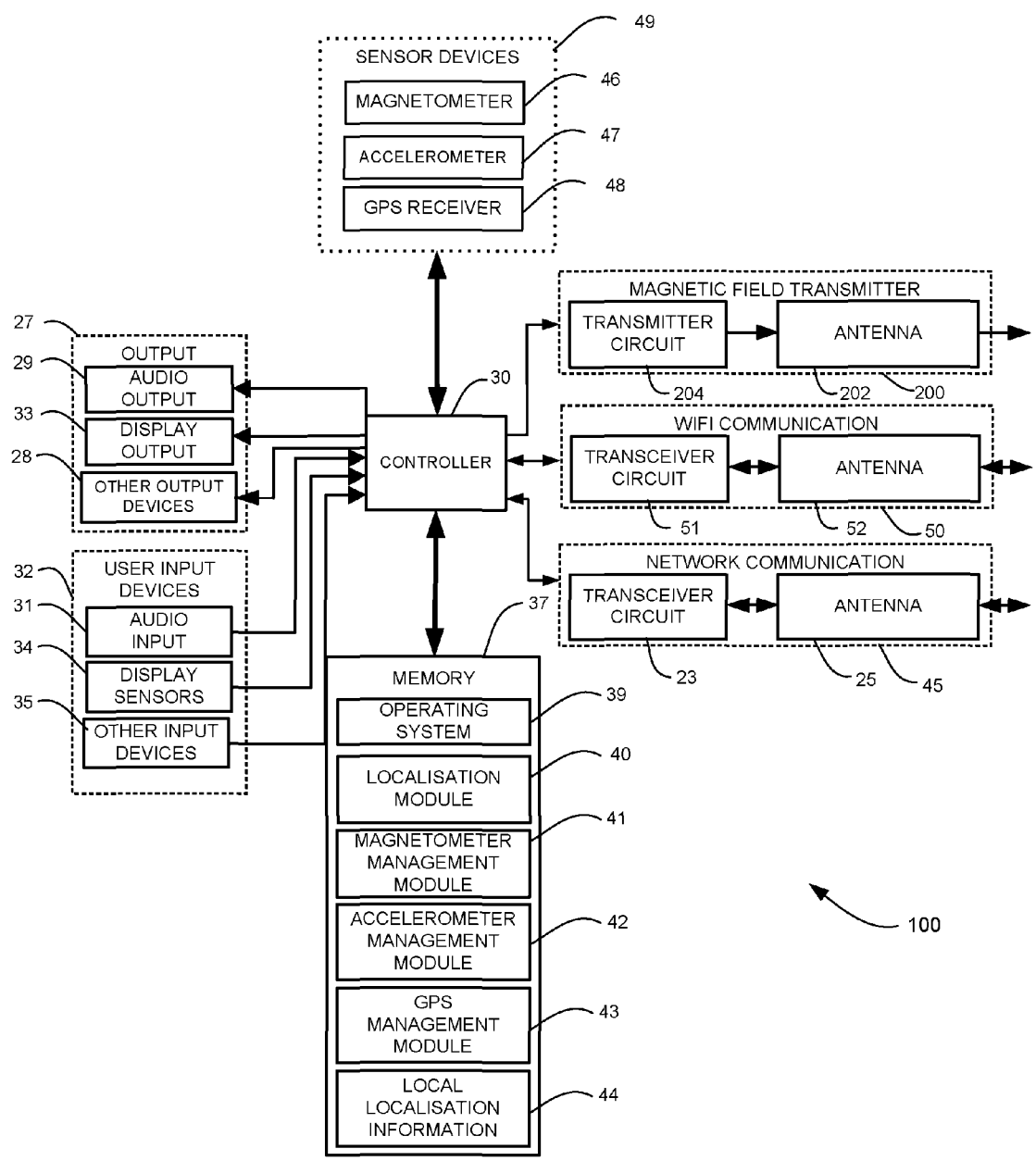
FIG. 2 illustrates schematically the main components of a mobile device forming part of the system shown in FIG. 1.

In FIG. 2, the main components of the mobile device 100 are illustrated schematically.

As seen in FIG. 2, the mobile device 100 comprises a mobile (cellular) telephone such as 'smartphone' or the like. The mobile device 100 includes a network communication section 45 and a Wi-Fi communication section 50. Each of the sections 45, 50 comprise respective transceiver circuits 23, 51 and respective antennae 25, 52. It will be appreciated that whilst the different sections 45, 50 have been shown separately for clarity they may use common components including, for example, a single antenna.

The mobile device 100 also includes a mobile device controller 30 which controls the operation of the mobile device 100 and which is connected to the Wi-Fi communication section 50, network communication section 45, a plurality of output devices 27, a plurality of user input devices 32 and a plurality of sensor devices 49.

The sensor devices 49 include a magnetometer 46, an accelerometer 47 and a GPS receiver 48. The output devices 27 include an audio output device 29 having a loudspeaker, a display output device 33 comprising a screen and other output devices 28 (such as a vibrating device or a printer). The input devices 32 include an audio input device 31 (a microphone), a physical keypad, camera, touch screen etc. The magnetometer 46 has means for measuring all three directional components of an applied magnetic field.

The controller 30 operates in accordance with software instructions stored within memory 37. As shown, these software instructions include, amongst other things, an operating system 39 which governs the operation of the components of the mobile device 100 and provides a user interface. The software instructions also comprise a localisation module 40, a magnetometer management module 41, an accelerometer management module 42, and a GPS management module 43.

The localisation module 40 operates, in conjunction with the magnetometer management module 41, to identify the origin of the encoded magnetic fields emitted by the local units 102. The localisation module 40 also manages the retrieval of remotely stored locality information associated with an identified local unit 102 via the Wi-Fi or network communication sections 45, 50 and the internet (or a local intranet) from the server 122. Moreover, the localisation module 40 is operable to store the retrieved locality information, in association with the identity of the local unit 102 to which it relates, as local locality information 44 for retrieval by the localisation module 40 as required. The magnetometer management module 41, accelerometer management module 42, and GPS management module 43 respectively manage operation of the magnetometer 46, accelerometer 47 and GPS receiver 48 respectively.

The mobile device 100 may optionally comprise, or be connectable to (either wirelessly or by wires) a magnetic field transmitter 200 which is operable to generate a magnetic field. Magnetic field transmitter 200 comprises a transmitter circuit 204 and an antenna 202 and is controlled by controller 30. Magnetic field transmitter 200 may operate as a local unit 102 in certain circumstances as described below.

Local Unit

Figure 3:
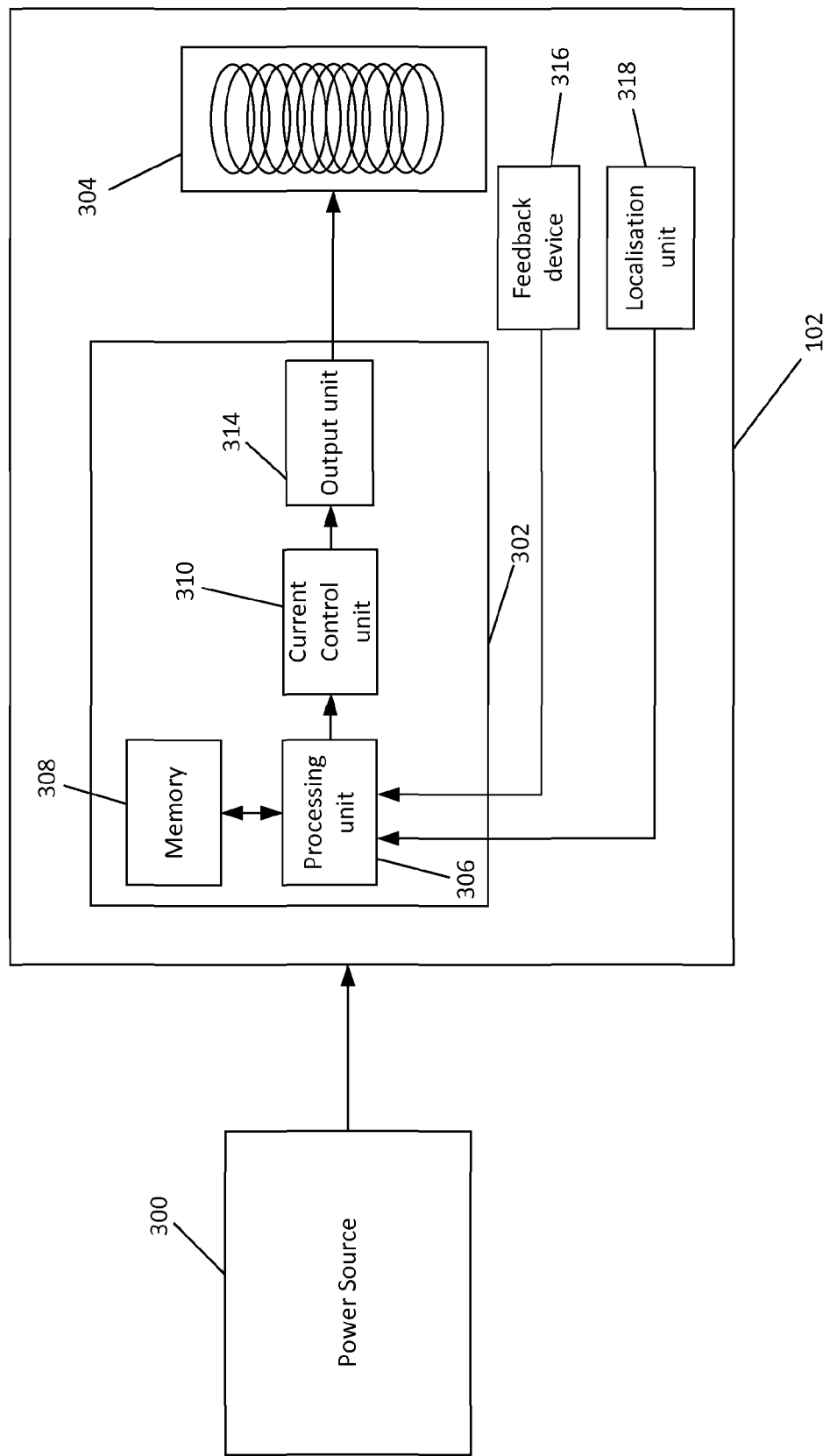
FIG. 3 illustrates schematically the main components of a local unit forming part of the system shown in FIG. 1.

In FIG. 3, the main components of the local unit 102 are illustrated schematically.

Each local unit 102 comprises a beacon operating under power from a local power source 300 and comprises a control unit 302 and a coil 304. The coil 304 comprises a coil of electrically conductive material for producing the encoded magnetic field, when a current is passed along it under the control of the control unit 302. The control unit 302 operates to control the properties of the current to enable a magnetic field to be produced, encoding a predefined identity of the local unit 102, as required.

The control unit 302 comprises a processing unit 306, memory 308, current control unit 310 and an output unit 314. The memory 308 stores information relating to the local unit's 102 identity, and to the encoding used by the local unit 102. The identity is represented by an identity code such as a serial number or other such code. The identity code may be allocated arbitrarily or may be structured with part of the code being common to a group of local units having a particular attribute in common. For example, one or more portions of the identity code could each be common to local units 102 located in a particular geographical area or sub-area (e.g. country, state or county, town etc.), another portion of the code could be common to local units in a particular building or at a particular address. Such a structured identity code would help in the generation of an efficient 'look up' table or database making then retrieval (and local storage) of locality information more efficient. The encoding information includes information identifying the particular time-dependent form of the desired magnetic field.

The device identity data and encoding information are retrieved from the memory 108 by processing unit 106. The processing unit 106 then calculates the time-dependent form of the current that needs to be passed through the coil 304 in order to generate the desired time-dependent field. This may be done in real-time, with the processing unit 106 repeatedly accessing memory 108 and sending associated real-time instructions to the current control unit 310 to form the encoded signal. The current control unit 110 comprises circuit components for controlling the voltage and current outputs and frequency. In the illustrated embodiment, a feedback module 316 is also provided for measuring the generated field, for comparing the measured field with the expected field in order to identify any deviation (for example as circuit components drift over time), and for feeding back the results of the comparison to the processing unit 306 to allow corrective action to be taken automatically.

The final signal is output via the output unit 314 to the coil 304. The coil 304 is shown in a spring-like shape, but may be any shape. The spatial properties of the magnetic field depend on the shape and design of the coil. For example the magnitude peaks along the axis of a circular coil as shown, generating an ellipsoid surface of constant magnetic field magnitude. This shaping of the magnetic field can be used for localisation from a single local unit as described in more detail below.

The power source 300 is preferably mains electricity, but could be any suitable power source including, for example a battery, solar cell, or the like. The local unit 102 could be placed within an existing electrical device such as a light switch or fitting to utilise a pre-existing power supply and circuitry, as well as providing additional functionality as described below.

The identifier encoded by the local unit 102 could include information about the locality of the local unit 102, the position of the local unit 102, the orientation of the local unit 102, the output power of the local unit 102, and/or the configuration of the local unit 102 (for example the number of transmitter coils 304).

In an alternative embodiment, the local unit 102 could encode different identifiers at different points in time. These identifiers could also be encrypted to prevent unauthorised access to the positioning system. By using different identifiers, users can be provided with different levels of access and locality granularity. For example, a first user (User A) could have access to a coarse positioning identifier that allows them to determine which room they are in within a building. Another user (User B) could have access to a fine positioning identifier that allows them to achieve precise 3-D localisation. One potential way of accomplishing this is to have different length encodings, using a long encoding for precise locality and a short encoding for coarse locality information. The identifiers could be made to change dynamically to prevent users from learning the static identifiers. In addition, the local unit could dynamically alter the power levels, timing or encoding (essentially jittering the signal) to prevent an unauthorised user from achieving precise localisation without knowledge of the jittering pattern.

The local unit 102 need not be stationary and could be mobile, such as attached to a vehicle, person, animal or other moving object. With the aid of an additional localisation unit 318 (such as, but not limited to, any of GPS, IMU etc), the time varying, or stationary, position of the local unit 102 could be derived. Information about the locality and/or position of the device could be relayed via an additional communication channel (wired and/or wireless) and/or by dynamically altering the identity of the local unit 102 in response to the measured position. Alternatively, if the local unit 102 travels along a fixed path (such as rail or road), this could also be used to infer the locality of the mobile device 100.

If the mobile device 100 relays its locality to the mobile local unit 102, the mobile local unit 102 can move in such a way as to maximise the signal-to-noise ratio at the mobile device 100. In this way, continual locality could be provided over a wide area using a sparse number of mobile local units.

The coils 304 of the local unit 102 simulate a magnetic dipole when measured at distances much greater than the dimensions of the coil 304. The field decays proportionally to the inverse cube of the distance from the coil. There is a distinction in this regard to an electromagnetic (EM) wave, for example, which decays according to an inverse square relationship. EM waves are produced by an accelerating charge (for example in an aerial) as opposed to a current in a coil. In the present method, the current changes to alter the magnetic field produced, which can be approximated using magnetostatics in which the currents do not change rapidly. Typically, the carrier frequency used for communication or localization will have a wavelength significantly longer than the distance between transmitter and receiver. The substantially constant, or slowly varying, magnetic fields of the embodiments described herein. Magnetic fields have the advantage over, for example EM fields, of not being attenuated to such an extent by solid objects and not being subject to multipath reflections.

Electrostatic fields can be considered analogous to magnetostatic fields, but where charges, as opposed to currents, are substantially stationary or slow moving. Accordingly, electrostatic fields can be used to communicate in a similar way to magnetic fields, as will be discussed in more detail below.

Server

Figure 4:
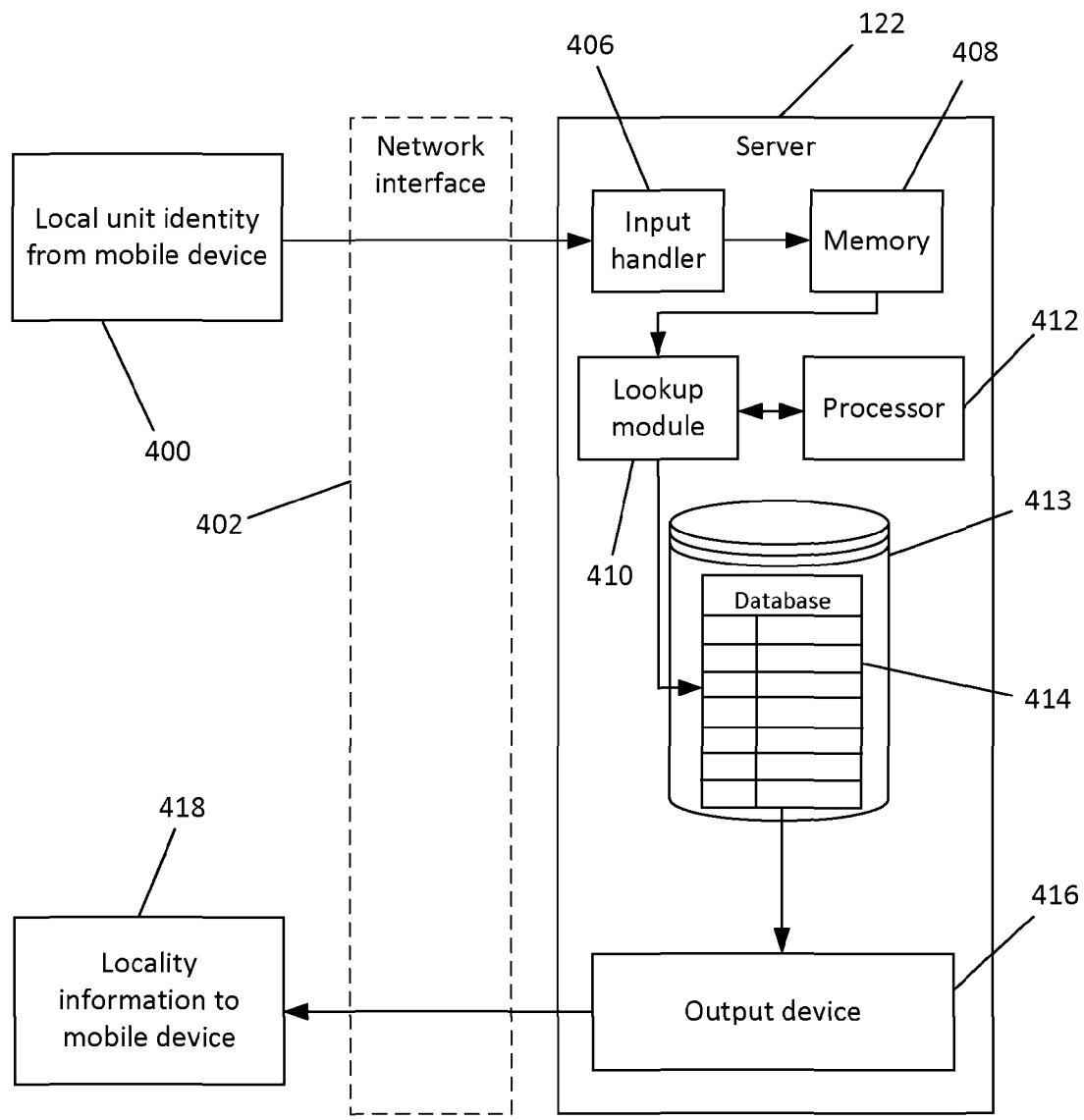
FIG. 4 illustrates schematically the main components of a server forming part of the system shown in FIG. 1.

In FIG. 4, the main components of the server 122 are illustrated schematically.

As described above, and shown in FIG. 1, the mobile device 100 connects to a server 122 in order to retrieve locality information relating to the local unit or units 102 it has extracted an identity for. This is enabled by sending the identity of the local unit 102 to the server 122 via a network interface 402. The server 122 comprises an input handler 406, memory 408, lookup module 410, processor 412, database 414 and output device 416. The database 414 can be locally stored in the server 122 or on external storage 413 such as a compact disk. The database 122 contains the identity codes for each local unit 102 and the corresponding locality information associated with each local unit 102.

The local unit identity from the mobile device is input, at 400, to the server via the input handler 406. It is passed to the memory 408 for storage. The lookup module 410 compares this identity with those stored in the database 414. A processor 412 is provided to undertake the database search. The locality information corresponding to the identity of the local unit 400 is output from the server via output device 416, and sent to the mobile device 418 via the network interface 402.

Operation of the Mobile Device According to the First Implementation

Figure 5:
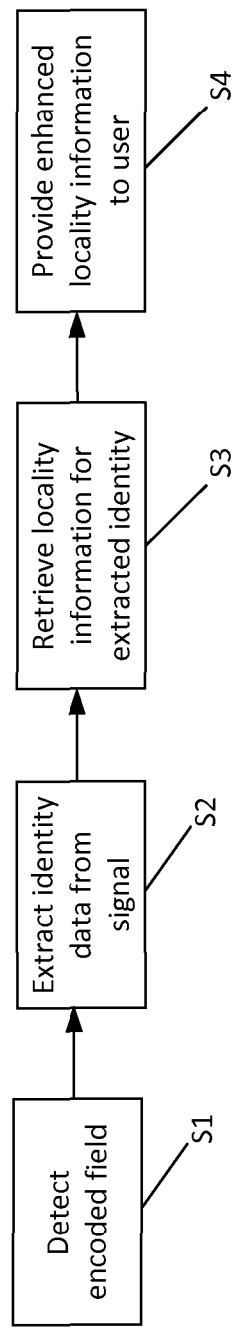
FIG. 5 is a simplified flow diagram of the steps taken by a mobile device to receive location-specific information.

FIG. 5 is a simplified flow diagram illustrating operation of the mobile device 100 to retrieve locality information for a single local unit 102 as described for the first implementation shown in FIG. 1. This could be because the mobile device 100 is in range of only one local unit 102, or because the mobile device 100 ignores all detected magnetic fields apart from one (e.g. the strongest field).

As seen in FIG. 5, after the mobile device 100 has entered an encoded magnetic field 104 emitted by the local unit 102, it detects the field 104 from the local unit 102 (at S1). The mobile device 100 then extracts the encoded identity data from the field 104 (at S2). The mobile device then 100 retrieves locality information (S3) relating to the local unit 102, based on the extracted identity, either from the local memory 37 (if available) or via a WiFi/network connection and the internet from the server 122. The locality information for the local unit 102 may comprise position information (e.g. geographic co-ordinates) of the local unit 102 and/or educational/descriptive information (e.g. information about a particular shop, information about a museum exhibit or painting, targeted advertising, route planning information or the like).

Once the locality information has been retrieved, it is provided to the user via an appropriate output device 27. For example, the information could be provided as an audio message and/or as a visual output. Where the retrieved locality information comprises position information this could be output as an indication on a map (e.g. a map supplied for use with the GPS receiver or a map/floor plan retrieved as part of the locality information).

Thus, as explained previously, by using the magnetometer provided in the mobile devices, locality information comprising an approximate position can be derived even when conventional satellite positioning is unavailable and only a single local unit 102 is detected. Moreover, the enhanced locality information can be retrieved in addition to this positional information to enhance a user's experience.

Operation of the Mobile Device According to the Second Implementation

Figure 6:
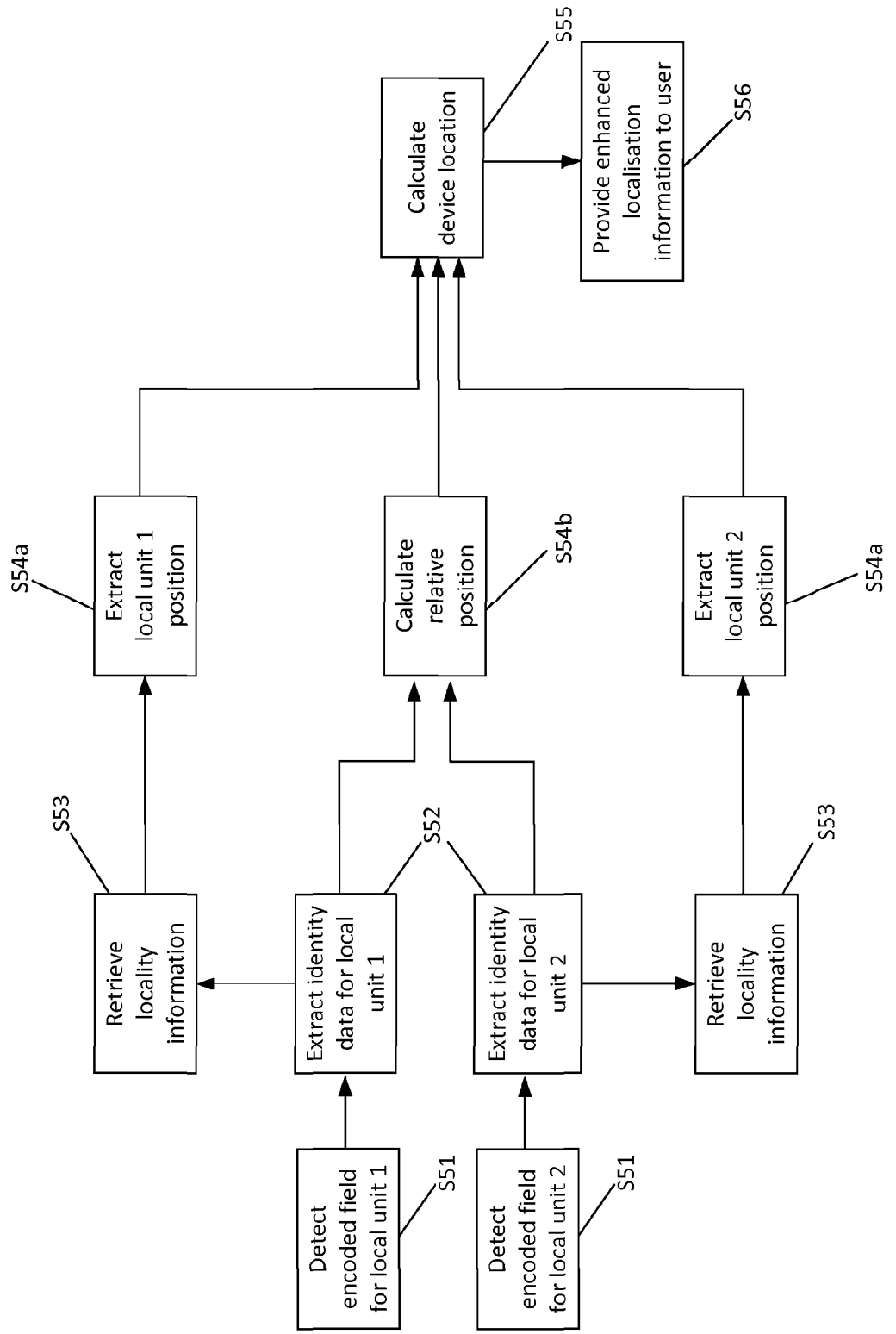
FIG. 6 is a simplified flow diagram of steps taken by a mobile device in order to determine its location.

FIG. 6 is a simplified flow diagram illustrating operation of the mobile device 100 to retrieve locality information for a plurality of local units 102, and to calculate a particularly precise position, as described for the second implementation shown in FIG. 1.

In FIG. 6, the encoded magnetic fields 104 emitted by each of the plurality of local units 102 are received by the mobile device 100 as described above (S51). The mobile device 100 then extracts identity data from each of the fields (S52) and retrieves the locality information associated with the extracted identity accordingly (S53) as described previously for the first implementation.

In this embodiment, the retrieved locality information includes a position (e.g. geographical coordinates) of the local unit 102 to which it relates. The mobile device is thus able to extract this position from the retrieved locality information of each local unit 102 (S54a).

The mobile device 100 also determines a relative position of the mobile device 100 in relation to each of the detected local units 102 (S54b) by analysing the magnitude, frequency and/or phases of each detected field to give a (time-dependent) relative measurement. From these measurements the mobile device 100 is able to determine a specific position relative to all the detected local units 102. This relative position information is used, in conjunction with the positions of the local units 102 extracted from the retrieved locality information, to determine a more precise position of the mobile device 100 (S55). The method used by the mobile 100 device to determine its location is described in more detail below.

The calculated position can then be provided to the user (S56) as an indication on a map (e.g. a map supplied for use with the GPS receiver or a map/floor plan retrieved as part of the locality information), possibly in conjunction with other locality information such as educational/descriptive information.

In the illustrated example the detection of two encoded magnetic fields 104 is shown for simplicity. It will be appreciated, however, that there may be many more, preferably at least three and that a greater number of local units has the potential to improve the accuracy of position calculations as illustrated in FIGS. 7(a) to 7(c).

In FIG. 7 (a), for example, only one encoded magnetic field is detected from one local unit 102-2 and the device can therefore determine an approximate position on a surface of a virtual ellipsoid centred around the local unit 102-2 (e.g. with a major axis co-axial with the coil and with a field magnitude that is substantially twice as high as in the minor axis). In FIG. 7 (b), a second encoded magnetic field is also detected, this time from local unit 102-3; the device can therefore determine an approximate position on a virtual ellipse where the ellipsoids intersect. This, combined with other locality information, (e.g. the 'ground' or 'floor' level), may be sufficient to narrow down the position to a more precise (albeit potentially ambiguous) position. FIG. 7 (c) shows a situation where the device has detected three encoded magnetic fields from local units 102-2,3 and 4. The intersection of three ellipsoids pinpoints a location 500 in three dimensions much more precisely. Any inaccuracies in the measurements can be accounted for as tolerances, effectively meaning that the device can be pinpointed to a defined volume rather than an exact point. Note that local units 102-2, 3 and 4 can be mutually colocated and mutually orthogonal, providing the ability to determine accurate position and orientation in 3-D from a single installation position of local units.

Thus, as explained previously, by using the magnetometer provided in the mobile devices, locality information comprising a particularly precise position can be derived even when conventional satellite positioning is unavailable. Moreover, the enhanced locality information can be retrieved in addition to this positional information to enhance a user's experience.

A number of detailed embodiments have been described above. As those skilled in the art will appreciate, a number of modifications and alternatives can be made to the above embodiments whilst still benefiting from the inventions embodied therein.

Figure 8:
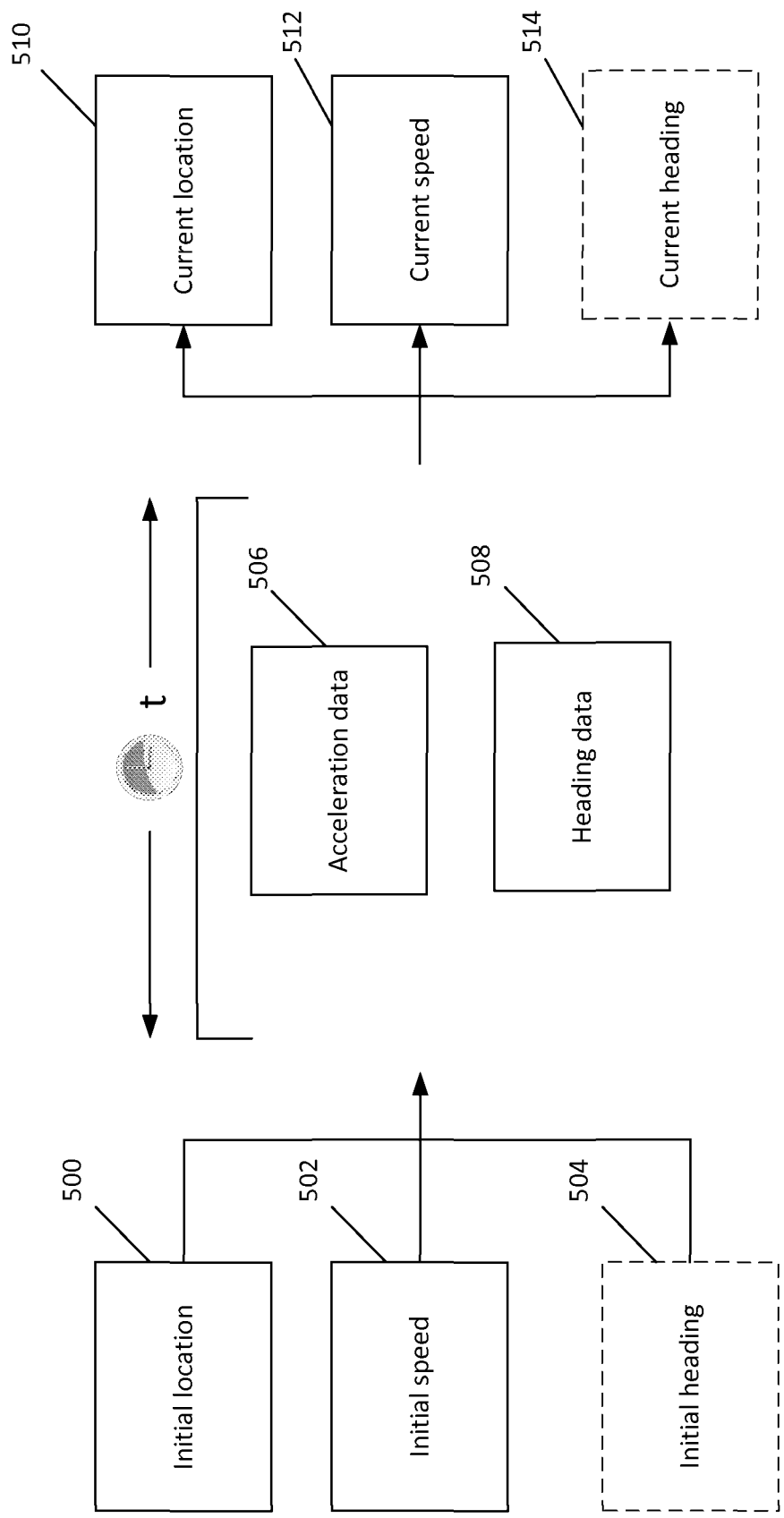
FIG. 8 is a simplified flow diagram of an alternative method used by a mobile device to determine its location.

For example, FIG. 8 shows an enhanced localisation method in which other available advanced features, such as a accelerometer (and/or gyroscope) can be used in conjunction with the magnetometer for tracking and position approximation.

In FIG. 8, using the mobile device's in-built accelerometer, the device determines its location by combining heading data with acceleration data (e.g. twice time-integrated) and a known starting location (for example, when it last detected three fields). The mobile device 100 initially has a defined location 500 and speed 502. This could be from a GPS signal or a magnetic field as described above. The mobile device 100 also has an initial heading 504 (e.g. derived from magnetometer data). If the mobile device 100 loses location tracking signal for a time t then, during this time, acceleration data 506 and heading data 508 is collected using the accelerometer 47 and magnetometer 46 respectively. This data is then used in the 'Inertial Navigation' technique to approximate a current location 510, speed 512. Current heading 514 can be measured using the magnetometer. The shorter time t is and the greater the accuracy of initial measurements 500, 502, the greater the accuracy of the final position 510 and speed 512 measurements.

This method of position sensing, known as 'dead reckoning', has utility not only because it allows localisation when a mobile device 100 is out of range of a local unit 102, but also because it allows long correlation codes to be used accurately in a wider range of situations.

Correlation codes are sent by the local unit 102 in order, for example, to convey localisation information. Longer correlation codes have the potential to improve the accuracy of localisation and are generally less susceptible to noise. In the absence of 'dead reckoning' information, if the user is mobile when receiving the code, correlation may not be possible because the relative orientation of the mobile device may be different at the start and end of the code. However, in one embodiment, this change in relative orientation can be corrected for by using an Inertial Measurement Unit (IMU) provided in the mobile device, which may include an accelerometer and/or gyroscope and/or magnetometer. Through the use of inertial measurements, the mobile device can create a stable local reference frame which compensates for changes in relative orientation and/or position of the user. The use of motion correction may thus enable long correlation codes to be received independent of the local motion of the mobile device 100. As discussed above, the more the local device accelerates when it is receiving the correlation code, the more likely it is that errors might occur. In this situation, errors could result in the correlation code being incorrectly motion-corrected and thus inaccurate localisation information being determined, or not being determined at all. However, data from the accelerometer of the mobile device could potentially be used, where possible, to determine when incorrect motion-correction is likely and either to compensate for it, to alert a user of the potential inaccuracy, and/or to place greater weight on parts of a long correlation code that are received while the mobile device is not accelerating so quickly.

A corollary of this is that the IMU may falsely detect motion when in fact the user is stationary; this is termed 'drifting'. For example, if the accelerometer falsely detects acceleration, the device will be thought to be moving in this direction until an acceleration opposing this is detected. Nevertheless, if errors are random and symmetrically distributed in size and direction, these will tend to balance out, but the perceived position of the device 'drifts' around its actual position. Thus, it is could be the case that the IMU is most accurate when the device 100 is actually moving. Advantageously, therefore, when the device is stationary (determined, for example, by an IMU measurement being below a specific threshold value) long correlation codes may be used without motion correction.

When the device is moving, it may be more accurate to use shorter codes which have been motion corrected. There is a trade-off between short codes, which are motion corrected accurately but do not provide a lot of localisation information, and long codes which may suffer from motion correction errors. For this reason, the local unit 102 may send out two sets of code, one long and one short. The mobile device 100 can then decide which set to use depending on the state of motion it is in. Of course, the local device 102 may send out a range of different length codes, but there is a trade off here as the local device 102 has a certain maximum bitrate it can transmit, and duplicating information may waste this resource.

The mobile device 100 may fuse IMU measurements (which provide a trajectory which is very accurate in the short term), and/or measurements from the magnetic system and/or any other available modalities, such as WiFi or GPS, depending on their availability. Using the known locations of the local units 102, the mobile device 100 can determine its most likely location in space using for example, a particle filter or information filter. This can occur even if partial information is known, such as that the user is moving towards a local unit 102, as evinced by an increase in the signal strength. Such a technique can also be used to create a "fingerprint" map which characterises a particular location in an area.

Figure 9:
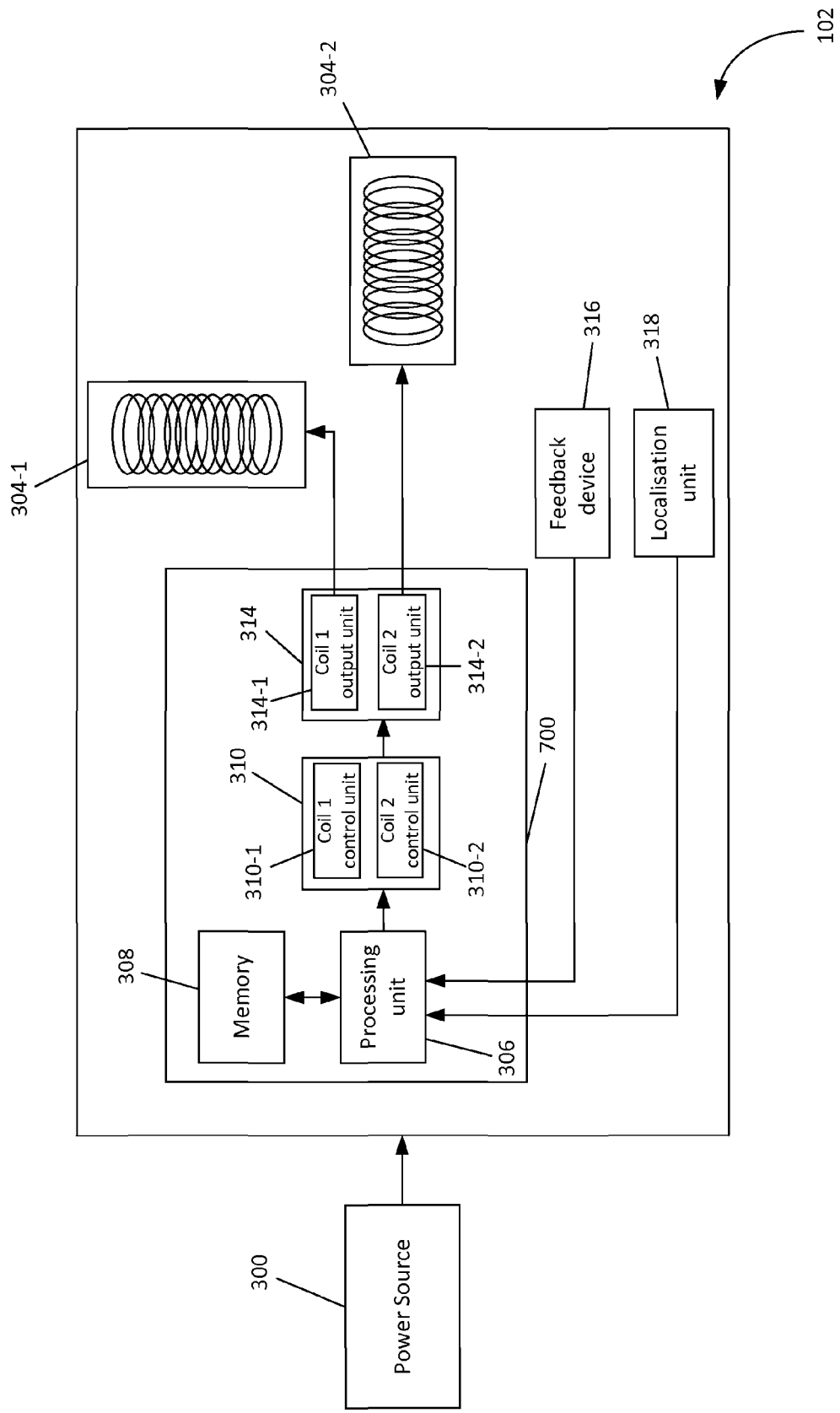
FIG. 9 illustrates schematically another embodiment of a local unit forming part of the system shown in FIG. 1.

Another example of an enhanced (albeit more complex) local unit 102 is shown in FIG. 9. The local unit 102 of FIG. 9 comprises two orthogonally positioned emitting coils 304-1 and 304-2. The presence of the two coils 304 allows the generation of rotating magnetic fields. Each coil 304 produces a field with a polarity defined by its orientation, and by changing the relative intensities of the two fields over time, a magnetic field can be generated in which the polarity changes over time. Hence, the addition of a second coil effectively introduces another dimension in which encoding can be placed, as the polarisation has components in two dimensions rather than one. This therefore increases the potential information content of the field. For example, the magnetic field 104 may be in the form of a rotating magnetic field or a more complex time-varying field. It will be appreciated that the coils do not have to be absolutely orthogonal, but the orientations should ideally have orthogonal components. In another example, two coils are positioned coaxially and controlled separately so that it is easier to have biphasic control of the current.

The inclusion of a second coil 304 also enables localisation from a single local unit 102. The spatial dependence of the magnetic field from a single coil 304 is dependent on the orientation and design of the coil 304, as described above. This means that two intersecting ellipsoids (for example) can be generated from a single local unit 102. Given a certain set of measurements, the location can be reduced to a certain set of points as described above. By using a third coil, another local unit 102, or other additional information, a more precise location can be determined. It will be appreciated that although in the above embodiments the magnetic field shape is described as an ellipsoid, it may take any shape, which can be selectively produced by the design of the local unit 102.

The local unit 102, of FIG. 9, is similar to the one shown earlier in FIG. 3 but with some key differences. The local unit 102 comprises a main control unit 700 which comprises memory 308 and a processing unit 306. The memory 308 contains information regarding identity and encoding of the field, as described with reference to FIG. 3, but also contains polarisation information. The processing unit 306 takes this information and determines what current needs to be produced by each coil 304-1 and 304-2 to generate the desired field. These separate current requirements are sent to control sub-units 1 310-1 and 2 310-2 which control the electronic components to produce the currents required to generate the desired time-varying field. These currents are then output to coils 304-1, 2 via their respective output units 314-1, 2. As with the example of FIG. 3, a feedback device 316 is provided which detects the generated field, compares it with the desired field and feeds this back to the processing unit 306 to make changes to bring the generated field in line with the desired field as appropriate (e.g. as a result of component characteristic drift over time). It will be appreciated that the design of this and the example of FIG. 3 could be simplified by omitting the feedback unit 316. Also, as shown in FIG. 3, the local unit 102 has a localisation unit 318. This may be a GPS receiver, WiFi module, or any component which provides the local unit with information regarding its location. This information could then be used to generate an identity of the local unit and/or be used to encode the signal with its location. This means that each local unit 102 would not have to be programmed with their location separately, thus creating a 'plug-and-play' local unit 102. It will be appreciated that the design of this and the example of FIG. 3 could be simplified by omitting the localisation unit 318.

In another example, a third coil, orthogonal to both the existing two 304-1 and 2, is included to yet further increase the potential information content of the field as the polarisation is then defined in three dimensions rather than two. In a further example, three coils orientated in a coplanar fashion, separated by an angle of 120°, may be used. In a yet further embodiment, there may be four or more coils. Any arrangement that provides spatially distinct coils could be implemented, and furthermore the coils do not have to be a similar size or shape. For example, two coils with their axes aligned along the x and y directions, with a third coil with an axis along the z direction wrapped around the first two provides a compact local unit. Another possible orientation for a three-coil local unit 102 is for the three coils to be wrapped around the three axes of a cube.

It will be appreciated that although in the above embodiments the local devices 102 are described as being independent of one-another, they may be connected. This may be via a WiFi, Bluetooth® other wireless or wired connection. This would enable the local units in a particular region to synchronise their signals so that they do not overlap (in time or frequency) or interfere with one-another. Also, or alternatively, this link could provide real-time information to be transmitted to the local units so that their ID (for example) can change over time. This would be useful in situations such as when a fire alarm goes off and local units could transmit a special and/or more powerful signal. This functionality could also be implemented as an energy saving feature, local units are instructed to be active only during certain times of day, or when a when instructed to by a mobile device. The synchronisation may be controlled by a 'master' local unit which produces a field all other local units can detect, and subsequently produce a suitably synchronised field. Alternatively, other synchronising means are possible as described below.

The local unit 102 may be equipped with a communication module (wired and/or wireless (3G/WiFi) which allows for remote control, reprogramming and diagnosis. Such a facility would enable local units to be remotely reprogrammed with new software versions (for example, altering the particular encoding scheme adopted).

Figure 10:
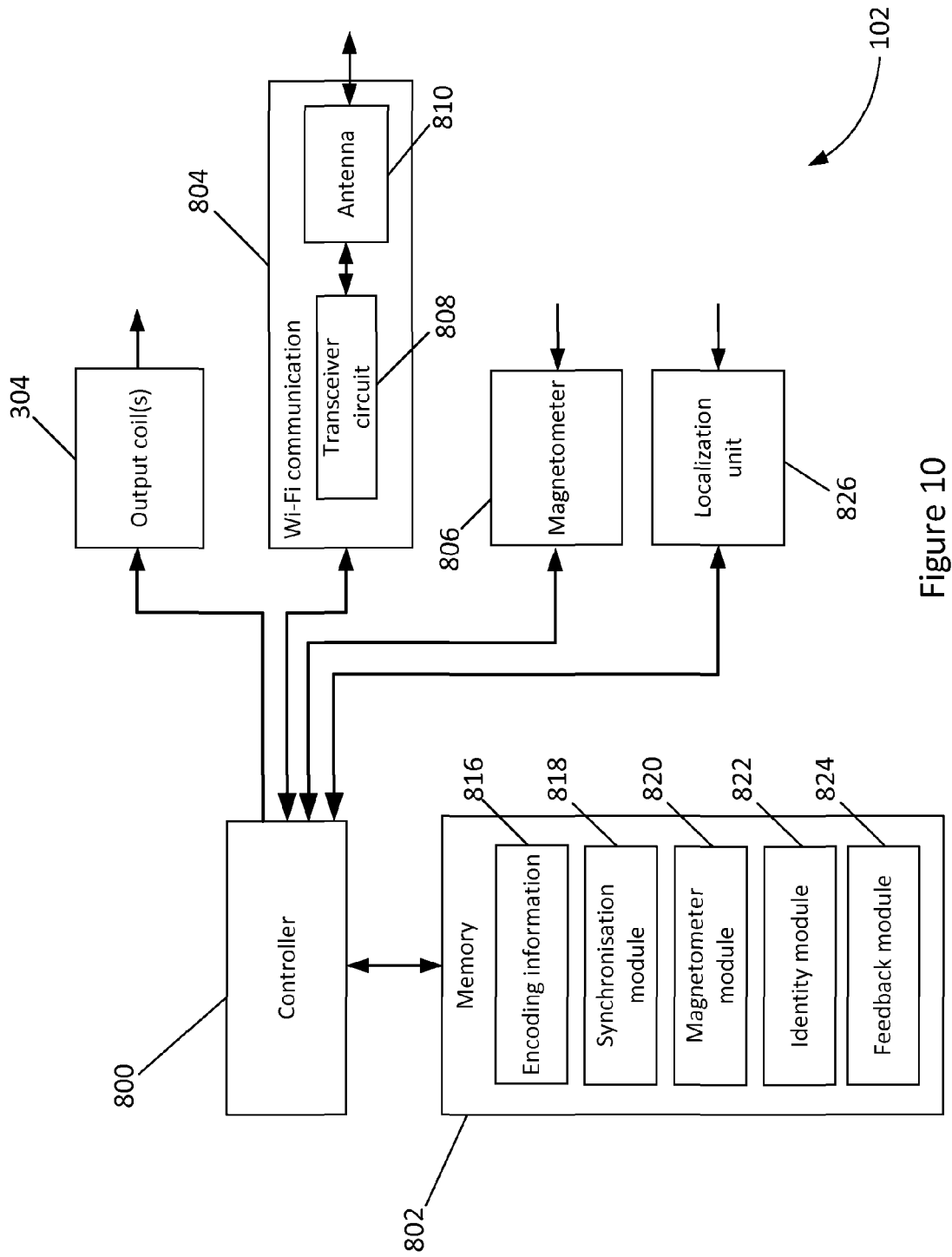
FIG. 10 shows a further embodiment of a local unit forming part of the system shown in FIG. 1.

FIG. 10 shows a further, yet more complex, embodiment of a local device 102 which is adapted to perform the additional functionality described above. The local device 102 is again similar to that described in FIG. 3, but with additional components to enable additional functionality. The local unit 102 comprises a controller 800, memory 802, output coil(s) 304, Wi-Fi communication unit 804 and a magnetometer 806. In order for a number of local units 102 to synchronise with each other, they must be able to communicate with a central server, or with one-another. This may be done through a Wi-Fi connection 804 to a LAN or WAN, a 'Zigbee' or by communicating with one another using magnetic fields. For the latter option, the local unit 102 comprises a magnetometer 806. Magnetometer 806 may use similar, or the same components as the feedback module 824. The magnetometer 806 measures the magnetic field, ideally in three dimensions, and passes this signal to the controller 800. The controller 800 then uses the magnetometer module 820 from memory 802, determines how to alter the signal in order to be synchronised with the other local units 102 within range. The synchronisation module 818 is used in this stage to generate a suitable signal so that it does not interfere with other signals. Memory 802 also comprises encoding information 816. This information 816 determines the nature of the signal sent to the output coil(s) 304 to generate a suitably encoded magnetic field. The identity module 822 comprises information on the local unit's identity. This could be its location, or any other unit-specific information such as identity code. This code may not be permanent, and could be subject to change. The identity module 822 could be accessed remotely or locally to alter the local unit's identity. Localisation unit 826 may provide information regarding the local unit's location and/or identity. This may be particularly useful where the local unit 102 is not at a fixed location. Feedback module 824 either directly measures the produced magnetic field, or determines this from information from magnetometer 806. It then compares this to the desired field and feedbacks any discrepancies to the controller 800.

In this manner, therefore, the local units are advantageously able to communicate with one another. This is particularly advantageous because it allows embodiments in which the local units can be arranged in a self-organising network (SON) comprising a plurality of local units adapted to communicate with one another (for example by means of the magnetic fields that they generate) which units are adapted to detect the introduction of an additional local unit to the SON and/or the removal of an existing unit from the SON and to adapt accordingly. For example, the magnetic fields generated by the local units of the SON could be adapted such that the coverage provided by each local unit is optimised, for example to avoid (or minimise) the occurrence of coverage holes whilst ensuring that the power consumption of each local unit is kept within acceptable limits. In this way, for example, the introduction of an additional local unit covering a particular area could allow another local unit (that previously covered part of that area) to be adapted to use all of its power to provide coverage in an area that previously had no (or poor) coverage (e.g. the corner of a large conference centre, supermarket, or the like). Similarly, a newly added local unit could use its ability to communicate with the other units to self-adapt itself appropriately to the SON, on power-up, without the need for configuration by a skilled installer (e.g. in a 'plug-and-play' type manner).

As described above, in the above embodiments the location information may be retrieved via a communications link or may be stored locally by the mobile device 100. It will be appreciated that this locally stored information could be pre-loaded at an earlier time, for example, when the mobile device 100 first enters a building or area covered by a system 10, on request by a user planning a visit to a particular location, when the mobile device is first configured, or the like. This situation can be beneficial in certain situations as it helps to minimise the need for external connectivity, which may be unavailable. Downloading the relevant information for several local units in a particular local area or region once (for example, on request by a user and/or on detection of an local unit have a particular 'trigger' identity for triggering a wider download) can also help to balance the potentially conflicting requirements of battery management and maintaining device storage capacity by minimising the need to make repeated download connections whilst avoiding the need to store location information for all emitter devices in a wider geographical region.

In the above embodiments, the encoding of the field by the local unit may identify the local unit 102, then the mobile device 100 looks up location-specific information. It will be appreciated that the magnetic field could potentially encode geographic co-ordinates of the local unit or similar, minimising the procedure necessary for the mobile device 100 to determine its position. This may be preferable in situations where the mobile device 100 has a map, floor plan, or the like pre-loaded onto the memory, and therefore can place an indication of the mobile device's position relative to the local unit 102 on the map with no further data communication.

The local unit 102 has been described above to generate the required field by calculating the electrical signal needed to generate this. This process could be achieved by using a pre-loaded algorithm in the local unit's memory. Alternatively, the local unit could use a look-up-table to achieve this. This electrical signal may need to be amplified before being passed through the coil so that a field of sufficient amplitude and hence range can be generated. This could be achieved by passing the signal through an analogue amplifier. The signal may be in a digital form, so is first changed into an analogue form by means of a digital-to-analogue converter (DAC), a filtered Pulse Width Modulator (PWM) or similar.

It will be appreciated that although in the above embodiments the local device 102 has been described to have a device-unique identity code, this may not be a globally unique identity code. In an alternative embodiment, the identity code for a local unit 102 could potentially just distinguish it from other local units 102 in the vicinity. The mobile device 100 can use other means, such as GPS, mobile network or pre-loaded information to determine the correct vicinity. This would lead to simpler identifying fields being possible, which is particularly beneficial when using a low bandwidth or insensitive magnetometer which can sometimes be used for direction finding in mobile telephones or the like. Moreover, simpler identification codes reduce the possibility of incorrect identification.

It will be appreciated that although the mobile device 100 is described as a mobile telephone (e.g. a Smartphone) it may be any suitable device for example a GPS device, a personal digital assistant (PDA), palmtop or notebook computer. For example, a GPS device could be adapted to detecting magnetic fields from local units 102 and have pre-loaded location information relating to them. This will afford the advantage of having improved location coverage and seamless location information when moving into or out of an area of GPS or magnetic field. One possible implementation would be where an underground car-park has a number of local units 102 installed in various locations. A car is fitted with an adapted GPS unit and picks up a field from a local unit 102 as it enters the car park. A map of the car park and locations of the local units 102 could then be downloaded from the internet or retrieved from memory so that location tracking could continue when sufficient GPS signal is lost. The user could then be guided to a vacant space, or guided back to her car if already parked.

It will be appreciated that although the above description primarily refers to embodiments where localisation information is sent to the mobile device, it is envisaged that purely the presence/absence of a signal could be used to indicate location. In embodiments where the mobile device is in close proximity to a local unit 102, it is also possible to charge the mobile device via inductive coupling. This is currently possible when the distance between the local unit 102 and mobile device is less than 1-2 m, although advances in technology will extend this.

Another potential feature of the system is that the power supplied to the local units 102 could be increased (e.g. ramped up) in the case of an emergency to provide improved performance, namely faster/more accurate localisation and/or improved range. Furthermore, special features could be implemented in an emergency situation such as modified codes (e.g. longer/shorter correlation codes) or instructions for evacuation for example. Such modification of the power and nature of the transmission need not be limited to emergency situations, but could be used at any time an improved or different performance is required.

In the embodiments described so far, a local unit 102 has been regarded as a device which generates encoded magnetic fields (a sender or transmitter), and a mobile unit 100 as a device which senses encoded magnetic fields (a sensor or receiver). It is another potential embodiment of the system to integrate the local unit and the mobile device to form a single device herein after called a transceiver. The transceiver is capable of two-way communication and localisation with respect to one or more other transceivers. A transceiver can also be used to localise mobile devices or to be localised itself by a local unit.

A potential application of this system as described herein is in the Emergency and Rescue services. In this context a transceiver (a 'control' or 'master' transceiver) could be mounted on a vehicle such as a fire engine or other emergency response vehicle. In this application, the members of the emergency service crew are each provided with a transceiver and/or local unit and/or mobile device.

For example, the crew could all be equipped with transceivers and be able to establish the position of one with respect to another, and also to communicate these relative positions through the network of transceivers using the magnetic channel or other wireless technology. Their location could be determined using a distributed (multi-hop network) localisation algorithm as described below.

The mobile transceivers may advantageously be connected to (or integrated with) other safety apparatus (such as remaining air level indicators and/or detectors of toxic gases) carried by the member of the crew. This beneficially allows the position of the members of the emergency service crew to be tracked using one of the methods as described herein, and also allows the communication of other information such as remaining air level back to the vehicle and/or allowing control information (such as messages for triggering an audible and/or visible alert or command messages from a human controller) to be communicated to the mobile transceivers from the transceiver on the emergency service vehicle. The mobile transceivers carried by the crew may also be capable of transmitting a high powered distress signal, which can be picked up at a receiver elsewhere (e.g. at the master transceiver or at another detector). Note that in some instances it may be advantageous for the crew to only be equipped with mobile devices (receiver only) or local units (transmitter only). This will allow a subset of the functionality described above.

An additional implementation of the system 10 not mentioned in the description above would be to use the system 10 as an energy use monitor. Local units 102 could be placed within existing circuitry so that by activating the existing circuitry (i.e. turning on a light), the local unit 102 is activated to enable nearby mobile devices 100 to be localised, and this information can be integrated with the energy usage of the existing circuitry (as measured by a current/voltage probe or other sensor). Moreover, the local units could be used to monitor relative energy usage at different locations in a building (e.g. in different offices), for example by integrating the monitoring functionality with the localisation as described previously and/or by integrating the local units 102 into smart meters, smart sockets or the like. An alternative would be to use the system 10 as a tracking system as described above so that individual users can be tracked around a building so that devices can be activated/deactivated as a user moves around. By tracking individual users, it is also possible to acquire a footprint of their individual energy usage to motivate behavioural changes in energy usage. In addition, users can also be individually charged for their energy usage. Further to this, data about space usage can be collected so that the use of heating, lighting and other devices can be tailored to minimise energy usage. Users can be equipped with mobile devices 100 which allow for their position to be monitored and/or stored and/or relayed to the smart meters and/or central server.

It will be appreciated that although the server 122 is described as being separate to the mobile device 100, it may be integrated into the mobile device 100. This may be as memory and associated software integrated with the existing mobile device components, or as additional components. The server could possibly be accessed via network interface 402 within a Wide Area Network (WAN) or within a Local Area Network (LAN) or distributed across the mobile devices 100 in the form of a distributed database or similar.

The input devices of the mobile device may include any suitable device commonly available on such devices, for example a mouse, physical keyboard/keypad, camera, microphone, motion/proximity sensors, localisation device, etc. The input modules may include any suitable modules for handling inputs to the input devices and/or for displaying information on how they are configured for use by a user. For example, the input modules may include modules for handling the input of images (still or moving) via a camera, modules for recognising voice inputs to a microphone, modules for interpreting the speed and/or nature of movements, etc.

In the embodiments described above, the mobile device includes transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate the software may be provided in compiled or un-compiled form and may be supplied to the mobile device as a signal over a computer network, or on a recording medium. Further, the functionality performed by part or all of this software may be performed using one or more dedicated hardware circuits. However, the use of software modules is preferred as it facilitates the updating of the mobile device in order to update their functionalities. For example, an existing mobile telephone (e.g. a smartphone) having a magnetometer could be adapted for use with the localisation system by downloading an application (e.g. a so called 'app') on request by a user of the mobile device.

The functionality of one or more of the modules may be combined into a single module and in some embodiments may be built into the operating system.

Encoding Techniques

In the description above, the local unit 102 emits an encoded magnetic field which is detected by a mobile device 100. The following description provides a number of techniques which the local unit 102 and mobile device 100 could use to achieve the functionality described above. These techniques can be used individually or in combination with one another.

There are a number of methods which can be used to encode both local unit 102 ID and allow the mobile device 100 to determine its relative position and orientation. In addition, it is preferred that local units 102 in proximity to each other do not interfere with one another's transmissions, as this could make localisation difficult or even impossible. Techniques which could be employed in this system 10 are discussed below.

Contention based medium access techniques involve random access to the medium, which may be applicable especially for transceivers as they can listen to the channel to determine if any transmissions from other devices are underway. The advantage of contention based approaches (such as ALOHA, CSMA (Carrier sense multiple access)) is that no prior synchronisation/allocation is required.

Time Division Multiple Access (TDMA) refers to a technique where local units transmit their ID codes within distinct time-slots, and has the advantage of being very simple for the receiver to detect the codes. In a TDMA based system, the local units 102 may require a communication link to maintain synchronisation and if there are a large number of local units 102 within proximity of one another, there may be a delay between transmissions from a particular local unit 102. The requirement for strict synchronisation can be relaxed if interference/collision is acceptable, in which case local units 102 transmit their ID codes at random points in time.

Frequency Division Multiple Access (FDMA) assigns each local unit 102 a unique frequency band. Adjacent local units 102 can simultaneously transmit without causing interference with one another and without the need for synchronisation. However, in a bandlimited medium, for example the bandwidth that a mobile device 100 can detect, the number of distinct frequency bands that can be chosen is limited.

Code Division Multiple Access (CDMA) is a technique for allowing simultaneous access to the medium. There are two main types of CDMA, namely Direct Sequence Spread Spectrum (DSSS) and Frequency Hopping Spread Spectrum (FHSS). The idea behind these techniques is to assign unique codes to local units 102. These codes are typically chosen to have the property that a code has a high autocorrelation peak for zero time lag, low autocorrelation values (ideally zero) for non-zero time lags and that cross-correlations between different codes are zero for all lags. These are broadly classed as Pseudo-Noise (PN) codes and there are a number of families, such as Gold codes, Kasami codes and Walsh-Hadamard codes. In a bandlimited medium, the time to transmit a PN code can be very long (e.g. 10 s for a 1024 chip code at 100 chips/sec).

All the encoding techniques may utilise simple encoding methods such as amplitude modulation or more sophisticated methods such as 'Manchester coding'. Frequency Shift Keying (FSK), Phase-Shift Keying (PSK) and combinations thereof may also be utilised.

Magnetic Vector Modulation

Potential disadvantages associated with some of the earlier described techniques is that they either introduce a delay or limit the maximum data rate (for instance the long pseudo-noise codes required for CDMA) or require time synchronisation to prevent interference (TDMA) or that the limited bandwidth does not allow multiple local units 102 (FDMA). To this end, a preferred technique is magnetic vector modulation which exploits the vectorial nature of the magnetic field to encode more information per unit time than existing spread spectrum methods.

In one example, the magnetic field generated by local unit 102 is encoded using magnetic vector modulation. The information is encoded onto the signal by the direction of a magnetic vector. The relative position and pose of the local unit 102 and mobile device 100 is corrected for using a pre-data transmission. This affords rotational invariance between transmitter and receiver, and subsequently data can be sent on multiple axes, thus at a higher bitrate.

In a preferred example, both the local unit 102 and the mobile device 100 have at least two orthogonally placed coils. In such a situation, there is scope for much improved communication rate using 'magnetic vector modulation'. By controlling the phase and amplitudes of the currents in each transmitting coil 304, a magnetic vector field can be generated with an arbitrary direction (when using three or more coils) at the receiver 806. This is described below in an example where each device 100, 102 has three coils and phase shift keying (PSK) is utilised.

The local unit 102 comprises three coils 304, oriented orthogonally along the 'x', 'y' and 'z' axes respectively. When initiating a communication, the local unit 102 sends a preamble message energising all three coils (multichannel preamble). This allows the receiving mobile device 100 to learn the channel transfer function (effectively the relative orientation of the receiver and transmitter coils when other external effects are neglected). Next the incoming binary message is mapped onto a 6 symbol representation. There are many possible ways to convert a Binary Phase Shift Keying (BPSK) to a vector based representation. One such way is shown in Table 1:

TABLE 1

| Symbol | Coil energisations | | |
|---|---|---|---|
| | $i_x$ | $i_y$ | $i_z$ |
| 0 | +1 | 0 | 0 |
| 1 | 0 | +1 | 0 |
| 2 | 0 | 0 | +1 |
| 3 | −1 | 0 | 0 |
| 4 | 0 | −1 | 0 |
| 5 | 0 | 0 | −1 |

Figure 14:
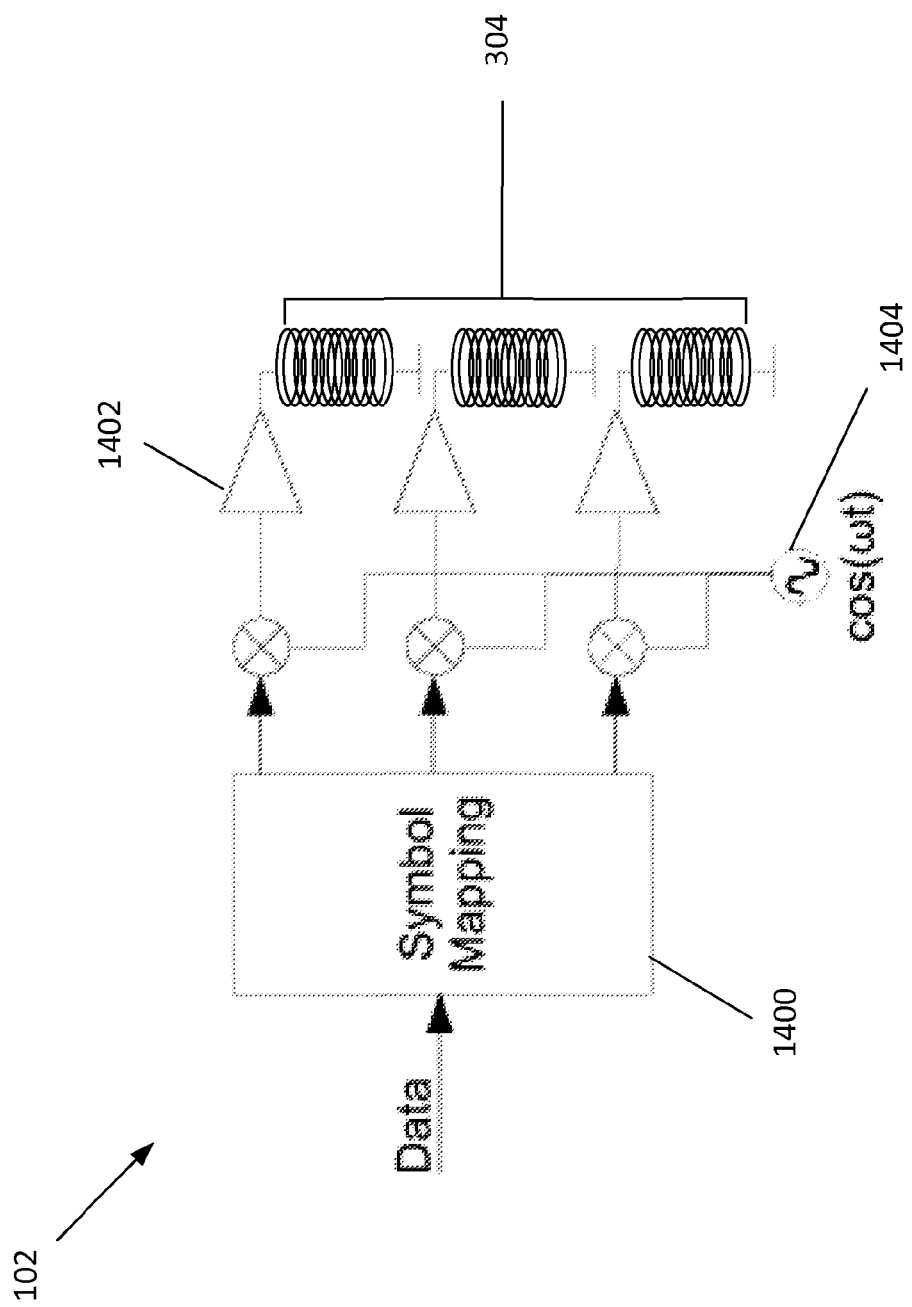
FIG. 14 shows a schematic diagram of an example local unit forming part of the system shown in FIG. 1.

The symbol mapping shown in Table 1 dictates which coils 304 are energised at a particular time and their respective phase relationship. FIG. 14 shows a system block diagram of the apparatus used for the mapping process undertaken by the local device 102. The data is mapped into symbols by symbol mapping module 1400. The baseband signals are modulated with a higher frequency carrier wave, amplified by amplifiers 1402 then applied to the transmitter coils 304. In order to reduce the overall bandwidth, the signal may be passed through a root raised cosine pulse shaping filter 1404.

Figure 15:
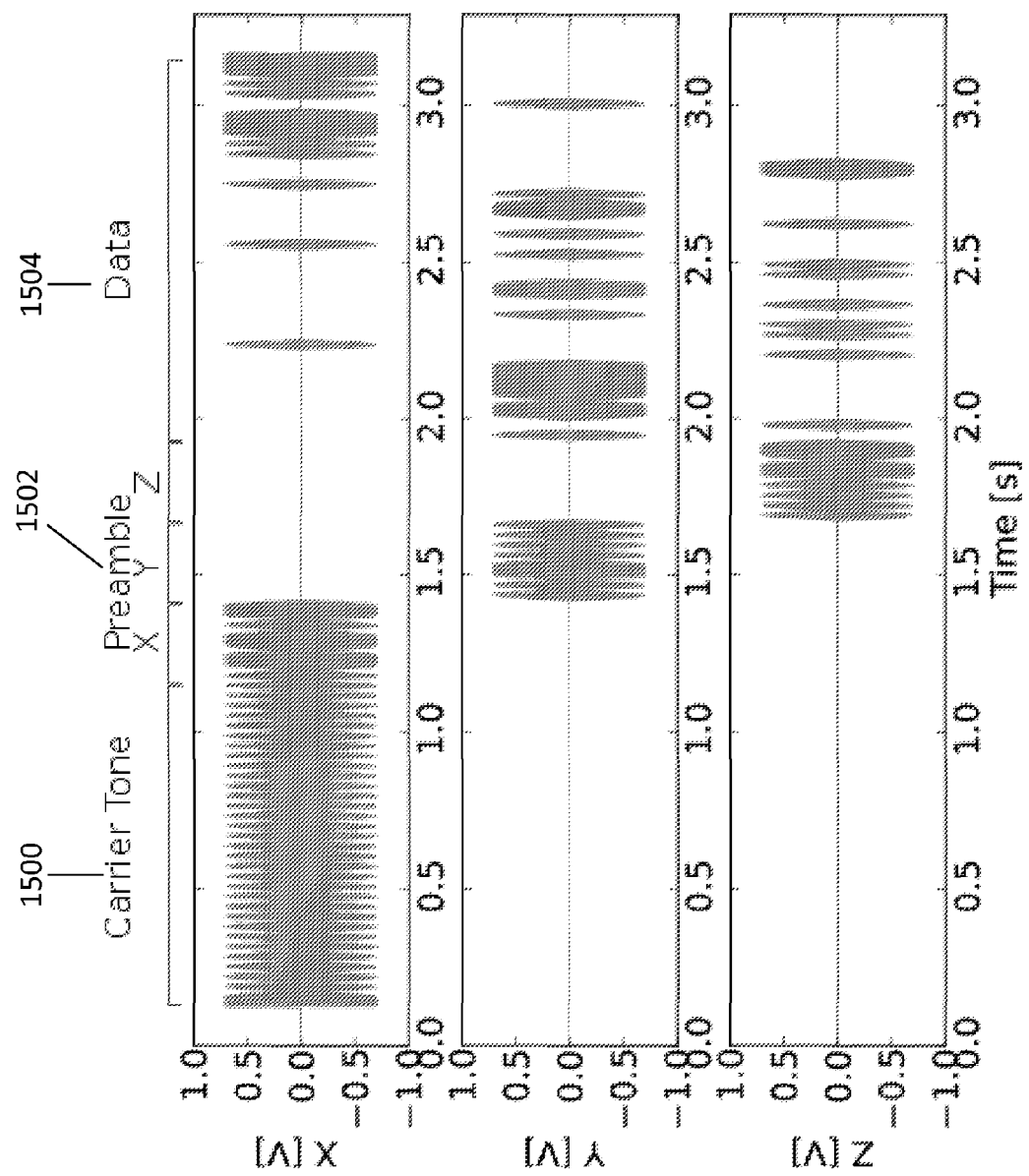
FIG. 15 shows an example signal generated by the local unit shown in FIG. 14.

FIG. 15 shows an example transmitted waveform by the local device 102. The carrier tone 1500 is transmitted to provide phase synchronicity between transmitted and received signals. A preamble message 1502 is then sent on each axis in turn, which the receiver uses to 'train' the channel. The data 1504 is then sent, with each symbol being sent on a particular axis according to the symbol mapping.

Figure 17:
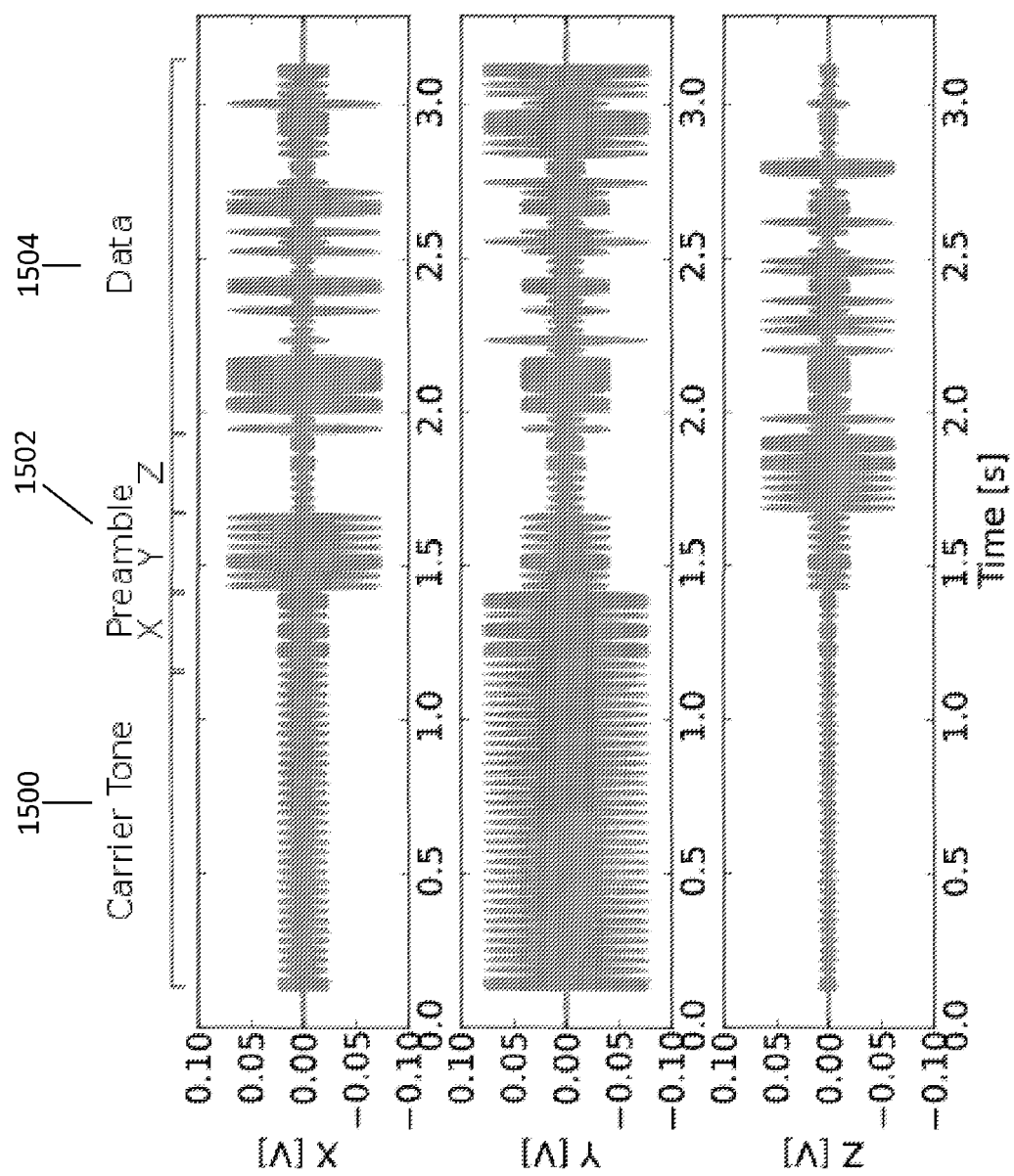
FIG. 17 shows an example signal received by the mobile device of FIG. 16 corresponding to the generated signal shown in FIG. 15.

FIG. 17 shows the corresponding received waveform to the transmitted one of FIG. 15. The carrier tone 1500 which was transmitted purely on the x axis is now a linear combination of the received waveform in all three axes. The preamble 1502 can be determined once this carrier tone is reconstructed. The axis that the different parts of the preamble are detected on is used to determine the channel transfer function, H. This is a 3×3 full rank matrix, which describes the coupling between the transmitter coil axes and receiver coil axes, in one example, H is a rotation matrix between the two sets of coil axes. Once this has been corrected for, a signal can be sent using the full symbol mapping with rotational invariance. This matrix could have a different shape (depending on the number of transmitter and receiver antennas) and their relative orientation and spatial displacement. The channel transfer function would also depend on the shape of the generated field—for example the field generated by a substantially rectangular antenna would result in a different transfer function to the ellipsoidal dipole approximation adopted above.

This procedure of channel training may take more time than the BPSK case as additional preamble characters need to be sent for each transmitter axis However, due to the increase in bitrate afforded by the increase from 2 to 6 possible symbol values (effectively providing for a base 6 based encoding system), messages of useful length have a lower latency as is illustrated below.

The increase in bitrate from increasing the possible symbol values from 2 (binary) to 6 (senary) is $\log_2(6)/\log_2(2)=2.58$. Due to the positional and rotational invariance provided by the adoption of triaxial transmitters and receivers, the overall energy received by a device at a certain range is constant.

In magneto-inductive communication systems which typically employ single axis transmitters and receivers, a strong variation in received signal with relative position and orientation is generally exhibited. The gain in received energy (which is directly related to the achievable bit error rate) compared to the single axis case depends on the relative alignment of the single axis transmitter-receiver. If the transmitter and receiver in the single axis case are coaxial (i.e. lying along the major axis of the ellipsoid), then the increase in energy using triaxial transmitters and receivers is 1.76 dB. If the transmitter and receiver in the single axis case are coplanar (i.e. lying along the minor axis of the ellipsoid), then the increase in energy provided by using triaxial transmitters and receivers is 7.78 dB. If the transmitter and receiver in the single axis are mutually orthogonal (i.e. the cross product is zero), then the receiver will cut no lines of flux and detect no magnetic field and hence communication will be impossible. However, in the case of the triaxial transmitter and receiver, communication rates will be identical to the other scenarios.

Assuming that each character takes a time of $t_s$ to send, and there are P preamble symbols and D (scalar) data symbols.

$$t_{scalar}=t_s(P+D)$$

$$t_{vector}=t_s(3P+D/2.58)$$

For a preamble character length P of 8 bits, the vector approach is more efficient (lower latency) when the data, D, is longer than 32 bits (4 bytes). The latency of signals when using different encoding methods and transmitter types is discussed in more detail below with reference to FIG. 22.

In an alternative method, instead of orientating the transmitting axes along the x, y and z axes, any three axes could be chosen. An example symbol would be $i_x$=0.1 A, $i_y$=−0.5 A, $i_z$=0.2 A. This may be preferable when designing a system to avoid noise or interference which is directed along a particular axis. In addition, this approach is not limited to constellations with 6 symbols, but can take on an arbitrary number of symbols, depending on the signal-to-noise ratio in the channel. For example, in a low noise channel, 32 symbols could be employed. Note that the preamble does not necessarily need to communicate all 32 symbols, but can send a reduced subset which will allow the receiver to estimate the position of the remaining symbols in magnetic vector space. If the receiver is sensitive to the power in the received signal, symbols can also be amplitude modulated, so that two or more symbols could lie along the same vector, but with different lengths from the origin. This is described in more detail below.

Figure 16:
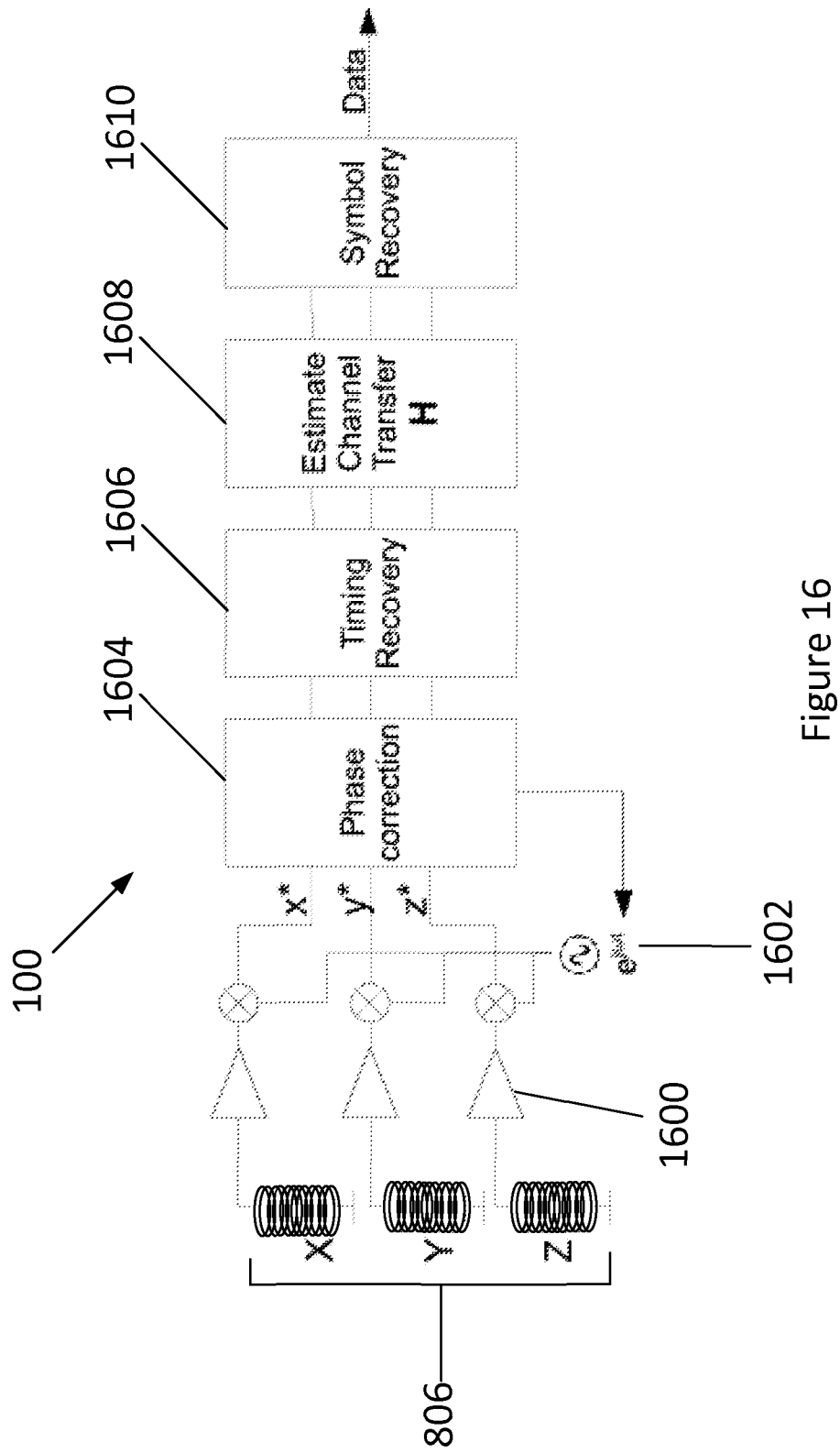
FIG. 16 shows a schematic diagram of an example mobile device forming part of the system shown in FIG. 1.
Figure 18:
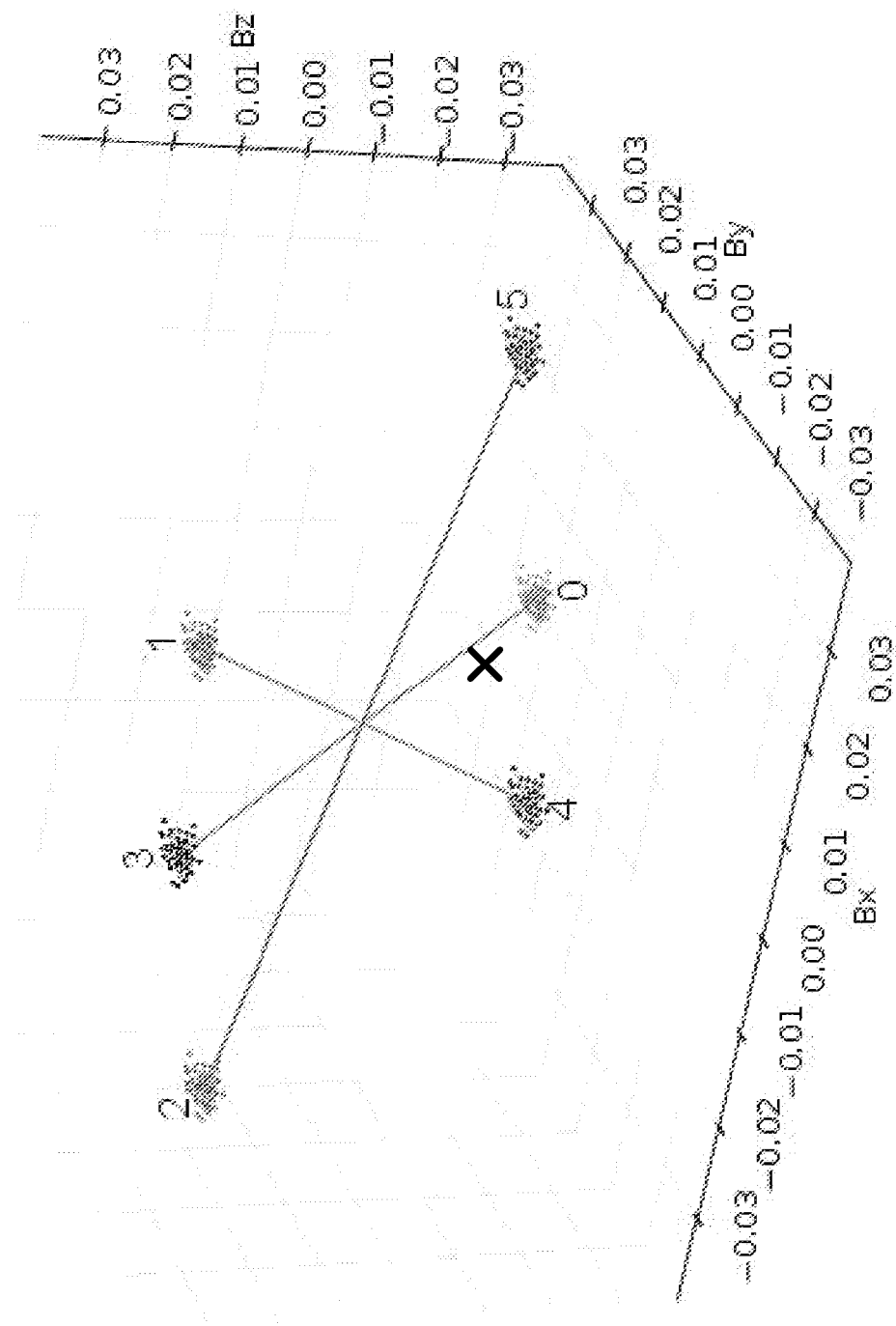
FIG. 18 shows an example 'constellation diagram' showing an example of how symbols are mapped to magnetic vectors.

FIG. 16 shows a system block diagram of a receiver chain. Low noise amplifiers 1600 amplify incoming signal followed by automatic gain control to maintain an acceptable dynamic range. The modified signal is then down-mixed with a synthesised carrier 1602. This is preferably a complex carrier so that the downconversion forms in-phase (real) and quadrature (imaginary) components. A phase locked loop (PLL) module 1604 performs phase correction by adjusting the local oscillator's generated frequency in order to maintain phase synchronicity. This is performed e.g. by a Costas Locked Loop which synthesises a single carrier, not three separated ones. This is because there is no frequency or phase shift between the three channels. The error signal applied to the feedback loop is derived from all three input channels, giving more weight to those with better signal-to-noise ratios. This reduces the rate of decision errors, where the incorrect symbol is chosen from an erroneous point on the constellation diagram (FIGS. 18 and 19).

The next stage is timing recovery performed by timing recovery module 1606. This is similar to a method used in a normal receiver, but the vector amplitude (i.e. Root Mean Square (RMS) amplitude of the three channels) is used to control the data sampler, which determines at which point a symbol sample should be taken to maximise the energy.

During the preamble phase of the signal, the channel transfer function, H, is estimated by module 1608. Although there are six symbols, only three vector coefficients need to be stored as the remaining three are simply opposite in sign and lie in an antipodal position within the constellation (FIGS. 18 and 19). The transmitter sends a known preamble signal character on each of the three channels in sequence as shown in FIG. 15. The receiver averages the 3-D magnetic vector it receives over the duration of each preamble character. Each of these vectors is used to populate a column of H. Each vector is purely real as no phase shift can occur due to multipath. This matrix H is then used to decode the symbols once the data is sent. To decode the incoming data, the receiver chooses the symbol that minimises the Euclidean distance between the received 3-D vector and the predicted positions of the constellation points, derived from the known H. The senary symbols are then unmapped by symbol recovery module 1610 to recover the serial data stream. This is explained with reference to an example constellation shown in FIG. 18. In this example, the SNR is high, so that the clusters are distinct and separated. The constellation is established using H determined during the initial channel estimation phase. The preamble symbols are averaged to form a cluster, where the centroid of the cluster is the respective column vector in H. To decode a symbol, the 3-D Euclidean distance between the received vector signal measured from all three channels, marked with an 'x' in the figure, is determined to every point in the symbol constellation. A hard decision is made based on which point of the constellation the symbol is closest to, returning in this case, the symbol 0. Note that soft-decision techniques such as Viterbi or Turbo coding can be used to provide forward error correction, channel coding and to reduce bit error rates.

Figure 19:
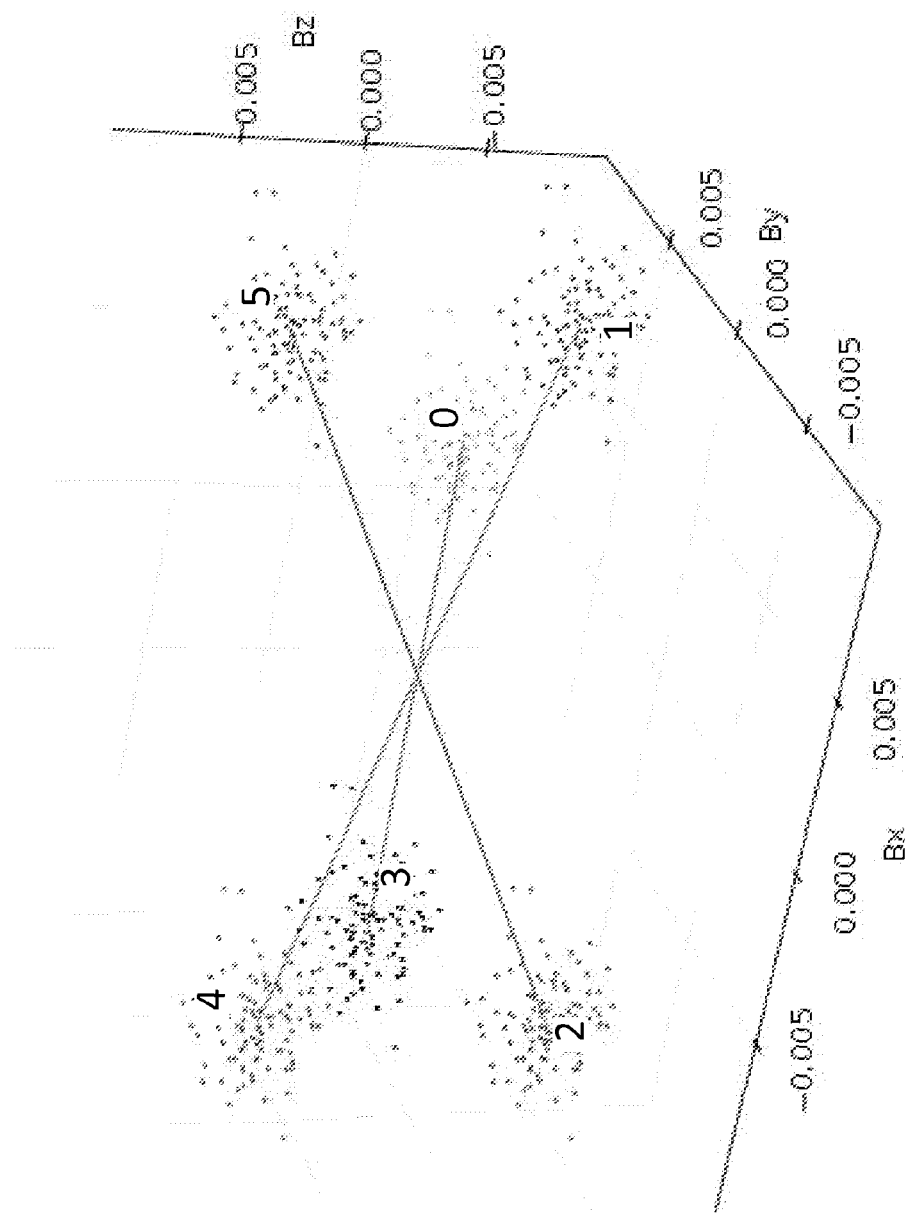
FIG. 19 shows a modified 'constellation diagram' of FIG. 18.

FIG. 19 shows another example constellation diagram when the SNR is low. This could be due to the presence of noise or interference for example. Note also the shape of the constellation has changed; this is due to a change in the relative position/orientation between the transmitter and receiver. The clusters of symbol points (received vectors) are more spread, which could result in incorrect attribution of a symbol to a received vector. The exact nature of the spreading can be used to determine what kind of noise is present, and potentially subsequently corrected for. For example, Gaussian noise shows as fuzzy constellation points, non-coherent single frequency interference shows as circular constellation points, phase noise shows as rotationally spreading constellation points and attenuation makes the points move toward the centre.

The increased bitrate afforded by methods such as these can be very useful in applications such as fast and secure Near Field Communication (NFC) payment. High bitrates afford both better security and faster communication (which itself increases the security). Furthermore, the localisation feature may be included to prevent 'man-in-the-middle' attacks. This is where a third party intercepts the communication and retransmits it, thus enabling them to circumvent the security checks but still controlling the communication. The third party would be in a different physical location to the genuine user, so could be easily discovered by checking the physical origin of the signal.

It should be noted that although the example of Phase Shift Keying has been used, the above communication method is independent of modulation scheme (i.e. BPSK, PSK, FSK, CDMA, OFDM can all be used within this system). Furthermore, it can work transmitting using two, three or more axes.

This system provides the advantage of increased communication rate without expenditure of additional power by varying the direction of the generated magnetic field. The signal is often shorter using this system compared to a single coil system, so the power output may be lower.

An advantage of using three coils with orthogonal components and correcting for their relative orientations means that communication can occur with rotational invariance between transmitter and receiver. After this correction for relative orientation, data can be sent over multiple axes, thus affording the possibility of data transmission at a higher bitrate. As discussed above, rotational invariance for moving devices can also be achieved through the use of additional sensor input from an IMU. This allows the receiver to track the constellation even if subject to changes in relative orientation.

Magnetic Phase Modulation

An alternative, but analogous method to magnetic vector modulation is magnetic phase modulation. In this method, rather than encoding information in the direction of a received magnetic vector, the information is encoded using the change of direction of the magnetic vector. This can be compared to using Differential Binary Phase-Shift Keying (DBPSK) as opposed to BPSK.

The magnetic vector has two angular dimensions, azimuth and elevation and one radial dimension, the amplitude. If the amplitude is kept constant, varying the angular properties allows two different pieces of information to be encoded simultaneously. For example, a +90° change in azimuth could mean '0' and a −90° change in elevation could mean '1', both rotations could occur simultaneously, so two pieces of information can be transmitted at the same time. Using such a method reduces the sensitivity to amplitude variations, operating in a similar way to Frequency Modulation (FM). This reduces potential errors due to attenuation as described above. A further advantage of using this method is that the transmitter operates at a constant power output, meaning that the SNR is always maximised.

Similarly a symbol can be represented by the time varying trajectory undertaken in magnetic vector space. For simplicity, the direction of the magnetic vector is represented using the two angles in spherical coordinates $(\phi,\theta)$. The two angular parameters, along with a potentially time varying amplitude are converted from spherical to Cartesian co-ordinates (x,y,z) and used to control the currents flowing through the transmitter coils. An example symbol table is shown below:

|  | Symbol 0 | Symbol 1 | Symbol 2 | Symbol 3 |
| --- | --- | --- | --- | --- |
| T = 0 | (0, 0) | (0, 0) | (0, 0) | (0, 0) |
| T = 1 | (π/2, π/2) | (π/2, −π/2) | (π/4, π) | (−π/4, π/2) |
| T = 2 | (π/2, 0) | (π/2, π/2) | (3π/4, 0) | (π/4, −π/2) |
| T = 3 | (0, 0) | (0, 0) | (0, 0) | (0, 0) |

At each point in time (T=0, T=1 etc), the magnetic vector rotates to a new direction. In the receivers reference frame, this traces out the trajectory over the ellipsoidal surface. As the trajectories are different, the receiver can decode the symbols, even if a particular region of the ellipsoidal surface is characterised by strong noise.

This method could be combined with encoding methods such as Manchester encoding, and combine the advantages of a number of encoding methods. This technique can be further enhanced by encoding information through the rate of change of the magnetic vector. Such a technique would be insensitive to changes in orientation of the user.

Hypercomplex Coding

Another alternative method which also exploits the vectorial nature of magnetic fields is 'Hypercomplex coding'. This is where a rotating magnetic vector is simulated by a local unit 102 and the identity of the local unit and its relative location can be determined using this.

It is firstly assumed that the local unit 102 is equipped with at least three mutually orthogonal transmitter coils 304, and that the magnitude and direction of the current that flows through each coil 304 can be controlled, such as by using power transistors or other means. For simplicity, assume that the current through each coil can be set to +1, −1 or 0 amperes. Thus, at each point in time, the current in each coil 304 can take one of three possible values. Given three coils 304, there are thus $3^3$=27 unique combinations of coil currents. Note that in theory, this allows $\log_2(27)$=4.75 bits to be transmitted at each point in time, as opposed to a single bit for binary modulation. It is obvious that theoretically infinitely many variations of coil currents can be chosen, but for simplicity, we restrict this to 27 unique combinations in this example.

These currents can be expressed conveniently as a triplet e.g. [+1, 0, +1] representing a current of +1 through the coil aligned along the x-axis, no current through the coil aligned along the y-axis and a current of +1 for the coil aligned along the z-axis with respect to the local unit's reference frame.

Through the principle of superposition, the resultant magnetic field experienced at a point in space is the sum of the fields exerted at that point in space by the three orthogonal coils 304 in the local unit 102. It is evident that for each combination of transmitter coil currents, a different resultant field will be established. In essence, by controlling the combination of magnetic fields, it is equivalent to mechanically rotating a magnetic dipole centred at the local unit about three independent axes, namely the pitch, the yaw and the roll. This can be regarded as the spherical polarisation of the magnetic dipole about an origin within the local unit. By altering the spherical polarisation of the local unit 102 (by energising the coils 304 with a different triplet of currents) at various points in time, the magnetic field exerted at a particular point in space will also vary. It is this relationship which allows the mobile device 100 to establish its pose (orientation) and position.

In summary, the local unit 102 generates a sequence of polarisations by controlling the current through the individual transmitter coils 304. The mobile device 100 senses a sequence of polarisations. By comparing the received sequence to the known transmitted sequence (either pre-obtained or looked up as described above), the pose and orientation of the mobile device 100 can be determined. Through suitable choice of the polarisation sequences, multiple local units 102 can transmit simultaneously, without requiring synchronisation between local units 102. This allows the mobile devices 100 to identify local units 102 and determine their relative position and orientation.

Although there are many potential methods in which this could be accomplished, this is best explained with recourse to the theory of quaternions. Quaternions are four-dimensional hypercomplex numbers that have the form $$q = q_0 + q_i i + q_j j + q_k k$$

where the coefficients $q_0$, $q_i$, $q_j$ and $q_k$ are all real-valued and [1,i,j,k] forms the basis of the quaternion vector space. The number $q_0$ is called the real part and $\vec{q} = q_i i + q_j j + q_k k$ is called the vector part. If the real part is set to zero, this is referred to as a pure quaternion. By setting $q_i = B_x$, $q_j = B_y$ and $q_k = B_z$, where $B_x$, $B_y$ and $B_z$ are the components of the vector field measured at a particular point in space, the vector field can be represented as a quaternion.

To match the transmitted sequence with the received sequence, we use hypercomplex cross-correlation, which returns a hypercomplex result. Hypercomplex cross-correlation is essentially similar to the normal real or complex form, which calculates the inner product for various lags of the template pattern within the dataset:

$$r(n) = \sum_{t=0}^{N-1} f(t)\overline{g(t-n)}$$

where f(t) is the sensor dataset, g(t) is the template and $\overline{g(t)}$ represents the hypercomplex conjugate. It is helpful to take the normalised cross-correlation, to make it invariant to the power in each signal:

$$r_n(n) = \frac{\sum_{t=0}^{N-1} f(t)\overline{g(t-n)}}{\|f\|\|g\|}$$

where $\|f\|$ is the $L_2$ norm of the hypercomplex vector defined as:

$$\|f\| = \sqrt{\sum_{t=0}^{N-1} f(t)\overline{f(t)}}$$

At each point in time for the dataset, the quaternion $r_n(n)$ reflects how well the template matches the dataset. Note that a quaternion q can be expressed in polar notation:

$$q = q_0 + \vec{q} = |q|(\cos\theta + \vec{\mu}\sin\theta)$$

where:

$$\vec{\mu} = \frac{\vec{q}}{|q|}$$

and:

$$\tan\theta = \frac{|q|}{q_0}$$

where $q_0$ is the real part and $\vec{q}$ the complex part, $|q|$ is the magnitude, $\vec{\mu}$ is the eigen-axis and $\theta$ is the eigen-angle. For the normalised cross-correlation, the magnitude $|r_n| \to 1$ for perfectly aligned sequences and the angle $\theta \to 0$. $\theta$ can be interpreted as the angle between the template hypercomplex vector and the dataset hypercomplex vector, with $\vec{\mu}$ being the axis about which the rotation occurs. It is this relationship that will be used to derive an iterative algorithm to determine the relative position and orientation of a mobile device.

Iterative Determination of Position and Pose (Orientation)

Figure 11:
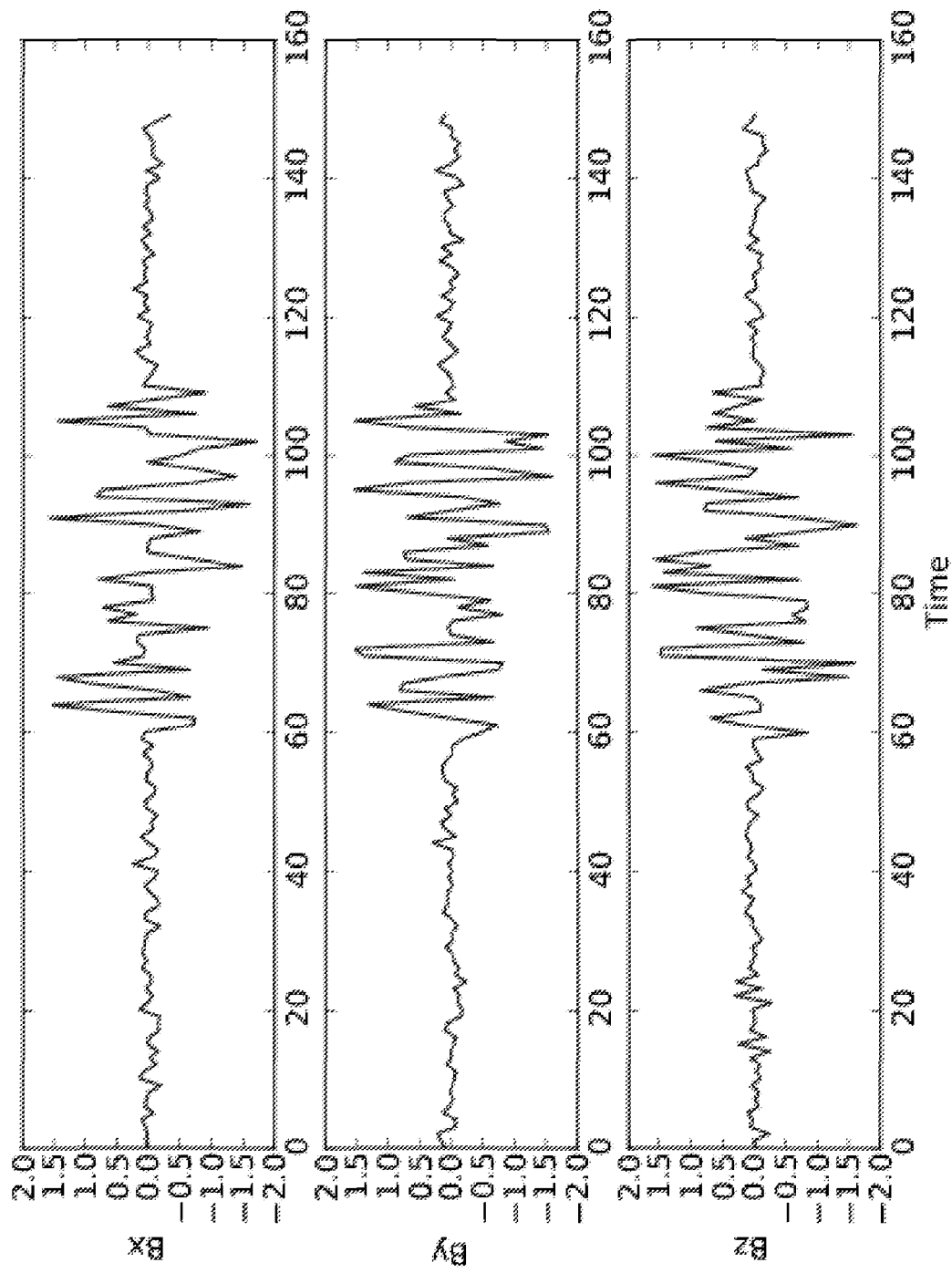
FIG. 11 is an example measurement of the resultant magnetic field along each axis for a sequence of 50 randomly generated polarisations with background noise present.

To determine the position and pose of the mobile device (e.g. six degrees of freedom), given a set of measurements, m(t), a number of steps are undertaken. An example set of measurements are shown in FIG. 11.

Figure 12:
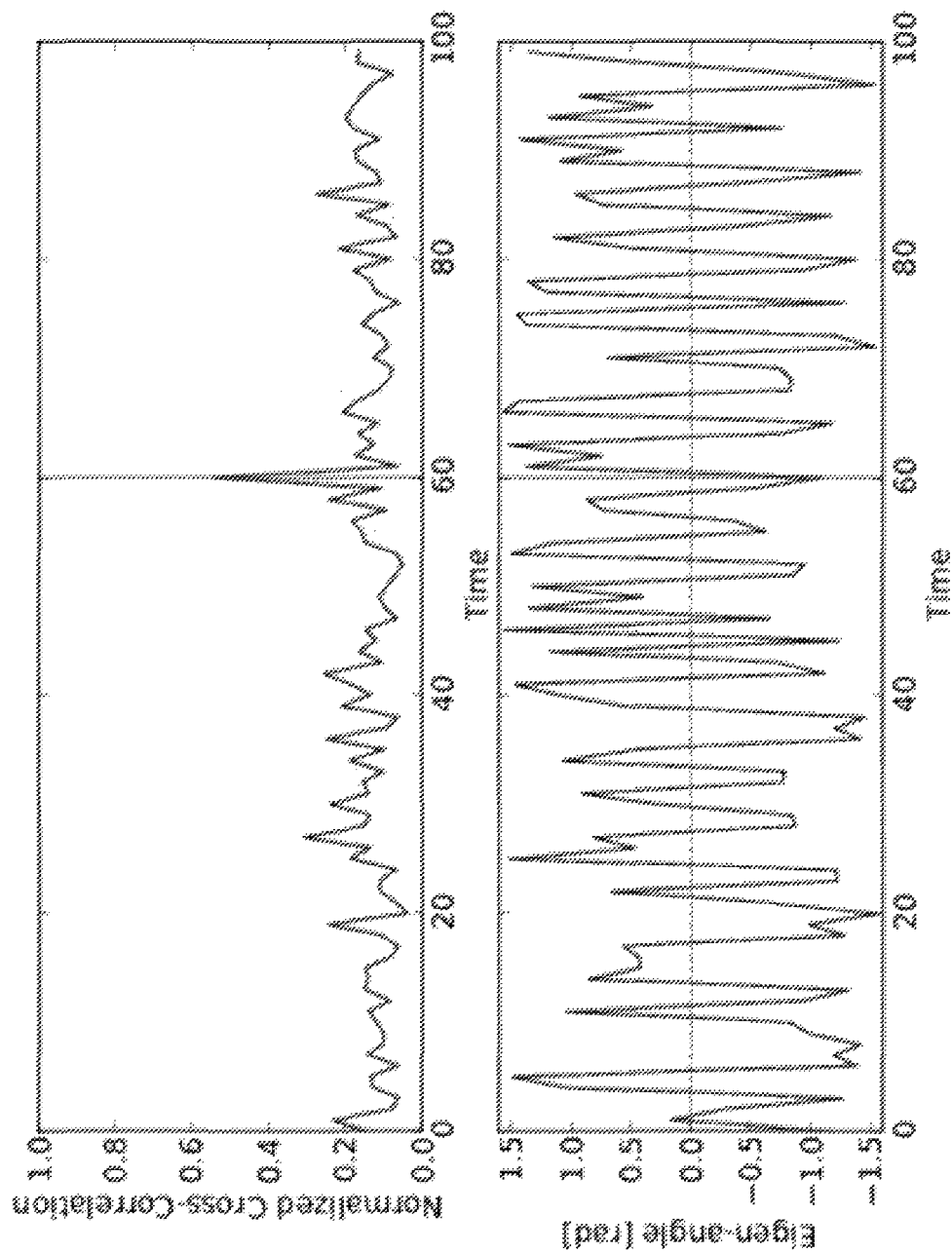
FIG. 12 shows an example normalised cross-correlation of predicted and measured sets of measurements by a mobile device.

The first step is to search for the hypercomplex sequence in the set of measurements, to determine if and when the transmission has occurred:

1) The predicted set of measurements, p(t), that would be received at an arbitrary point on a unit sphere centred at the local unit 102 is constructed. Note that this set of measurements consists of three components for each point in time, corresponding to $B_x$, $B_y$ and $B_z$. This point can be expressed in spherical co-ordinates as (r, θ, φ) where r is the radius of the sphere, θ is the azimuthal angle and φ the elevation. As the radius is constant, only (θ, φ) need to be specified. For example, the point (π,0) could be chosen.
2) The set of measurements and the predicted sequence are converted to pure quaternion representation.
3) The absolute hypercomplex normalised cross-correlation $|r_n(n)|$ between p(t) and m(t) is formed.
4) If a peak is detected, this indicates that a transmission occurred at the time instant $n_p$. This is shown in FIG. 12.
5) Note that if only proximity information is required, no further processing is required.

The next step is to successively refine the estimated position and pose of the mobile device by maximising the normalised cross-correlation value $r_n(n_p)$. This can be determined in a number of ways, such as through the use of a particle or Kalman filter, but a simple gradient ascent method is presented.

Figure 13:
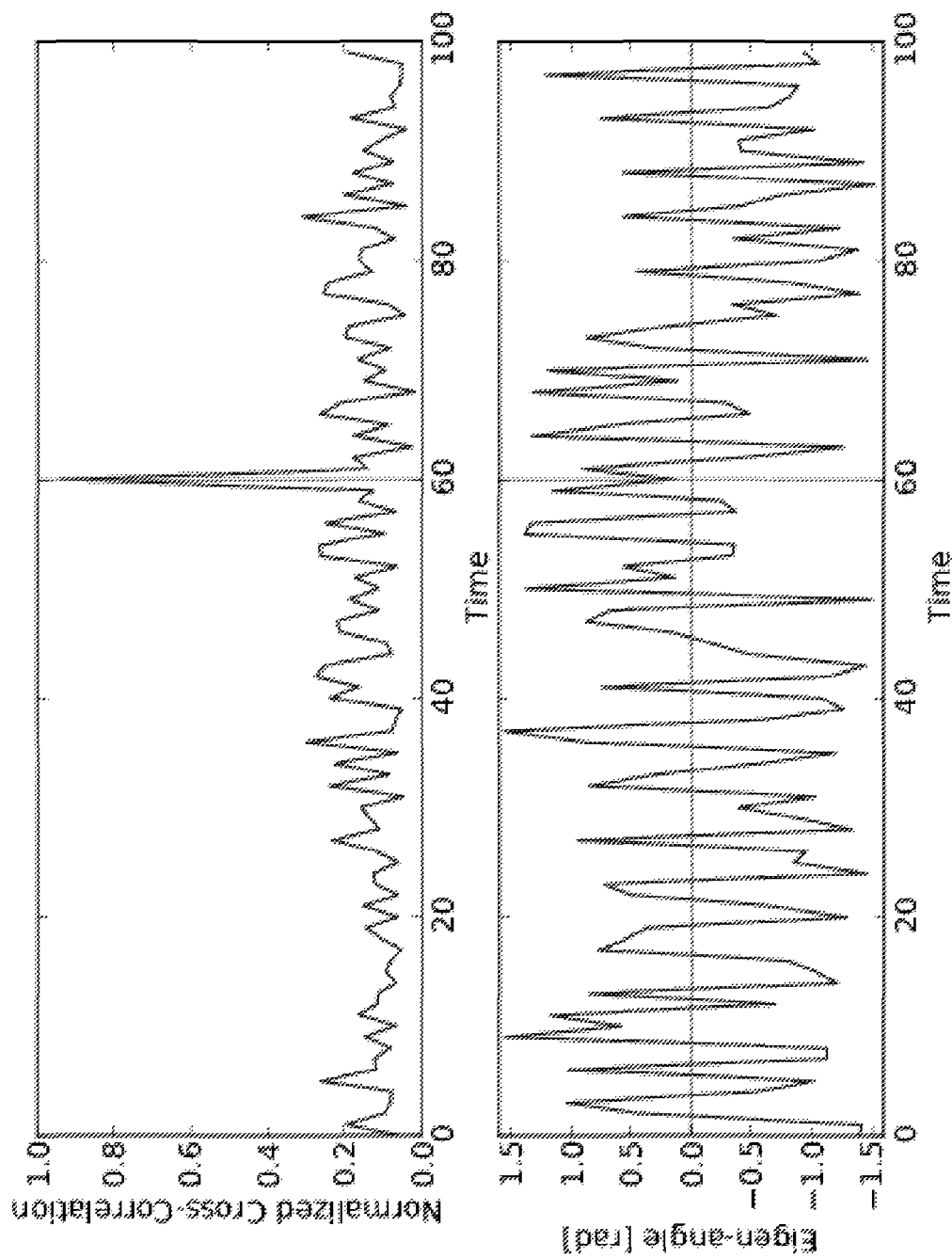
FIG. 13 shows an example normalised cross-correlation of predicted and measured sets of measurements by a mobile device when source and sensor frames are perfectly aligned.

1) The normalised hypercomplex cross-correlation is maximised by searching through combinations of (θ,φ) and predicting the magnetic field measurements which would be received at that point on the sphere. This is undertaken for a particular alignment of the sensor reference frame, which can be represented by the quaternion $q_r$. For the initial step, $q_r=[1,0,0,0]$ (zero rotation) meaning that the source and sensor frames are perfectly aligned. Any suitable search algorithm can be used, such as least mean squares, genetic algorithms or even an exhaustive search.
2) Once the algorithm has converged, or a suitable number of iterations have been undertaken, the quaternion representing the normalised cross-correlation value is examined. As noted previously, when the predicted and measured sequences are perfectly correlated, both in orientation and location, the quaternion $r_n(n_p)$ will be purely real. If this occurs, then the algorithm has converged and can be terminated. Such an example is shown in FIG. 13.
3) If there is a non-zero imaginary part, this indicates that source and sensor frames are not aligned. The sensor frame needs to be rotated in order to align it with the source frame. The cross-correlation quaternion indicates both the axis about which the rotation should occur, and the angle. The angle and axis is calculated as:

$$q_t = \left[r_0, \frac{r_x}{2}, \frac{r_y}{2}, \frac{r_z}{2}\right]$$

where $r_n(n_p)=[r_0, r_x, r_y, r_z]$. The quaternion $q_t$ is normalised to make it a rotation quaternion, and the new quaternion representing the orientation of the sensor frame calculated as: $q_r(new)=q_t q_r(old)$. Steps 1-3 are repeated until the quaternion only has a real component (i.e. the eigen angle is zero).

Once the algorithm has converged, a number of parameters are known. The orientation of the mobile device 100 is precisely defined by the rotation quaternion $q_r$. The point on the unit sphere where the normalised cross-correlation is maximised is also known. This point lies along the line that extends from the centre of the local unit 102 to the mobile device 100. To determine the position of the mobile device 100 all that is required is to calculate the power in the measured signal (essentially by computing the non-normalised cross-correlation). With this final piece of information, the location of the mobile device 100 can be expressed in spherical co-ordinates relative to the local unit 102, with a particular orientation.

In another embodiment, the bearings (i.e. (θ, φ)) from a plurality of local units 102 can be used to determine the location of the mobile device 100. This may be useful in situations where the power of the signal is distorted or affected by environmental characteristics such as ferrous objects or noise.

The hypercomplex encoding as described has focussed on the merits of using three dimensional coding for determination of position and orientation. However, it is also possible to use the same approach to convey modulated data, in addition to the identity of the local unit. This is undertaken by rotating the transmitted hypercomplex template in accordance to the data to be transmitted.

For example, a simple rotation may be effected by swapping the x and y axes of the transmitted template. Rotations are not constrained to be in multiples of 90 degrees and can be arbitrarily created by using a rotation matrix or a quaternion which is used to rotate the template signal before it is transmitted. A symbol mapping could be used to translate the binary data to arbitrary three dimensional rotations. In addition, a scaling (change in amplitude) could also be used to convey an additional dimension of information.

Similar to the process described above, a known preamble sequence could be transmitted at the start of the data transmission which would serve to train the channel. Subsequent templates would be rotated in accordance with the data to be transmitted. The receiver would use the known preamble sequence to train its symbol mapping and then decode subsequent symbols. As described above, motion correction could be used if the mobile device was moving, to maintain correct symbol decoding in spite of changes in orientation.

One embodiment of this approach is that all devices could use the same template and transmit their unique identifier by rotating the template in accordance with the defined symbol mapping. This would reduce system complexity, as only one template sequence would need to be known.

An alternative embodiment of hypercomplex encoding is to represent different symbols by different hypercomplex templates. For example, template A could represent a '0' and template B (which is different to template A) could represent a '1'.

Data-Blind Localisation:

In general, the techniques discussed above have relied on knowledge of the symbol mapping or encoding. However, it is possible to determine the relative position of the user to a local unit 102 without knowing the precise modulation scheme used. This is because the magnetic field generated by the local unit will create an ellipsoidal shape in the mobile device's local reference frame. The major axis of the ellipsoid (which is twice as large as the minor axes) lies along the vector joining the transmitter to the receiver. Hence, by identifying the orientation of the ellipsoid in the reference frame, such as by using spherical harmonics or pattern matching, it is possible to determine the relative angular position of the mobile device 100 with respect to the local unit 102. The scale (amplitude) of the ellipsoid is a function of the distance between the local unit 102 and mobile device 100, approximated as an inverse cube law. As the mobile device 100 moves or alters orientation, the ellipsoid will rotate to always point in the direction of the transmitter. By establishing the relative angle between multiple local units 102 and a mobile device 100, the precise 3-D position can be determined. This is a simple way of decoupling the process of localisation from communication.

Alternatively, if only one signal from a local unit 102 is available, the position of the mobile device 100 can be inferred if the mobile device 100 is equipped with additional sensors, such as an IMU. As the mobile device 100 moves, the time varying trajectory as generated by the IMU can be used as a constraint to estimate the position of the user, given a set of time varying angular measurements, such as by using a particle or information filter.

Chaotic Spread Spectrum

Another encoding example is 'chaotic spread spectrum' encoding. This is where the receiver synchronises to the signal buried within the noise. Higher dimensional subspaces, and hence different vector measurements of the magnetic field, are utilised for this. This provides the advantage of better capture of weak signals buried within magnetic noise.

A chaotic dynamical system is one which exhibits high sensitivity to initial conditions, yet is generally specified by relatively simple equations, which typically contain a non-linear term. A chaotic system can be represented in the form of a number of state space equations:

$$x_{k+1} = f(x_k) \quad k=0,1,2\ldots$$

where $x_k \in R^n$ is the state of the n-dimensional system and $f(.)$ maps the current state to $x_k$ to the next state $x_{k+1}$.

If two chaotic systems have identical initial conditions, then they will evolve in the same manner through state space. However, even if their initial conditions differ slightly they will rapidly diverge and follow a different trajectory through state space. Some typical non-linear maps used in chaotic dynamical systems are the logistic map, the Henon map, Lorenz and Rossler systems. The degree of divergence between chaotic systems is defined by the Lyapunov exponent $\lambda$.

Chaotic equations can be used in the present invention in two different manners.

In the first application, they can be used as an alternative to PN codes (e.g. Gold or Kasami) discussed above in Hypercomplex encoding. The disadvantage of Gold/Kasami/PN/Walsh codes is that they are designed typically for binary systems operating in one dimension, whereas in Magnetic Vector Modulation, the magnetic vector can be arbitrarily oriented in any direction. It is thus beneficial to generate codes which are able to control the azimuth, elevation and amplitude of the magnetic vector (i.e. multidimensional spreading codes). Chaotic codes can be created with arbitrary lengths and desirable properties such as a cross-correlation function approaching a perfect impulse (dirac delta function). To generate a chaotic based code for hypercomplex encoding, the chaotic state space system is initialised with a certain state. This initial state defines the unique evolution of the state space system and can be regarded as the correlation code or template. The state space system is then executed for a certain number of steps—this defines the length of the code. The generated state outputs are used to control the magnitude and phase of the currents flowing through the coils 304 in local unit 102. Each axis is controlled by the value of a particular state at a point in time. Note that there may be more states in the state space than coils to control, these are referred to as hidden states. The mobile unit 100 is able to recreate the chaotic spreading code with knowledge of the state space equations, the initial conditions and the length. The hypercomplex correlation process is executed as described above. By specifying different initial conditions, different lengths or an alternative set of state space equations, unique chaotic codes can be generated by local units. Note that the code does not need to be generated each time and can be pre-calculated.

In the second application, the ability of two chaotic dynamical systems to self-synchronise is exploited to provide a means of communication. The transmitter and receiver both execute the same state space equations. The transmitter communicates a "drive" signal over the potentially noise impaired channel. This drive signal is used as input to the receivers state space equations.

Over time, if the noise is not excessive, the state space phase trajectory of the transmitter and receiver will synchronise. To communicate information, there are a number of techniques that can be employed, such as chaos shift keying (where a state space variable is modulated or keyed in response to information to be transmitted), chaotic masking (where a message is modulated onto the channel by altering the channel output and feeding this back into the transmitters state equation). State space systems also have the property of having "attractors". These are regions of the phase space which act as stable trajectories, often exhibiting periodicity. Whether or not the state space system has been captured by an attractor can be used as a means of determining the presence or absence of a chaotic code. The advantage of using chaotic self synchronisation is that it is able to detect very weak signals buried within noise.

Broadcatching

Local unit 102 magnetic transmitters may have a small bandwidth, which could be seen as a potential drawback as this may limit the bitrate a single transmitter can send. This was one motivation for increasing the bitrate using vector magnetic modulation and/or hypercomplex encoding described above. However, in the situation of multiple transmitters, the narrow bandwidth of a transmitter can lead to significant advantages.

Generally, the bandwidth of a receiver is much wider than that of a transmitter, so a receiver can receive many different signals from different transmitters simultaneously. This is achieved by tuning the receiver loops so that they do not have any frequency dependent response. Due to the lumped resistance and stray capacitance of the loop, it will have a self-resonant frequency. This can be adjusted by electrically lengthening the antenna using a parallel capacitor to tune to the operating frequency. As the dominant impedance of the loop is its self-inductance L, the current flowing through the loop can be determined:

$$V = \mu_0 NA\omega B \cos\theta$$

$$V = iZ \text{ (Ohm's law)}$$

$$Z = j\omega L \text{ (when capacitance has been corrected for and resistance neglected)}$$

$$\therefore$$

$$i \propto \frac{\omega B \cos\theta}{j\omega L} \propto \frac{B\cos\theta}{jL}$$

Where $\omega$ is the angular frequency of the signal, B is the magnitude of the magnetic field vector, $\theta$ is the angle between the transmitter and receiver loops and $j=\sqrt{-1}$. Thus there is no frequency dependent response from the receiver meaning that it is suitable for use over a wide bandwidth.

When the operating frequency is low, it is computationally simple and feasible to simultaneously decode multiple frequency separated data streams. Thus a receiver can 'listen' to many transmitters at the same time. This concept is termed 'broadcatching' as it is the reverse of broadcasting, being many-to-one as opposed to one-to-many.

Contention free: One advantage of utilising broadcatching is that through frequency division, contention can be eliminated entirely or greatly reduced (random channel allocation). This is important as the high latencies of the magnetic channel will be exacerbated if nodes have to contend for access to the medium. Interference will also be eliminated, which again is important both in terms of latency and energy consumption, as failed packets have to be retransmitted and hence waste energy and bandwidth. In an example system where the receiver bandwidth is 2 kHz, if channels are spaced every 50 Hz, 40 distinct frequency channels can be packed into the bandwidth. Given the low probability of collision, nodes can randomly hop to a new channel for each transmission. Although this introduces contention, the probability of interference is very low. Also note that the receiver does not need to be aware of the channel hopping sequence and it can be completely random. In terms of implementation, the number of channel decoders does not need to be equal to the number of input channels, only to the number of 'children' (relevant transmitters). Channel decoders only need to be executed when a valid signal is received. Thus, channel decoders can be dynamically mapped to particular frequency bands. Channels with low SNR, such as those with harmonics which closely resemble mains electricity frequencies, can be avoided.

Network Algorithms: The second major difference is in operation of standard network algorithms, such as tree collect and query propagation. In a mine rescue scenario as described below, aggregation queries such as sum, max, average etc., can be used to determine the number of people underground, the maximum methane concentration, the minimum oxygen concentration and so forth. One example would be for a 256 bit message with a bit corresponding to each miner. A local unit changes a bit to 1 if a message from the corresponding miner has been received, then forwards this to the next local unit 102. It is important for a rescue that such information can be gathered rapidly. To execute an aggregation query, data originates at the leaves of the query tree and percolates upwards. Once each parent has obtained all the data from its children, it combines its own sensor value with the query function, ready to send to its parent. In conventional wireless sensor networks, this means that each child must send its data in a time-slotted fashion to its parent, in order to prevent collisions at the receiver. Hence, the time taken for each node to gather the data to execute the query is related to the number of children it has. In general, if each parent has B children, and the depth of the tree is D, then the total time taken to execute the aggregation query using conventional time slots is proportional to DB. This implies that to minimise the time taken to execute the query, the breadth B and the depth D of the tree should be equal. In addition, trees should be balanced such that each node has an approximately equal number of children in order to minimise the maximum breadth.

In a broadcatching tree, the children can all send their data during the same time slot. Thus, the number of children that a node has does not alter the data gathering time. Thus, the total time taken to collect information from such a tree is proportional to D units of time, where D is the depth of the tree. This is an important result, as the execution time is independent of the number of nodes in the network and only related to the tree depth. It also shows that trees perform better when broad rather than deep, and that balancing the number of children per node is not important (subject to channel availability). It is also more energy efficient to use a broadcatching tree, as nodes do not need to stay awake to gather data over multiple time periods. Broadcatching can also be used in decentralised algorithms which require state information to be gathered from all their one hop neighbours. If nodes are divided into two groups, such that no nodes which share a link are in the same group, then nodes can establish a two stage cycle, alternating between transmitting and receiving. At the end of the cycle, all nodes will have complete state information from all their neighbours.

An alternative to broadcatching using frequency-division is using code division. Each child transmits their message encoded on unique orthogonal codes. This has the same effect as frequency division broadcatching but requires slightly more complex circuitry to receive and decode them. It should be noted that only children of the same receiver must have a unique code or frequency band, these may be repeated in other places in the 'tree' where contention would not be an issue.

Broadcatching and Magnetic Vector Modulation Combined

Figure 20:
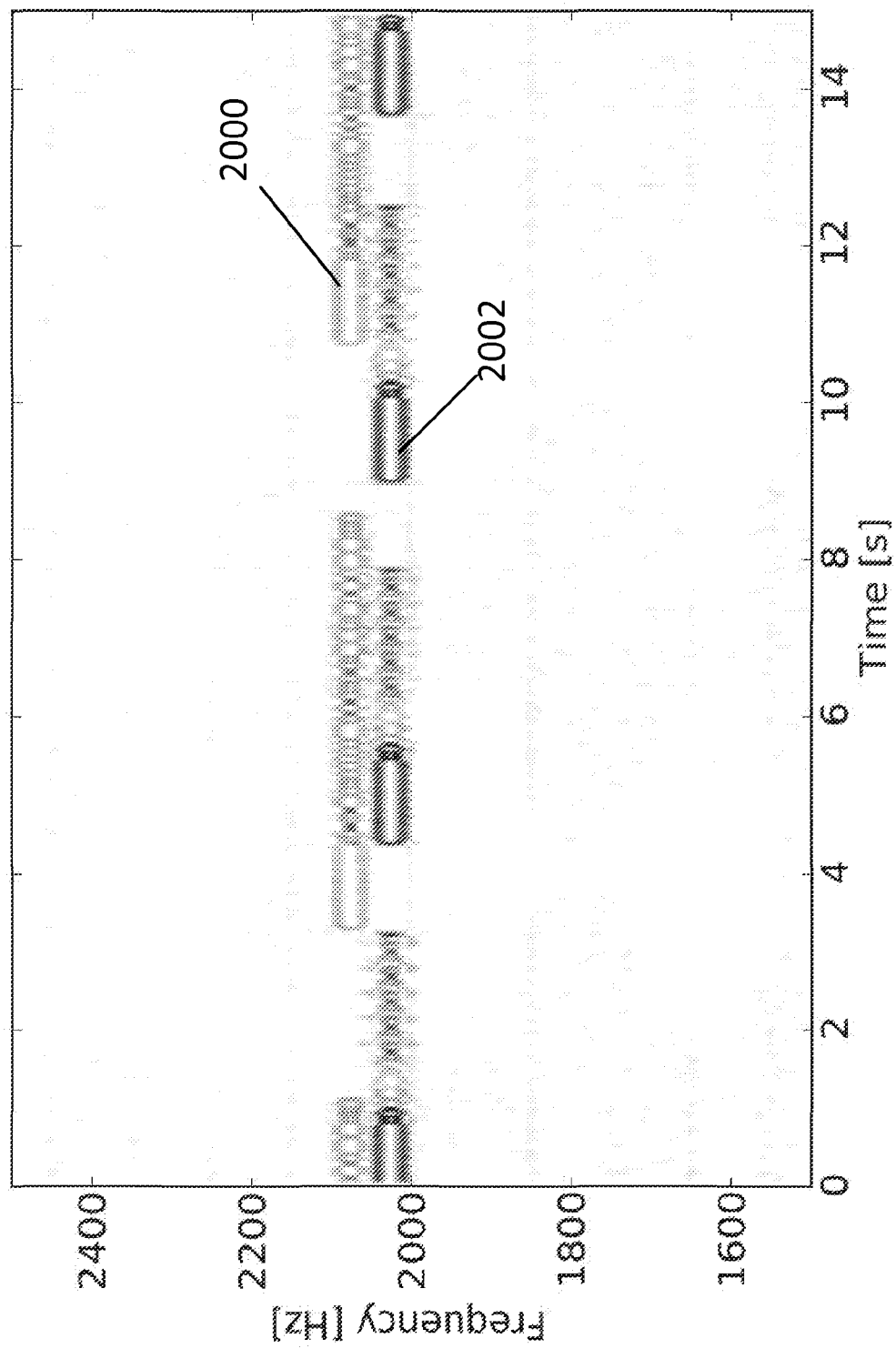
FIG. 20 shows a two example signals, one utilising magnetic vector modulation and one not.

Advantages of broadcatching and magnetic vector modulation are shown in FIG. 20. FIG. 20 shows a spectrograph of two separate signals 2000, 2002 received simultaneously from two different transmitters. These signals were received having passed through approximately 10 m of soil and rock. Each signal has a bandwidth of 50 Hz; with carrier frequencies based around 2025 Hz (2002) and 2075 Hz (2000) respectively. The signals are distinct from one another at the receiver end, showing that two signals from two transmitters can be usefully received. Both signals are carrying the same (repeated) message; signal 2000 was sent on a single axis whilst the lower frequency signal 2002 was sent utilising magnetic vector modulation as described above. The time taken to send the message using magnetic vector modulation is significantly shorter.

Figure 21:
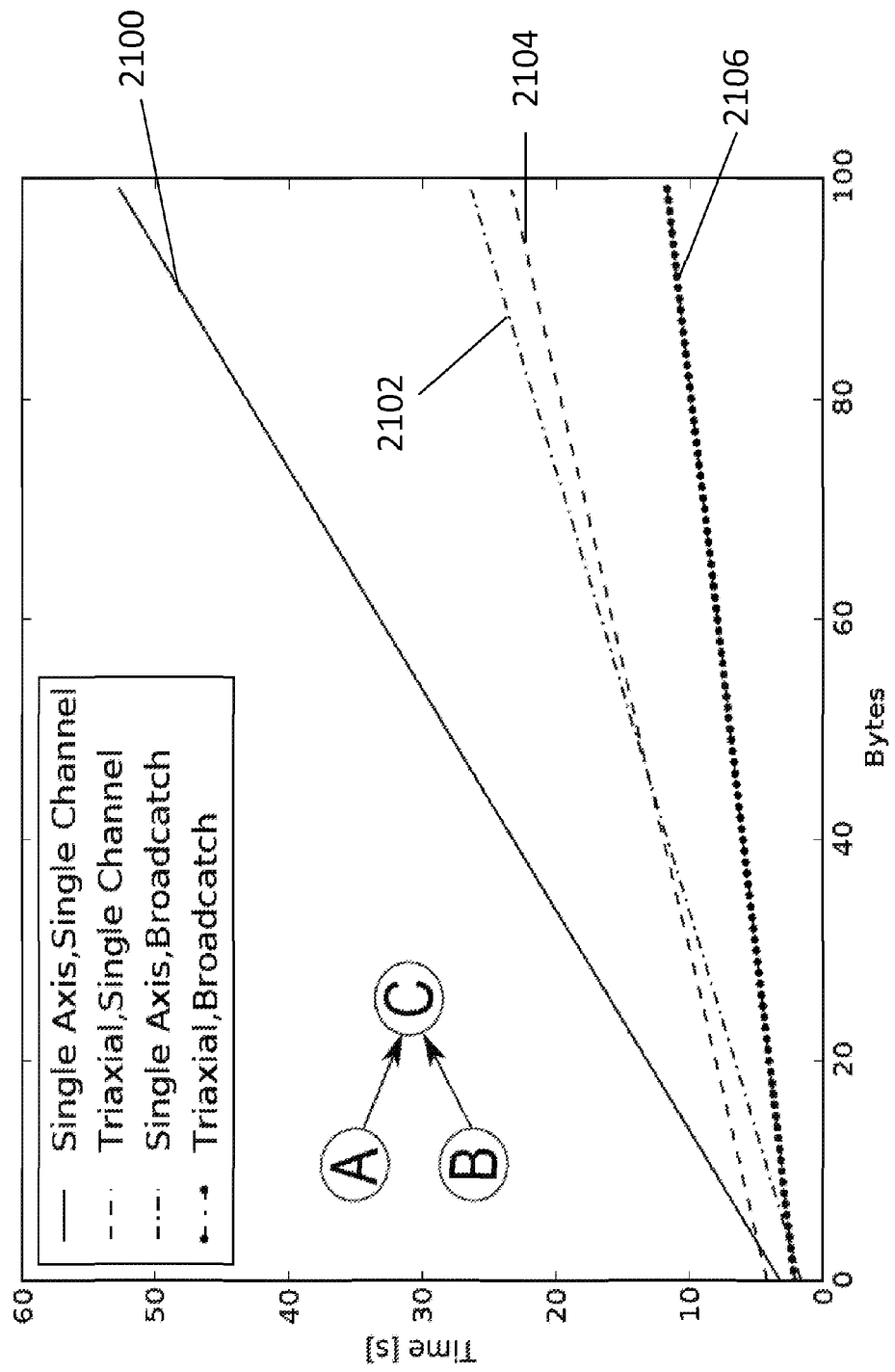
FIG. 21(a) shows the latency of signals send from two children to a single parent of varying length for various transmission and encoding methods.
FIG. 21(b) shows the same as FIG. 21(a) for the case of three children.
Figure 21:
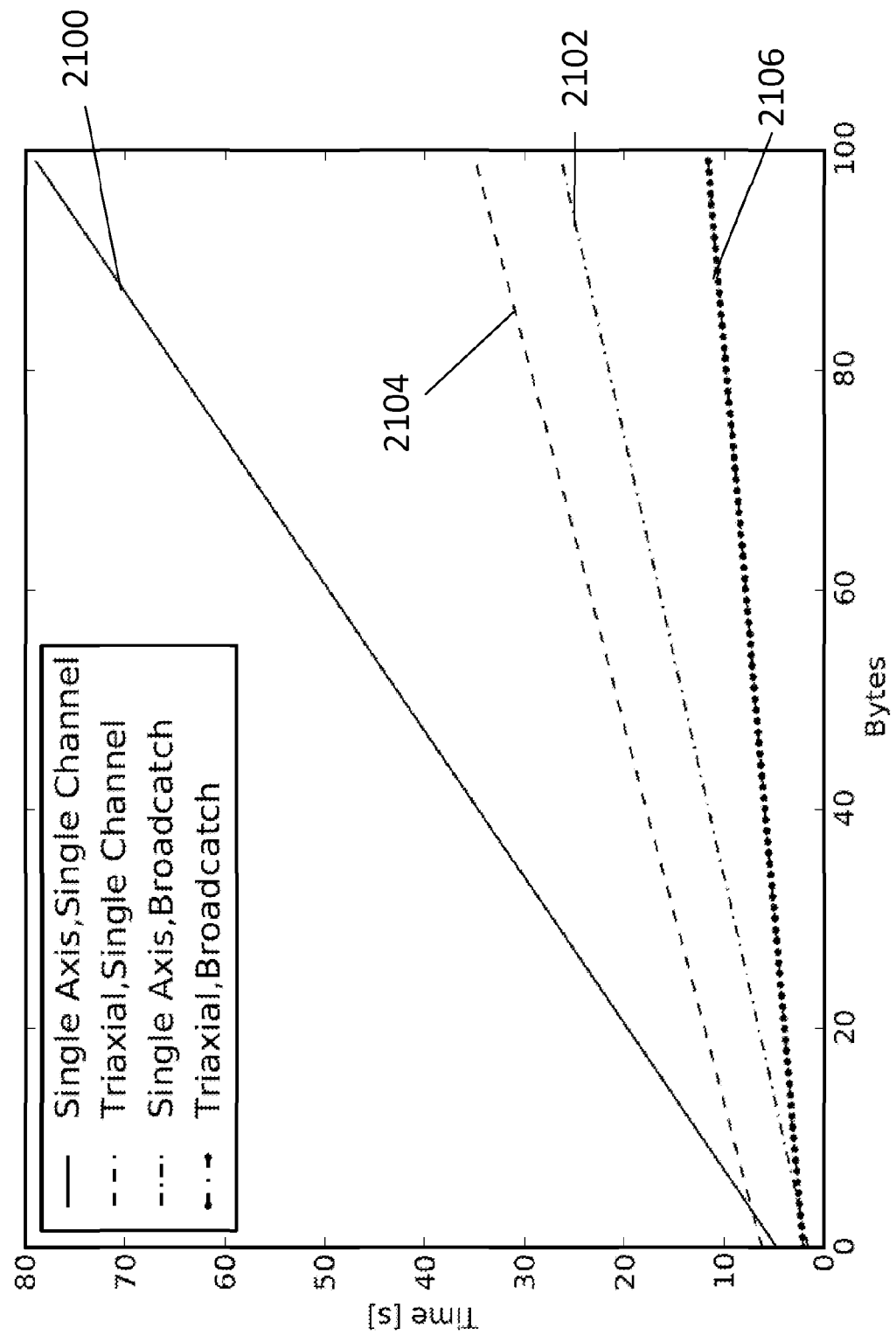

FIG. 21(a) shows the time taken (the latency) for messages of varying lengths (in bytes) to be transmitted using different encoding methods and transmitter type. In this example, the situation of two 'children', A and B, communicating to a receiver, C, is modelled. Each child sends the same length message, this message length being plotted on the x-axis. The solid line 2100 indicates the time taken for both messages to be delivered when transmitted on a single channel (i.e. not broadcatching) and using a single axis. When transmitting on a single channel, each child has to transmit in turn, often resulting in high latencies as discussed above. As FIG. 21(a) shows, this is exacerbated when the message length is large. The dot-dash line 2102 shows the improvement over this when using broadcatching, but still transmitting over a single axis. In the two-child example, this results in the gradient and y-intercept of the line being halved.

Dashed line 2104 shows the latency of the signal when transmitting over a single channel, but using three axes (i.e. magnetic vector modulation). The message length here is reduced compared to the single axis, single channel scenario, for messages over a certain, low, length, as discussed above. Interestingly, the single axis, broadcatching signal (line 2102) has lower latency for signals below around 45 bytes. This shows that in certain circumstances it may be less efficient to utilise magnetic vector modulation on its own. Furthermore, when there are three or more 'children', the broadcatching, single axis signal always has lower latency than the single channel, triaxial signal; independent of the message length. This is shown in FIG. 21(b) which is a corresponding graph to FIG. 21(a) for three 'children'.

The largest performance gains are achieved by a combination of broadcatching and magnetic vector modulation, shown by dotted line 2106. This has the effect of halving the gradient and y-intercept of the triaxial, single channel line (line 2104). In the two-child example shown, communication time for a message of 100 bytes is reduced from 53 seconds when transmitting over a single channel and axis to 11 seconds for broadcatching and magnetic vector modulation, and improvement of over 4.5 times.

Figure 22:
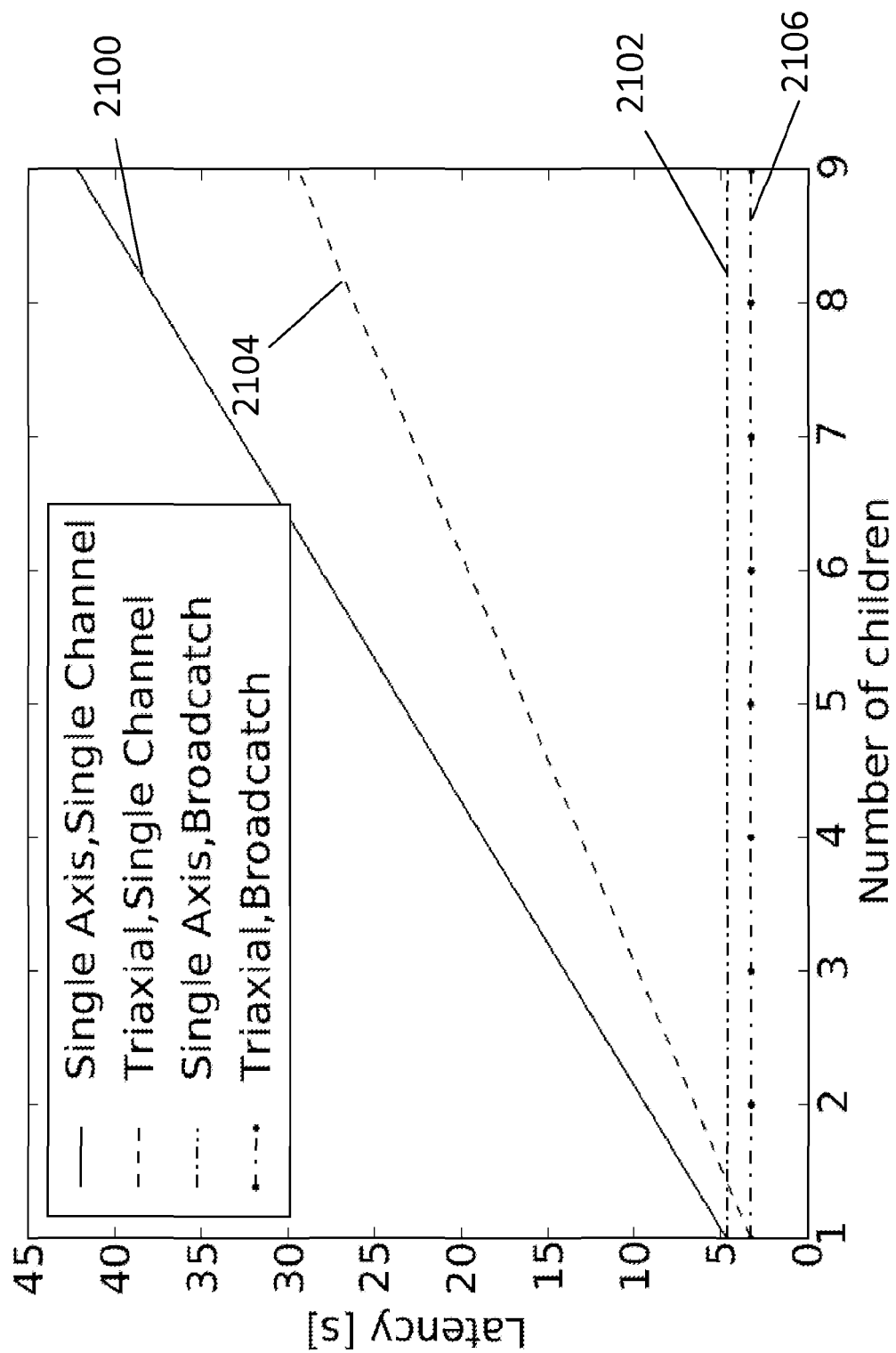
FIG. 22 shows how the latency of 100 bit messages varies depending on number of children for various transmission and encoding methods.

FIG. 22 shows the latency of 100 bit messages each being sent from 1 to 10 children. The Figure shows that the latency of signals sent using broadcatching 2102, 2106 is independent of the number of children; whereas a linear relationship is exhibited for single channel signals 2100, 2104.

Broadcatching is thus very useful in situations where multiple devices need to communicate to a central receiver as the lag in receiving all the information is reduced greatly. Furthermore, the distinct frequency and/or code divisions can function as an indication of origin, thus reducing the amount of data to be sent, thus speeding up transmission times. An application in which this would be particularly useful is in a mine where multiple miners communicate with a central receiver, which then relays this information to the surface. This example is described in detail below but it will be clear to one skilled in the art that many analogous situations exist.

Mining Specific Details

Figure 23:
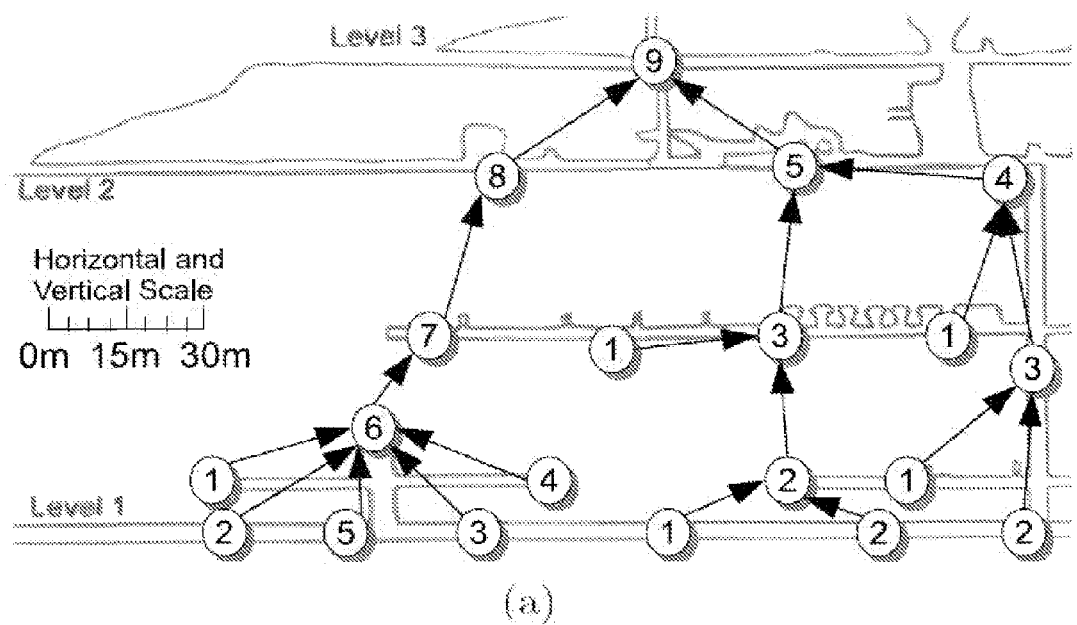
Figure 23:
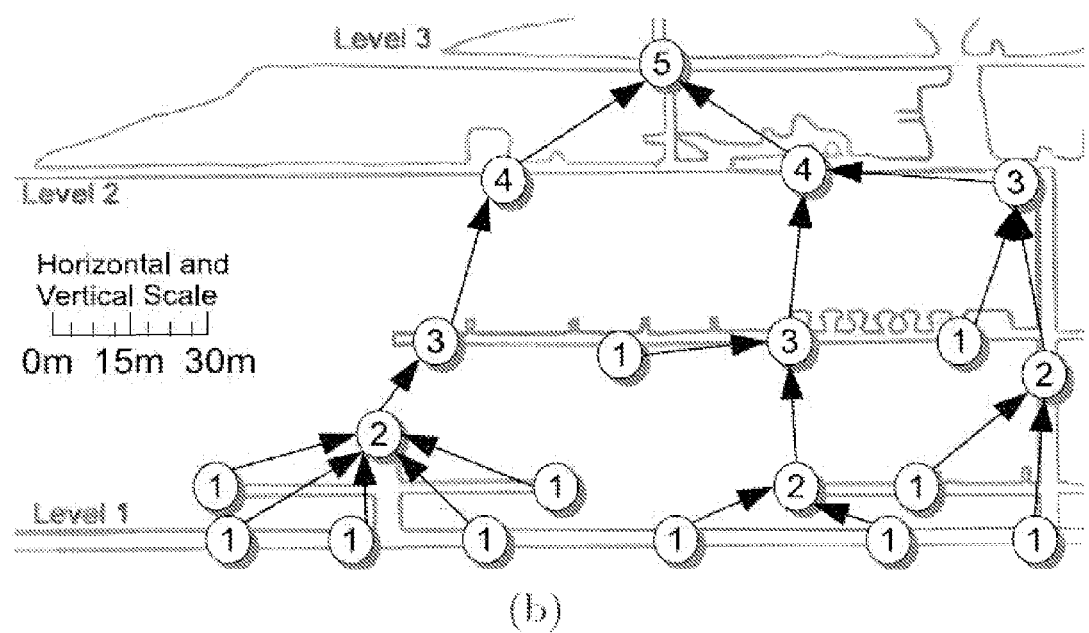

FIG. 23 shows an underground scenario wherein signals from underground transmitters are relayed up to the surface in what is termed a 'multi-hop' network. Such a scenario could be anticipated in a mine collapse where wired communications may not be possible. FIG. 23(*a*) shows the relay method used in a traditional tree, and FIG. 23(*b*) when broadcatching is used. In the traditional tree of FIG. 23(*a*), a receiver can only receive a single signal at a time, and thus has to wait until all its 'children' have transmitted in turn before it can re-send the message. The numbers at each transmitter/receiver denote at what time they can transmit their message up the tree. In the scenario shown, it takes 9 time periods before a message can be sent to the surface.

In the tree utilising broadcatching shown in FIG. 23(*b*), the 'children' can send their messages simultaneously. This means that the time for a message to be sent to the surface is only limited by the longest 'chain' from bottom to top. This is always at least as efficient as the traditional tree, and often much more efficient. In the example shown, a message is sent to the surface after 5 time periods. This is an increase in speed of 180%. In situations where bitrate is low, which can be the case when utilising magnetic channels, this speed up can result in signals taking seconds less to propagate to the surface.

When the combination of broadcatching and magnetic vector modulation is applied to the scenario shown in FIG. 23 with a 30 byte message length, the aggregation time (i.e. time for message to reach the surface) is reduced from 163 seconds to 25 seconds, a speed-up of over 6.5 times. In a mining disaster scenario, the difference between 25 and 163 seconds can be very important, if not life-saving.

FIG. 24 shows a communication network in a mine before (a) and after (b) a collapse. In normal use, wired communication 2400 with short-range, high bitrate wireless communication 2408 is used by communication nodes 2402 as this is by far the fastest and most reliable form of communication. The sensors 2404 and users 2406 communicate with these communication nodes 2402 using wireless communication 2408 such as Zigbee®. The messages such as position, oxygen levels etc are collected by the communication nodes 2402 and relayed to the surface, preferably utilising the broadcatching method outlined above with reference to FIG. 23(*b*).

FIG. 24(*b*) shows the network after a collapse. The wired communication 2400 may no longer be possible as the wires may have been severed. Previously, communication in scenarios such as these has been very limited. Solutions such as hitting rock or metal bars with sledgehammers is often employed, but has obvious disadvantages such as being unreliable, slow and physically demanding. Other solutions include 'through-the-earth' communication using low frequency magnetic fields. This involves use of a very large loop antenna placed at the surface driven with over 1.5 KW of power. This only allows one-way communication and does not allow trapped miners to communicate to the surface. The present solution solves at least some of these problems.

Following a collapse, the network re-organises itself to use magneto-inductive links 2410 to re-route around the collapse, or communicate through it. These links 2410 have a lower bitrate than wired links 2400, but can transmit through large distances of rock and soil without significant attenuation. When utilising a multi-hop network, signals from deep inside the mine can percolate up the network to the surface without losing power. As the distance between devices is smaller than the total distance to be covered, the overall energy usage of the system is lower. This allows for smaller, more energy efficient devices to be used. Such an approach reduces system cost and increases redundancy.

The manner in which the network re-organises itself may depend on the network itself and the nature of the collapse. For example, the network design may have to choose whether a particular transceiver node communicates directly with the surface, or via a multi-hop system which may be slower, but more reliable. The network re-organisation may happen in an iterative fashion, the network changing until an optimal network is found. This may optimise factors such as speed of transmission, reliability, or any of these factors in relation to particular locations (e.g. trapped miners). A similar re-organisation may occur when a new magnetic transceiver node (communication node) 2402 is introduced in the system. This would ensure the most efficient use of the magnetic transceivers 2402.

FIG. 25 shows a block diagram design of a transceiver node, effectively a mobile device 100 and local unit 102 combined. The block diagram of a magnetic transceiver node is shown in FIG. 25. A digital signal processor (DSP) 2500 essentially acts as a software defined radio (SDR). Through digital-to-analog converters (DAC) 2502 and power amplifiers 2510 the signal is modulated before generation. Analogue-to-digital converters (ADC) 2504 and Low Noise Amplifier 2512 enable data to be received from the magnetic channel. The magnetic field is generated and detected by a triaxial antenna 2506 (e.g. as described in previous embodiments). The node is also equipped with a Zigbee (802.15.4) transceiver 2508 (as described previously) to allow for short range, high-data rate communication. The transceiver node, in one example is powered by a battery 2514. The node could also be equipped with any other available wired (e.g. profibus, fibre optic, ethernet) or wireless (WiFi) communication module.

The magnetic transceiver nodes are equipped with backup batteries to enable operation to continue even if power fails. The magnetic transceiver nodes can also be equipped with sensors themselves to measure directly parameters such as carbon monoxide concentration or temperature. They can also query wireless sensor devices and hence act as a gateway between the surface and underground. Thus, the system aims to augment existing wireless technology by providing a robust backup path.

The low bitrate magnetic channel has significant implications for network operation, in particular the latency of query responses. To overcome this, methods such as broadcatching and magnetic vector modulation can be utilised as is described in detail above.

The positions of the transceivers can be determined using manual surveying techniques. However, given that the transceivers are able to determine their relative positions and orientations with respect to one another, it is possible for them to execute a distributed localisation algorithm (such as a gradient descent) to determine their positions in a relative coordinate space. If three or more transceivers are localised to an absolute coordinate frame (e.g. by manual surveying, GPS or other means), then the positions of all the devices in the network can be determined. Stationary transceivers placed within the mine could refine their locations by transmitting very long (seconds or minutes long) correlation codes. As the magnetic channel is not subject to time variation or multipath, there is no loss of coherence and the position can be refined to a very high degree. An alternative would be to use the standard length correlation codes with successive averaging.

To optimise system lifetime, the transceivers can act in a self organising network as described below, altering their transmitted power and constellations to send data along the best route with lowest delay. For links with high signal to noise ratio, the output power of the local unit 102 could be reduced to conserve the battery power of the transceiver.

As those skilled in the art will appreciate, the transceiver antennas can be any size or shape, and transceivers at different locations within the mine could have different sizes or power outputs, forming a heterogeneous network.

The devices carried by the miners or equipped on the mining vehicles could comprise local units 102, mobile devices 100 or a combination of both (transceiver), in addition to other communication (e.g. Zigbee) and sensing modalities (e.g. accelerometers). Using such a system, miners/mining vehicles could communicate with the multihop network and infer their location and be tracked by the surface operators.

In addition, such a system would allow for vehicles to be remotely operated in unattended or labour lean mining operations, as they would be able to localise precisely in 3-D, communicate their position, and receive commands from the surface. Such a system would be advantageous as it would reduce the need for people to work underground, which is potentially dangerous.

In addition to or instead of magneto-inductive links shown in FIG. 24(b), 'current injection' can be used to communicate when wired links are not possible. This is where rather than using loop antennas as described previously, current is injected directly into a conductive medium (for example rock or soil). Using multiple injection points (feedpoints) with current control allows for a time-varying rotatable magnetic field as would be necessary for utilising one of the encoding methods discussed above. For example, in an underground tunnel, four feedpoints on the floor, roof and walls respectively would be able to generate, and rotate a two-dimensional magnetic field. Two more feedpoints along the length of the tunnel would enable the system to generate a three dimensional field. This could potentially replicate a local device 102 with three coils.

An arbitrary number of antennae could be used, which could make a magnetic tomography network within the mine structure. With correct calibration, this could serve as a communications network in the same way as a distributed network of local units such as described above with reference to FIGS. 23 and 24.

Advantages of a current injection system is that long ranges of communication can be achieved for the same power as the antenna are effectively extended by the conductive media (e.g. rock or soil). This also allows for physically smaller antennae to be used, they just need to be coupled to the conductive media and impedance-matched.

An alternative implementation of this magnetic inductive and/or current injection communication is infrastructure monitoring. Local units 102 can be embedded within a structure connected to sensors such as stress/strain meters. These can communicate wirelessly to a base station (potentially using a similar multi-hop network as described above) to report infrastructure data from within a building without any human intervention or invasive methods. The communication could utilise current injection, potentially exploiting the highly conductive steel superstructure if one exists.

An alternative implementation of this magnetic inductive and/or current injection communication is in the construction industry, where it is desirable to know the positions of workers, vehicles and materials. This could be combined with embedded infrastructure sensors as described above, to monitor the construction process.

Alternatively, large transmitter coils could be embedded within walls and floors of a building, allowing the fabric of the building to act as a means for localisation.

Some of the many advantages of the system presented include:
1) Deployment is simple as transceiver devices are insensitive to relative orientations and alignments
2) Localisation of devices can be performed using the multi-hop network. The network can also localise its constituent nodes which helps to reduce deployment time and cost.
3) Higher data rates are afforded by the techniques discussed above (magnetic vector modulation and broadcatching). This reduces the time required to gather or send information to the network.
4) By using multiple low power links, long distances may be spanned using less power overall.
5) The distributed network provides redundant paths.
6) The distributed nodes can be used to enhance location accuracy as multiple signals from nodes can be combined.

FIG. 26 shows a flow diagram of a method used in a mine (or other network) as described above. The first step S1 is where the transceiver's 'children' transmit their signals. These may be sensor readings, a personnel count and/or a signal sent from another transceiver 2402. These may be sent over different channels, such as magneto-inductive, Zigbee®, WiFi etc as described above. The transceiver 2402 receives these signals in step S2. This may be performed simultaneously if broadcatching is employed.

The transceiver 2402 then combines these signals in step S3. This may comprise summing, counting, determining max/min values, compiling or any other operation on the received signals. This new information is then translated into a new signal in step S4. The final step is transmitting the signal at step S5. This may be over any wired or wireless link as described above.

Self Organising Networks/Noise Control

The constellation diagrams shown by FIGS. 18 and 19, as described above, represent the points in three-dimensional magnetic field (B-field) space which are mapped to particular symbols. In general, it is preferable to space these points evenly within the B-field vector space to avoid incorrect symbol mapping. However, if there is directional noise (interference), adjusting the position of the points may be beneficial. Directional noise would result in certain 'clusters' being distorted more than others, or being distorted more along certain directions than others. In such a situation, the constellation points (symbols) could be spaced further apart along such directions to counter the directional noise.

In a communication example, where the transmitter and receiver are fixed with regard to one-another, altering the position of the constellation points could effectively avoid noise. In a localisation example, it is necessary to overcome, rather than avoid noise in order to obtain good measurements of signal strength and/or directionality. In this case, the constellation may be adjusted so that more energy is placed along the axis where the noise exists.

The process of altering the constellation in either of these examples may occur on an iterative basis using feedback so that an optimal constellation map is produced. This could be performed as a simulation, once during a mapping phase (pre- or during deployment of the system), or after deployment. The feedback may be via a wireless channel (WiFi®, Bluetooth®, magnetic induction etc) when optimising the constellation. Full closed loop feedback using device(s) IMU may be utilised to optimise the system. In a mining scenario, mining vehicles and people are constrained to move within tunnels. Their repeated paths can be used to determine the structure of the mine, which in turn could be used to adjust the constellation to focus on frequently used areas. This statistical approach to altering the constellation could equally be used in other scenarios such as in a shopping centre, museum or tracking underground animals for example.

Within a building, transmitters would often be mounted in building corners or walls. It would thus be preferable for these transmitters to alter their constellation to focus the majority of energy within the region to be localised (i.e. forming a convex hull). Using feedback, this can be further improved to determine areas of low signal strength, or areas that need accurate localisation, and the constellation can be adjusted as is necessary. Iterative localisation may be employed where a mobile device 100 instructs a local unit 102 to dynamically alter its signal pattern in order to increase accuracy. These measures results in potentially improved localisation accuracy and improved power efficiency for the local unit 102.

Noise sources are often directional, in such cases this can be exploited by using 'differential antennae', where multiple antennae are essentially used to beam-form (without using phase delay, but using intersection of vectors). This improves the SNR of the signal and hence affords longer range communication and noise cancellation. In essence spatially separated antennas can provide information regarding not only the magnitude/direction of a magnetic field, but also its gradient or rate of change with distance, where the distance is the spatial separation between the antennas. Differential antennas can be used to receive a signal from a distant transmitter while subject to noise from a nearby interferer (such as a mains, motor or transformer). The nearby noise source will exhibit a high rate of change of magnetic field across the plurality of receiving antennas. The distant source of information will have very little variation in magnetic field across the plurality of receiving antennas. Hence, the information source is common to the plurality of receiving antennas and can be extracted, whilst ignoring the nearby noise.

FIG. 27 shows a feedback process which the system described above may utilise to control noise and/or generate a more efficient network, for example, after the insertion or removal of a local unit 102.

The process starts at step S1 where feedback is generated. This may be from other local units 102 (e.g. using feedback device 316—FIG. 3), mobile devices 100 or specialised feedback units (during deployment for example). This information is sent to a processor in step S2. This processor may form part of one of the local units 102 or may be a central processor connected to all the local units 102 in the network, or a selected subset of local units 102. The feedback may be sent using a wireless connection such as magneto-inductive link, WiFi, Zigbee etc, or a wired link. The feedback information could include for example: the SNR, the accuracy of transmission (when compared with a signal with no errors), or simply a retransmission of the received waveform.

The processor then generates a signal/noise map in step S3. This uses the feedback to produce a map of the signal coverage of an area, and/or areas or directions which are adversely affected by noise.

The processor then determines whether any change in signal would result in a more efficient network in step S4. This could be performed by a computer simulating changes to the signals from various local units 102, producing a new signal map and comparing it to the original signal map. If a change in signal is necessary, the processor determines the signal modifications necessary in step S5. This may include changes such as boosting power to certain local units 102 and/or changing the constellation patterns.

These instructions detailing the new signals are sent to the local units in step S6 which implement them and the feedback process starts again from step S1. This loop continues until the processor finds that an optimum or satisfactory network has been generated, when it is terminated at step S7. Such a feedback process could be conducted once during deployment, at regular intervals, or whenever a change to the network is made, for example, when a new local unit 102 is installed.

Aid Rescue

A further application of many of the apparatus and methods described herein is an aid to rescue/localisation. In one example, the local unit 102 is a mobile device carried around by a person. In case of an emergency, for instance when a person is covered by soil, rubble, snow etc. after an earthquake, tsunami and/or avalanche, the trapped magnetic field transmitter 200 (FIG. 2) can transmit a signal; aiding rescue workers to locate the trapped person.

A mobile device combined with a magnetic field transmitter 200 (essentially forming a transceiver 152) could be used to detect when rescue workers are nearby (who carry a similar transceiver device 150—FIG. 28, which would periodically emit a trigger signal), and decide when to transmit a signal, thus conserving battery power. The format of the signal generated by the mobile transceiver 152 could also vary according to the range or signal-to-noise ratio of the received signal from the transceiver carried by the rescue team. For example, if a weak trigger signal is received, then the device could send a long correlation code that simply is used to indicate the presence of a trapped user. If a strong trigger signal is received by the mobile device then it could use a higher bandwidth encoding strategy to send additional information. The device 152 may in one example be a mobile (cellular) telephone with hardware and/or software installed to enable the transmission of an appropriate magnetic field, for example, one or more coils as described above. The software could divert power to the magnetic transmitter of the mobile telephone, or an additional transmitter connected to the mobile telephone. Alternatively, a mobile telephone may communicate with a separate local unit 102, also about the person, via Bluetooth® or other wireless/wired communication. The mobile phone would monitor for the presence of rescuers and command the local unit 102 to transmit when a rescuer has been detected. Alternatively or additionally, a transceiver 150 may be carried by an Unmanned Ariel Vehicle (UAV) or autonomous vehicle/robot/Remote Operated Vehicle (ROV) rather than a human rescuer, which receives and re-transmits emergency signals from a large area, potentially using a multi-hop network as described above. The UAV or vehicle could move along a predefined route, informing mobile devices of its trajectory. They could then wait until the UAV was at its closest point at which time they would transmit a beacon signal, allowing the trapped user to be localised. The UAV/autonomous vehicle could then deviate from its route to refine the position estimate or obtain more information from the mobile device. It could also drop markers such as flags or spray-paint to indicate the position of a potential victim to the rescue team. Furthermore, the UAV, ROV, robot or similar could utilise broadcatching as described above to avoid or eliminate potential contention in the event of multiple aid signals being sent simultaneously. In this example, the rescuer transceiver (detection device) could distinguish between the mobile transceivers by a device identifier in the aid signal. In one example, where the mobile transceivers are mobile telephones, this may be the International Mobile Subscriber Identity (IMSI) of the device. For broadcatching to work effectively, the devices ideally transmit on distinct bands (for example code, or frequency bands). In the absence of any pre-defined structure, random channel allocation, and/or channel hopping may be employed to reduce the probability of contention.

Additional sensors on the mobile transceiver 152 such as microphone and accelerometer could be used to send rescue workers signs of life, or even to communicate with the trapped person. Furthermore, information such as a geographical location such as a GPS fix (if available), or last known GPS fix could be encoded into the signal and used to aid rescuers to locate the trapped person. Pre-recorded messages could be triggered to reassure the user that assistance was on its way upon detection of a signal from a rescuer transceiver 150. Preferably, the mobile transceiver 152 comprises a mobile telephone which may have many such features and which a trapped person is more likely to have than a specialised emergency beacon device. This provides an advantage over existing rescue techniques which often rely on radio transmission, which is heavily attenuated when travelling through rubble/snow etc.

This application could utilise any modulation scheme and encoding method described above (e.g. magnetic vector modulation, magnetic phase modulation, hypercomplex encoding, electrostatic localisation, BPSK, OSK, Frequency Shift Keying (FSK), CDMA, Orthogonal frequency-division multiplexing (OFDM), Manchester encoding) and transmit and/or receive on one, two, three or more axis.

FIG. 28 shows a flow diagram of the processes undertaken by the mobile transceiver 152 and the rescuer transceiver 150. The process stats at step S1 where a rescuer transceiver 150 periodically transmits a magnetic signal. The signals are only sent periodically so that this signal does not drown out any attempted aid signal.

The mobile transceiver 152 monitors for magnetic signals, and detects the signal from the rescuer transceiver 150 at step S2. The mobile transceiver 152 then determines whether this signal is strong or weak in step S3. This is an indication of how much the aid signal will be attenuated. If the signal is weak, it is likely that the aid signal may be missed. In this case, a short, high powered burst signal would be most useful, to alert rescuers to the presence of the trapped person. This is shown by step S4*a*. If the signal is strong, it is likely that the aid signal would be easily received. In this case, a signal augmented with further information, such as localisation information may be transmitted in step S4*b*.

The rescuer transceiver 150 detects this aid signal in step S5. The rescuer transceiver 150 then sends an acknowledgement signal in step S6. This could serve to reassure the trapped person who receives it at step S7, but also to synchronise the two transceivers 150, 152 to allow for more efficient subsequent communication. The rescuer would then be able to move closer to the trapped person to continue communication in step S8, and complete the recovery of the trapped person.

Electrostatic

Although the above description refers to low frequency magnetic fields being used for communication and localisation, low frequency electrostatic fields (capacitive rather than inductive) could be used in many circumstances. This would be possible where the transmission media is polarisable. Sea water, for example, is polarisable, and thus a three dimensional E-field can be generated in an analogous way to a magnetic field as described above. Furthermore, in such circumstances, it may be possible to utilise both magnetic and electrostatic fields (i.e. 3 H-field and 3 E-field components), thus doubling the maximum potential data rate.

One application where an electrostatic field may be preferable is during a 'man overboard' scenario. The person/object in the water has an electrostatic local unit with them, which transmits a signal to a receiver on the ship/shore, preferably situated beneath the water line, for example on the ship's hull. The high polarisability of sea water means that communication using electrostatic methods may be faster, more reliable and have a longer range than other communication methods.

Another application which could benefit from utilising electrostatic communication would be a system adapted to guide night/cave divers or autonomous underwater vehicles where line of sight and/or illumination is not always possible to aid localisation and communication.

Another application which could benefit from utilising electrostatic communication would be for deep sea drill chain monitoring or monitoring concrete integrity in a well/borehole. This is especially relevant for a transceiver that is able to measure both E and H field components as it can communicate through concrete, mud and seawater along the most optimal path, potentially in a multihop network.

Another application which could benefit from utilising electrostatic communication would be in an underwater multihop sensor network for measuring parameters of the ocean, such as temperature, salinity, velocity and biological indicators such as phytoplankton density. This could be freely drifting, with nodes measuring the relative distances between each other using the electrostatic or magnetostatic channel, as described above.

Another application which could benefit from utilising electrostatic communication would be for control and localisation of underwater remote or autonomously operated vehicles.

Other Applications

The communication and localisation features of the above described methods and apparatus are envisaged to afford further advantages in a broad range of applications. Described below is a non-exhaustive list of such applications with any additional features, methods and or hardware required for the specific application.

Transceivers as described above could be fitted to cars so that drivers can be alerted to the distance between cars and provides a means of communicating between cars. For example, if a car brakes, a signal could be transmitted and received by a following car warning the driver. A related application is in the space sector, to control docking between spacecraft. Currently, this is controlled by visual means, requiring artificial light and a line of sight to guide the craft into the correct relative positions. This can use a significant amount of power and can be prone to errors in digitally processing the video. A potential solution would be to place magnetic transceivers in each craft, which communicate with each other, relaying their relative positions to the craft propulsion system which can correct accordingly.

The localisation feature can be applied to tracking containers and other items in the logistics field. Containers or items can be localised individually in a warehouse, allowing for faster identification and stock control. Furthermore, or alternatively, the 'proximity' feature described above could be used to track items entering or exiting a warehouse, truck etc thus enabling automatically logging of a trajectory of an item. Along a similar vein, luggage could be tracked during a journey. Logged information could alert a traveller where their luggage is, for example, if it is about to exit onto the luggage carousel.

Another application where the localisation and/or proximity feature may be utilised is in precision agriculture. Devices which monitor soil conditions etc are buried in the soil and comprise a local unit 102 or transceiver. A user with a mobile device 100 or transceiver can pass overhead and receive soil condition measurements wirelessly. Alternatively, or additionally, the buried devices could form a multi-hop network as described above, allowing the user to collect data from a large number of devices from a single location.

Localisation of consumer products such as vacuum cleaners and lawn mowers is another application of the present system. Currently, such control is facilitated by trial and error (moving until an obstacle is reached) or by marking out specific areas with wires or beams for example. The use of magneto-inductive communication could control a device accurately and map out the exact area in question.

The methods and apparatus discussed herein could also be applied to applications including pipeline mapping and/or monitoring. Devices could be placed along the length of a pipe which measure properties such as fluid flow rate, pressure and detect the presence of leaks. These could then transmit such information to a user with a mobile device 100 nearby, or transmit the information in a multi-hop fashion to a central receiver. Alternatively, mobile sensor devices (pigs) could be introduced into the flow and transmit information to a user situated nearby. A related application is the monitoring of stream and rivers. Properties such as flow rate and pollution levels could be wirelessly monitored by sensors in the riverbed or mobile buoys floating down the stream.

Another application which could utilise the present system is augmented reality. Images, video, advertisements etc can be overlayed onto real life images (for example as seen through a digital camera or heads-up display) depending on the exact position and pose of the user. Because of the incredibly precise nature that the position and pose is determined using the present method, a much improved experience can be afforded compared to existing systems. This could be extended to a multi-player augmented reality gaming interface. Users all have heads-up glasses which are accurately localised. Other users can then interact with one another in a gaming interface whilst moving around a real landscape (or indoors). A related application is virtual conferencing where participants can interact with one another in a virtual setting with position and pose accurately reproduced.

Adverts may be pushed to a user device depending on location. This may be particularly applicable in shopping centres where an advert for a particular shop can appear when the user passes the shop in question.

Mobile bar-code scanners could be provided to customers in a supermarket for example. These could be localised so that staff can track stock by collecting data collected when shoppers select their items. Shoppers could pair their smartphone (via Bluetooth® for example) with these devices so that customers can be provided with personalised recommendations based on purchasing history and location.

Market research/product development is another application where the present system could be implemented. Companies often want future consumers to participate in the design of products so that they can tap into their clients' ideas before they realise the new version of a product. By installing sensors in products that allow companies to monitor how products are actually being used in practice (by the accurate localisation of position and orientation), they could then use this data to better their design.

The present system could also be used to identify and localise individual objects in a household scenario. This could be used to aid blind or partially sighted people locate objects. Small, inexpensive receivers are attached to objects that are handled on a daily basis. Transceivers are fixed around the house. When a receiver localises itself, it uses wireless communication (e.g. radio, Bluetooth®) to send this information to the user. Alternatively, small transceivers could be attached to objects that in regular use. The system could be used in assisted living to monitor utilisation of objects and space and provide diagnostics/warnings/alarms if a patient's behaviour deviates from the norm. This could also be integrated with smart meters and the like to provide additional context information such as utilisation of appliances or utilities such as gas, electricity or water. The patient could also wear a mobile device 100 to monitor their location and behaviour/activity. This device (and other patient worn/implanted device) could also monitor physiological parameters such as heartrate, blood pressure, activity and so forth. These data and other information captured from a smart home could be relayed to a healthcare provider to provide early warning of conditions or trigger alarms in the event of an emergency. Another application of a system could be in assisted living or healthcare where a robotic assistant could interact with everyday objects, tagged with transceivers, to assist disabled or elderly patients. The robot itself could also be localised using the present system. A related application is guiding robots in situations where vision would not help. These include scenarios such as environments with smoke or where one object is hidden under another.

If a local device 102 is placed on an animal, it would be possible to track their position and pose, even if underground or in thick vegetation. This could be useful in determining behaviour of animals which are hard to observe in other ways. Pet owners could also use the system described herein to track pets within their home, or a kennel for example. Kennel owners may install such a system to track pets, thus potentially lowering their insurance premiums.

It should be noted that a person skilled in the art would be able to identify other applications which would require little or no modification to either the hardware or software identified herein.

It will be understood by one skilled in the art that the local units 102, mobile devices 100 and/or transceivers as described above may be integrated into other technologies to aid in deployment/adoption. For example, local units 102 may be integrated into femtocells or routers which are often deployed in advantageous positions for localisation and/or communication.

Various other modifications will be apparent to those skilled in the art and will not be described in further detail here.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A localisation system for locating a localisation device relative to a beacon, the system comprising:
   a beacon comprising a magnetic field generator for generating a three-dimensional time-dependent magnetic field having a predefined time-dependent shape corresponding to a rotating magnetic dipole at the beacon; and
   a localisation device comprising:
      a detector for detecting the three-dimensional time-dependent magnetic field; and
      a processor operable to:
         extract temporal or spatial properties of said magnetic field;
         compare predicted temporal or spatial properties with said extracted temporal or spatial properties; and
         determine a location of said localisation device relative to said beacon based on said comparison.

2. The localisation system of claim 1 wherein the localisation system comprises:
   a network including plurality of beacons, each beacon comprising:
      a respective magnetic field generator for generating a three-dimensional time-dependent magnetic field having a predefined time-dependent shape, for use in at least one of communication and localisation;
   wherein each beacon is operable to configure or re-configure the predefined shape of said magnetic field in response to receipt of an indication of a change in conditions in said network.

3. The localisation system of claim 1 further comprising:
   at least one detector for detecting the magnetic field generated by said beacon and for providing information associated with said detected magnetic field for use in configuring or reconfiguring said magnetic field;
wherein said beacon is operable to configure or reconfigure the predefined shape of said generated magnetic field in dependence on said information provided by said detection device.

4. The localisation system of claim 1, wherein the processor of the localisation device is further operable to perform operations comprising: detecting a three-dimensional time-dependent magnetic field; extracting temporal or spatial properties of said magnetic field; comparing predicted temporal or spatial properties with said extracted temporal or spatial properties; and determining a location of said localisation device relative to said beacon based on said comparing.

5. The localisation system of claim 4 wherein:
   the three-dimensional time-dependent magnetic field detected by said detecting has a time-varying magnetic field vector and wherein said time-varying magnetic field vector is modulated to encode information associated with said beacon; and
   said extracting further comprises extracting encoded information from said detected magnetic field.

6. A beacon for use in a localisation system comprising a generator for generating a three-dimensional time-dependent magnetic field having a predefined time-dependent shape corresponding to a rotating magnetic dipole at the beacon.

7. The beacon of claim 6 wherein the predetermined time-dependent shape is configured to represent an identity of the beacon.

8. The beacon of claim 6 wherein the rotating magnetic dipole is of variable strength.

9. The beacon of claim 6 wherein said three-dimensional time-dependent magnetic field generated by said magnetic field generator comprises a time-varying magnetic field vector, wherein said time-varying magnetic field vector is modulated to encode information associated with said beacon.

10. The beacon of claim 9 further comprising means for detecting and decoding an encoded magnetic field generated by another of said plurality of beacons.

11. The beacon of claim 9 wherein the information encoded in the magnetic field comprises at least one of the following: a correlation code and an identifier of the beacon.

12. The beacon of claim 9 wherein the magnetic field is encoded by modulating at least one of the following: a direction of said time-varying magnetic field vector; a change of direction (e.g. phase) of said time-varying magnetic field vector; and a rate of change of direction of said time-varying magnetic field vector.

13. The beacon of claim 9 wherein the magnetic field is encoded by modulating said time-varying magnetic field vector to produce a three dimensional time-dependent magnetic field shape (e.g. Hypercomplex coding).

14. The beacon of claim 6 wherein the magnetic field generator comprises a plurality of coils substantially mutually orthogonally orientated with respect to one another.

15. The beacon of claim 6 wherein the magnetic field generator is operable to generate a rotating magnetic field.

16. The beacon of claim 6 wherein said beacon is operable to configure or re-configure said predefined time-dependent shape of said magnetic field in response to receipt of an indication of a change in network conditions.

17. The beacon of claim 16 wherein said change in network conditions comprises at least one of the following:
   a change in prevailing environmental/communication conditions (e.g. a level of local interference);
   the addition and/or removal of a transceiver device to the localisation system;
   a change in, or an initial configuration of, coverage required of said generated magnetic field; and
   the movement of a transceiver device within the system.

18. The beacon of claim 16 wherein said beacon is operable to receive said indication of a change in network conditions from at least one of: a sensor device operable to detect said generated magnetic field; a network control node; and another beacon of said network.

19. The beacon of claim 18 wherein said indication of a change in network conditions received from said another beacon of said network is encoded in a magnetic field generated by said another beacon.

20. The beacon of claim 16 further comprising means for detecting the magnetic field generated by another beacon of said network and for determining a change in network conditions based on said detected magnetic field, wherein said beacon is operable to provide an indication of the determined change in conditions in said network to another beacon of said network and/or to a network control node.

21. The beacon of claim 16 wherein said beacon is operable to configure or re-configure at least one of the following in response to receipt of said indication of conditions in said network: the coverage of said magnetic field; the extent of coverage (e.g. the power used to generate the field) of said magnetic field; and the encoding of said magnetic field.

22. A localisation device for use in a localisation system comprising:
 a detector for detecting a three-dimensional time-dependent magnetic field emitted by a beacon; the three-dimensional time-dependent magnetic field detected by said detector has a time-varying magnetic field vector and wherein said time-varying magnetic field vector is modulated to encode information associated with said beacon; and
 a processor operable to:
  extract encoded information from said detected magnetic field;
  extract temporal or spatial properties of said magnetic field;
  compare predicted temporal or spatial properties with said extracted temporal or spatial properties; and
  determine a location of said localisation device relative to said beacon based on said comparison.

23. The localisation device of claim 22 wherein the processor is operable to determine a location of said localisation device by extracting the magnetic field strength and extracting a distance based on said magnetic field strength.

24. The localisation device of claim 22 wherein the processor is operable to determine a location of said localisation device by extracting an angular position relative to said beacon based on said extracted temporal or spatial properties.

25. The localisation device of claim 22 wherein the processor is operable to compare predicted temporal or spatial properties of said magnetic field with said extracted temporal or spatial properties by:
 performing a cross-correlation between the predicted magnetic field and the extracted magnetic field; and
 detecting a peak in the output of said cross-correlation.

26. The localisation device of claim 25 wherein the processor is operable to compare predicted temporal or spatial properties of said magnetic field with said extracted temporal or spatial properties by: detecting said peak in the output of the cross-correlation utilising at least one of: least mean squares, genetic algorithms or an exhaustive search.

27. The localisation device as claimed in claim 22 wherein the processor is operable to extract said encoded information based on the magnitude of the magnetic field vector, the direction of the magnetic field vector or the polarisation of the magnetic field vector.

28. The localisation device of claim 22 wherein the detector is operable in accordance with at least one of the following: to detect, and differentiate between, a plurality of distinct encoded magnetic fields; to detect, and differentiate between, a plurality of distinct encoded magnetic fields each emitted by a different respective beacon; to detect a phase relationship between a number of distinct magnetic fields whereby to differentiate between said distinct fields; and to use the phase relationship between the number of distinct signals to determine the localisation device's position relative to an origin of each said distinct signals.

29. The localisation device of claim 22 wherein said information comprises an identifier of said beacon.

30. The localisation device of claim 22 wherein the identifier of the beacon is defined by a unique identifying code.

31. The localisation device of claim 22 wherein the unique identifying code is configured in accordance with at least one of the following: to have a portion that is common to the identifiers of a group of beacons; to have at least one portion that identifies a group of beacons to be within a particular building (or area); to have at least one portion that identifies a group of beacons to be within a particular geographical region; to be unique within a particular building or area; to be unique within a particular region; and to be globally unique.

32. A beacon for use in a localisation system, comprising:
 a magnetic field generator for generating a three-dimensional time-dependent magnetic field having a predefined time-dependent shape corresponding to a rotating magnetic dipole at the beacon, wherein the magnetic field generator is operable to generate an encoded three-dimensional time-dependent magnetic field, having a predefined shape, for communication, using said three-dimensional time-dependent magnetic field, with another device; and
 a receiver for receiving said information associated with said detected magnetic field for use in configuring or reconfiguring said magnetic field;
 wherein said beacon is operable to configure or reconfigure the predefined shape of said encoded magnetic field in dependence on said received information.

33. The beacon of claim 32 wherein the beacon further comprises detector for detecting a magnetic field generated by at least one of said beacon and another similar beacon.

34. The beacon claim 32 wherein the information associated with a detected magnetic field comprises information relating to properties of a detected magnetic field.

35. The beacon of claim 34 wherein the information associated with a detected magnetic field comprises at least one of: signal strength, error level in signal, noise levels, and detected signal.

36. The beacon of claim 32 wherein the information associated with a detected magnetic field comprises information relating to other beacons removed and/or inserted into the localisation system.

37. A method, performed in a localisation system, of locating a localisation device relative to a beacon, the method comprising:
 generating, at a beacon, a three-dimensional time-dependent magnetic field having a predefined time-dependent shape corresponding to a rotating magnetic dipole at the beacon; and
 detecting, at a separate localisation device, the three-dimensional time-dependent magnetic field, and extracting temporal or spatial properties of said magnetic field, comparing predicted temporal or spatial properties with said extracted temporal or spatial properties, and determining a location of said localisation device relative to said beacon based on said comparing.

38. A method, performed by a beacon in a localisation system, the method comprising generating a magnetic field having a predefined time-dependent shape corresponding to a rotating magnetic dipole at the beacon.

39. The method of claim 38 wherein said three-dimensional time-dependent magnetic field generated in said generating comprises a time-varying magnetic field vector, wherein said time-varying magnetic field vector is modulated to encode information associated with said beacon.

* * * * *